US006516443B1

(12) United States Patent
Zook

(10) Patent No.: US 6,516,443 B1
(45) Date of Patent: Feb. 4, 2003

(54) ERROR DETECTION CONVOLUTION CODE AND POST PROCESSOR FOR CORRECTING DOMINANT ERROR EVENTS OF A TRELLIS SEQUENCE DETECTOR IN A SAMPLED AMPLITUDE READ CHANNEL FOR DISK STORAGE SYSTEMS

(75) Inventor: Christopher P. Zook, Longmont, CO (US)

(73) Assignee: Cirrus Logic, Incorporated, Austin, TX (US)

( * ) Notice: Subject to any disclaimer, the term of this patent is extended or adjusted under 35 U.S.C. 154(b) by 0 days.

(21) Appl. No.: 09/499,930

(22) Filed: Feb. 8, 2000

(51) Int. Cl.[7] .............................................. H03M 13/00

(52) U.S. Cl. ..................................................... 714/792

(58) Field of Search ................................ 714/746, 786, 714/769, 792; 375/265, 268

(56) References Cited

U.S. PATENT DOCUMENTS

| | | | | |
|---|---|---|---|---|
| 5,291,499 A | * | 3/1994 | Behrens et al. ............. | 714/786 |
| 5,521,945 A | | 5/1996 | Knudson ..................... | 375/341 |
| 5,585,975 A | * | 12/1996 | Bliss ........................... | 360/65 |
| 5,696,639 A | * | 12/1997 | Spurbeck et al. ............. | 360/51 |
| 5,771,127 A | * | 6/1998 | Ewwd et al. .................. | 360/51 |
| 5,838,738 A | * | 11/1998 | Zook ........................... | 375/340 |
| 5,844,741 A | | 12/1998 | Yamakawa et al. ........... | 360/65 |
| 5,844,920 A | * | 12/1998 | Zook et al. .................. | 714/769 |
| 5,926,490 A | | 7/1999 | Reed et al. .................... | 360/51 |
| 5,938,790 A | | 8/1999 | Marrow ....................... | 714/795 |
| 5,949,831 A | | 9/1999 | Coker et al. ................. | 375/341 |
| 5,961,658 A | * | 10/1999 | Reed et al. .................. | 714/746 |
| 6,000,054 A | | 12/1999 | Bahr et al. .................. | 714/786 |

OTHER PUBLICATIONS

Friedmann, simplified EPR4 Detection, IEEE, p. 129–134, Jan. 1998.*
Fitzpatrick, a reduced complexity EPR4 post–processor, IEEE, p. 135–140, Jan. 1998.*
Fields et al., A 200 Mb/s CMOS EPRML Channel with integrated servo demodulator for magnetic hard disks, IEEE, p. 314–316, 1997.*
Abidi, an analog disk drive read cahnnel with EPR4 performance, Electrical Engineering Department University of California, p. 1–4, 1997.*

(List continued on next page.)

*Primary Examiner*—Albert Decady
*Assistant Examiner*—Shelly A Chase
(74) *Attorney, Agent, or Firm*—Dan Shifrin; Howard Sheerin

(57) ABSTRACT

In a disk storage system for digital computers (e.g., optical or magnetic disk drives) a sampled amplitude read channel is disclosed comprising a convolutional code channel encoder for encoding check bits into channel data recorded to a disk storage medium, a trellis sequence detector for detecting a preliminary sequence from read signal sample values generated during read back, a convolutional code syndrome generator for generating an error syndrome from the preliminary sequence, and a post processor for evaluating the error syndrome to detect and correct errors made by the trellis sequence detector. The post processor remodulates the preliminary sequence output by the trellis sequence detector into a sequence of estimated sample values which are subtracted from the actual read signal sample values to form a sequence of sample errors. When the error syndrome indicates the presence of an error in the preliminary sequence, the post processor processes the sample errors to determine the most likely location of the error and corrects it. The convolution code provides a significant performance gain due to its high rate and capacity to detect several of the dominant error events associated with the trellis sequence detector.

25 Claims, 23 Drawing Sheets

OTHER PUBLICATIONS

Roger Wood, "Turbo–PRML: A Compromise EPRML Detector," *IEEE Transactions on Magnetics,* vol. 29, No. 6, Nov. 1993.

Hideyuki Yamakawa, "SPERD: Simplified Partial Error Response Detection," *IEEE Inter Mag '95,* San Antonin, Texas, Apr. 1995.

Takushi Nishiya, "PERD: Partial Error Response Detection," *IEEE Inter Mag '95,* San Antonio, Texas, Apr. 1995.

Takushi Nishiya and Hideyuki Yamakawa, "PERD: Partial Error Response Detection," *IEEE Transactions on Magnetics,* vol. 31, No. 6, Nov. 1995.

McEwen, Wolf, "Trellis Codes for (1,k) $E^2PR4ML$ with Squared Distance 18", *IEEE Transactions on Magentics,* vol. 32, No. 5, Sep. 1996.

J. Hagenauer and P. Hoeher, "A Viterbi Algorithm with Soft–Decision Outputs and its Applications", Conference Proceedings, IEEE Globecom, Dallas, TX, Nov., 1989.

Bahl et al, "Optimal Decoding of Linear Codes for Minimizing Symbol Error Rate", *IEEE Trans. on Information Theory,* Mar., 1974.

T. Nishiya et al., "Turbo–EEPRML: An EEPR4 Channel with an Error–Correcting Post–Processor Designed for 16/17 Rate Quasi–MTR Code", *IEEE Globecom,* Nov. 8–12, 1998.

Stephen B. Wicker, *Error Control Systems for Digital Comunication and Storge,* Prentice Hall, pp. 264–332, 1995.

U.S. patent application Ser. No. 08/127,101 to Livingston, filed Jul. 31, 1998. Patent 6185173.

U.S. patent application Ser. No. 09/307,645 to Livingston, filed May 7, 1999.

\* cited by examiner

|    | GRADE | ↓ | ↓ |
|----|-------|---|---|
| 1  | 1001    | 2 | 1001 |
| 2  | 0001    | 1 | 1000 |
| 3  | 010     | 2 | 010 |
| 4  | 1011    | 1 | 1101 |
| 5  | 0110    | 2 | 0110 |
| 6  | 01110   | 2 | 01110 |
| 7  | 011110  | 1 | 011110 |
| 8  | 0111110 | 2 | 0111110 |
| 9  | 1111110 | 1 | 0111111 |
| 10 | 10X     | 1 | BIT 24 |
| 11 | 011     | 1 | BITS 21-24 |

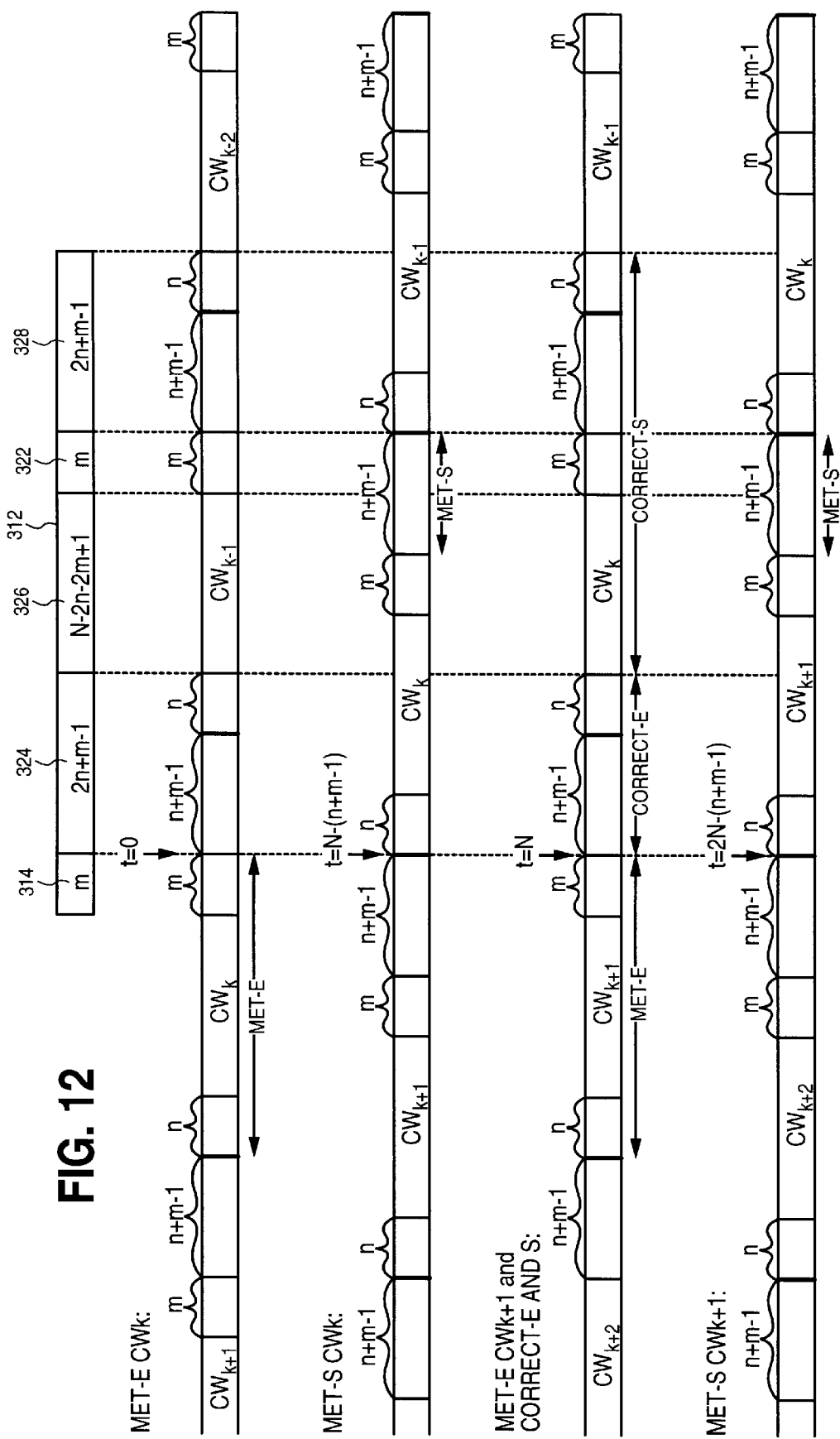

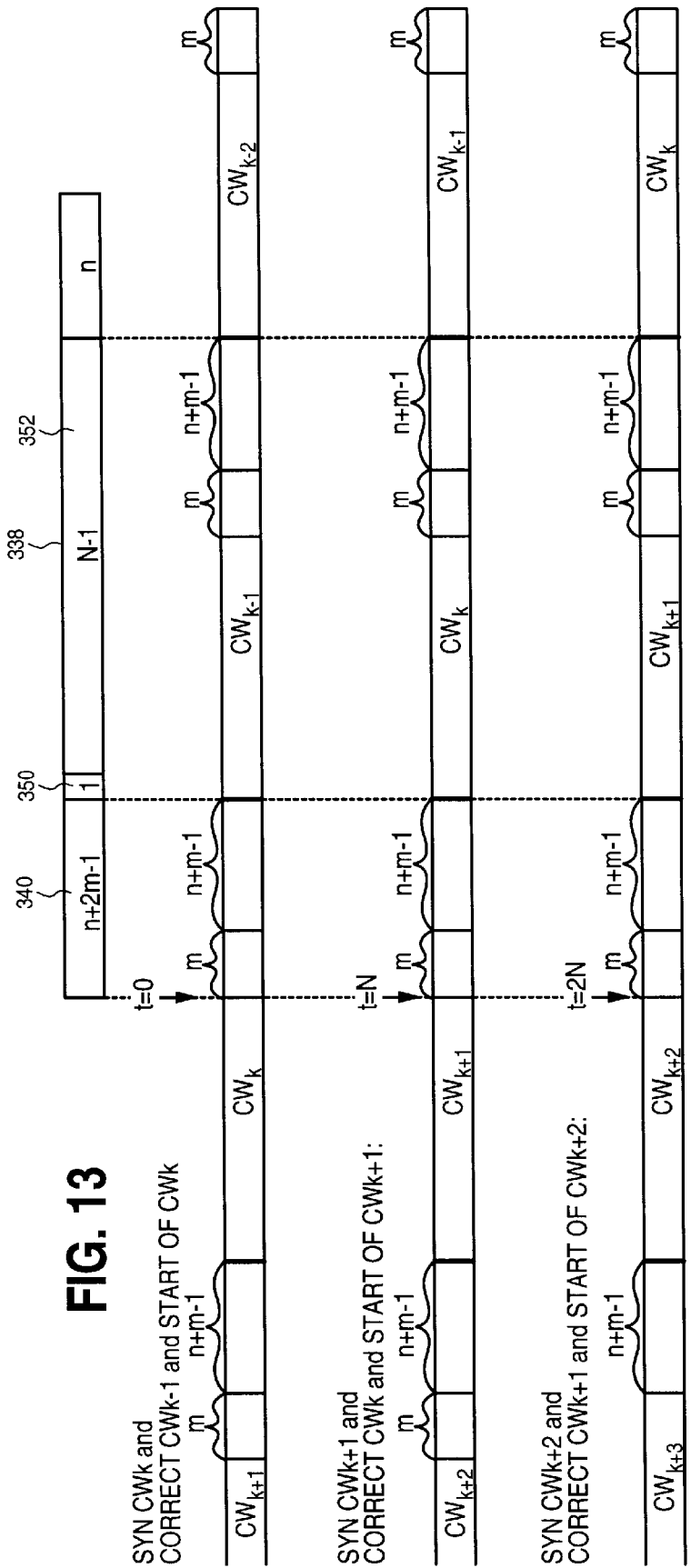

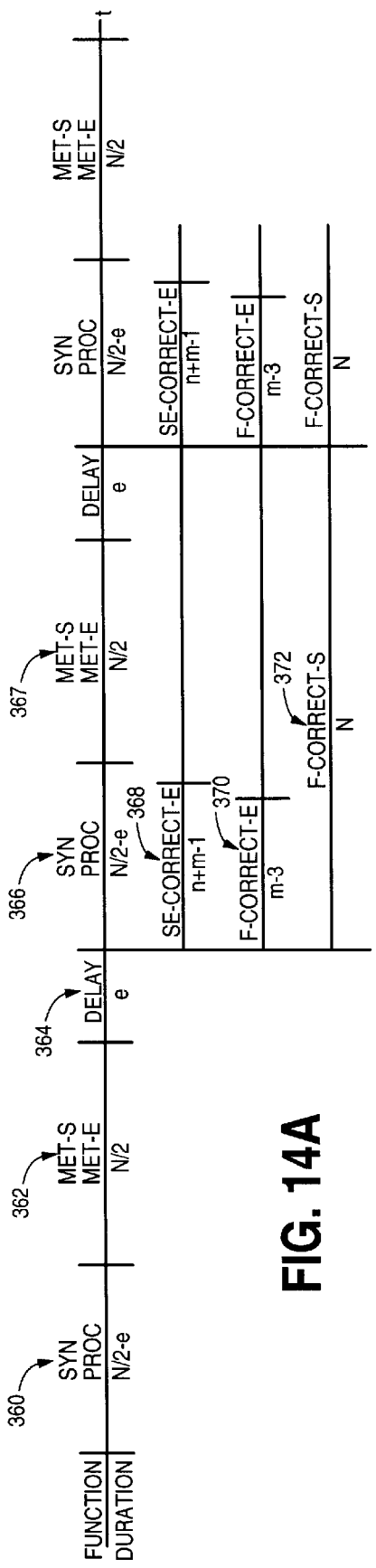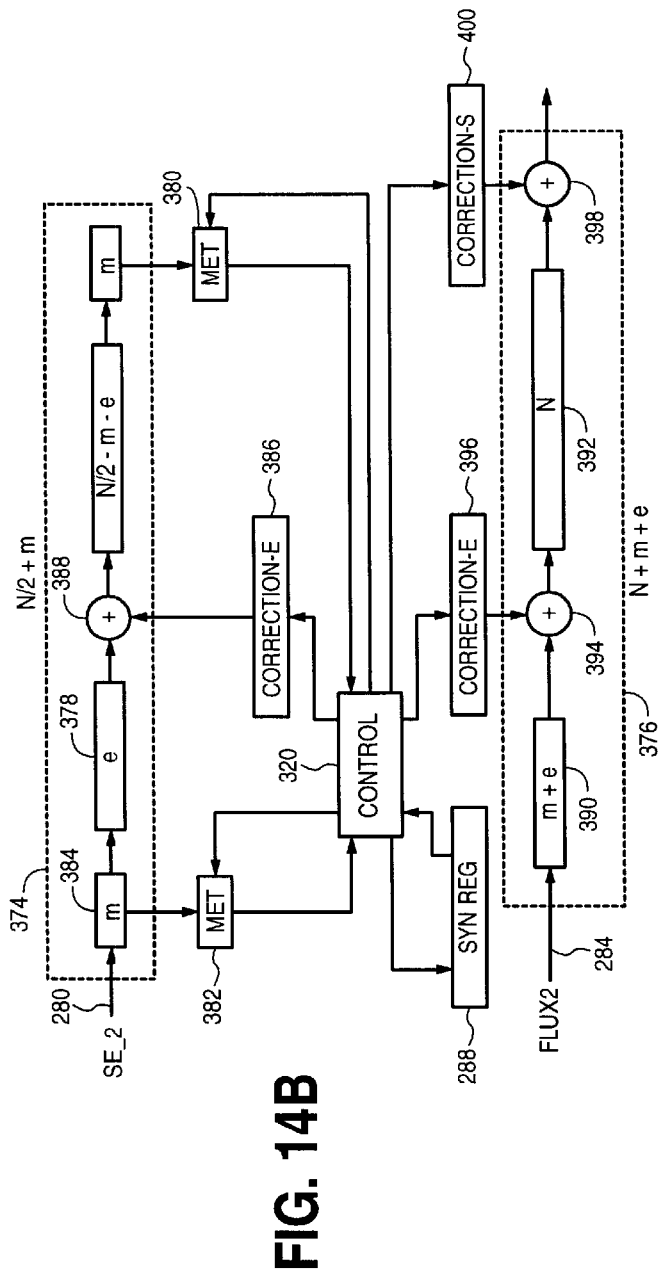
FIG. 14A
FIG. 14B

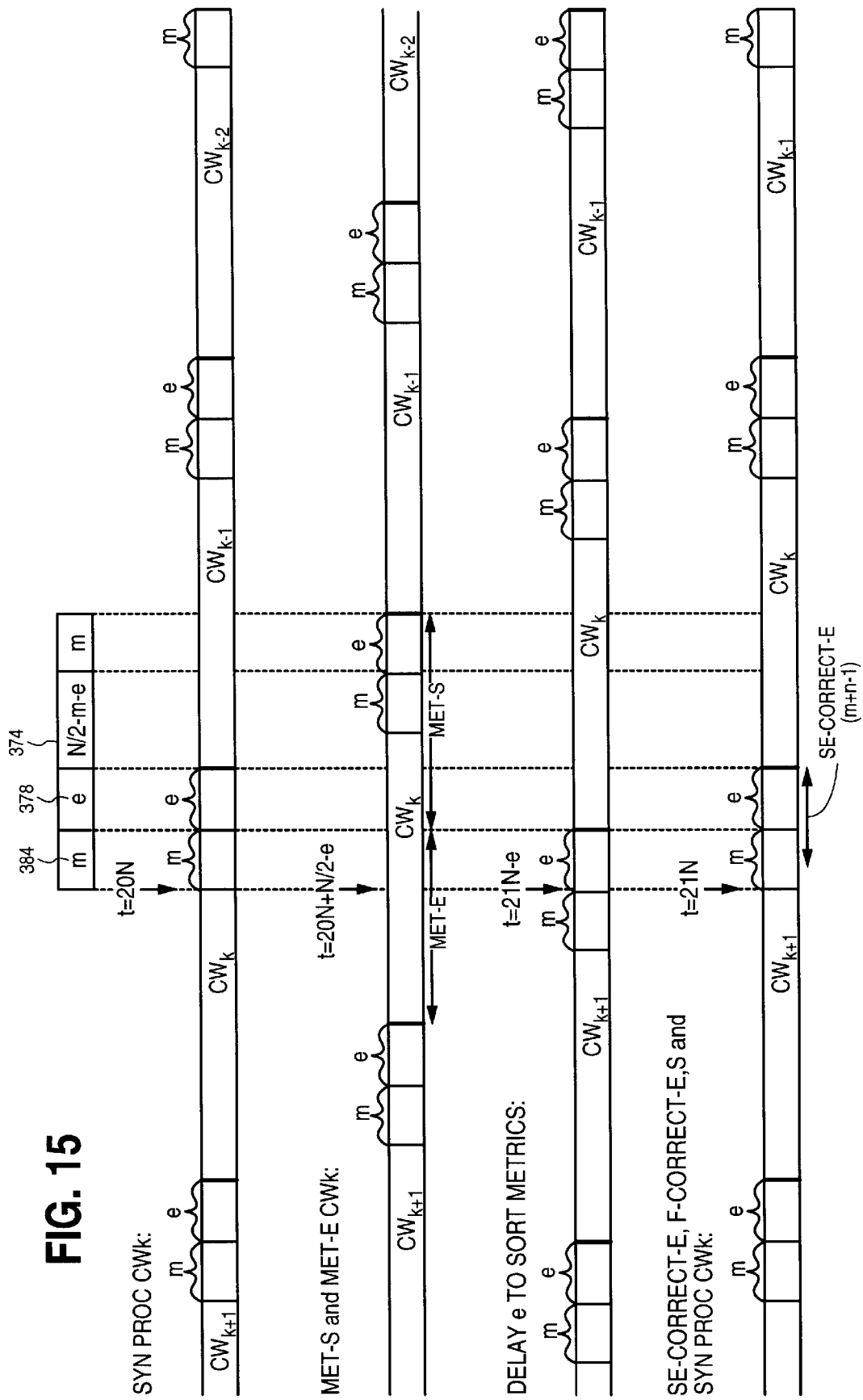

ERROR DETECTION CONVOLUTION CODE AND POST PROCESSOR FOR CORRECTING DOMINANT ERROR EVENTS OF A TRELLIS SEQUENCE DETECTOR IN A SAMPLED AMPLITUDE READ CHANNEL FOR DISK STORAGE SYSTEMS

CROSS REFERENCE TO RELATED APPLICATIONS AND PATENTS

This application is related to concurrently filed U.S. patent application Ser. No. 09/499,930 entitled "AN ERROR DETECTION CONVOLUTION CODE AND POST PROCESSOR FOR CORRECTING DOMINANT ERROR EVENTS OF A TRELLIS SEQUENCE DETECTOR IN A SAMPLED AMPLITUDE READ CHANNEL FOR DISK STORAGE SYSTEMS." This application is also related to other co-pending U.S. patent applications, namely application Ser. No. 09/439,560 entitled "A 2,2,1 ASYMMETRIC PARTIAL RESPONSE TARGET IN A SAMPLED AMPLITUDE READ CHANNEL FOR DISK STORAGE SYSTEMS," and Ser. No. 09/204,759 entitled "A SAMPLED AMPLITUDE READ CHANNEL EMPLOYING ITERATIVE ERROR CORRECTION TECHNIQUES TO MINIMIZE A EUCLIDEAN DISTANCE." This application is also related to U.S. Pat. No. 5,844,920 entitled "THERMAL ASPERITY COMPENSATION USING MULTIPLE SYNC MARKS FOR RETROACTIVE AND SPLIT SEGMENT DATA SYNCHRONIZATION IN A MAGNETIC DISK STORAGE SYSTEM," U.S. Pat. No. 5,585,975 entitled "EQUALIZATION FOR SAMPLE VALUE ESTIMATION AND SEQUENCE DETECTION IN A SAMPLED AMPLITUDE READ CHANNEL," U.S. Pat. No. 5,926,490 entitled "SAMPLED AMPLITUDE READ CHANNEL EMPLOYING A REMOD/DEMOD SEQUENCE DETECTOR GUIDED BY AN ERROR SYNDROME," U.S. Pat. No. 5,771,127 entitled "A SAMPLED AMPLITUDE READ CHANNEL EMPLOYING INTERPOLATED TIMING RECOVERY AND A REMOD/DEMOD SEQUENCE DETECTOR," U.S. Pat. No. 5,838,738 entitled "CODING TO IMPROVE TIMING RECOVERY IN A SAMPLED AMPLITUDE READ CHANNEL," U.S. Pat. No. 5,696,639 entitled "SAMPLED AMPLITUDE READ CHANNEL EMPLOYING A REMOD/DEMOD SEQUENCE DETECTOR GUIDED BY AN ERROR SYNDROME," U.S. Pat. No. 6,185,173 entitled "A SAMPLED AMPLITUDE READ CHANNEL EMPLOYING A TRELLIS SEQUENCE DETECTOR MATCHED TO A CHANNEL CODE CONSTRAINT AND A POST PROCESSOR FOR CORRECTING ERRORS IN THE DETECTED BINARY SEQUENCE USING THE SIGNAL SAMPLES AND AN ERROR SYNDROME," and U.S. Pat. No. 5,291,499 entitled "METHOD AND APPARATUS FOR REDUCED-COMPLEXITY VITERBI-TYPE SEQUENCE DETECTORS." The above-named U.S. patent applications and U.S. patents are incorporated herein by reference.

FIELD OF INVENTION

The present invention relates to the recording and reproduction of binary data in disk storage systems for digital computers, particularly to a sampled amplitude read channel employing an error detection convolutional code and post processor for correcting the dominant error events of a trellis sequence detector.

BACKGROUND OF THE INVENTION

The advent and application of sophisticated digital signal processing techniques has increased dramatically the storage capacity of disk storage systems for digital computers by allowing for a significant increase in the linear storage density (number of bits stored per unit area along a concentric data track) without sacrificing performance in terms of the bit error rate. One particularly attractive digital signal processing technique previously applied in communication channels and more recently applied to the disk recording channel is Partial Response (PR) signaling with Maximum Likelihood (ML) sequence detection or PRML.

PR signaling refers to a particular method for transmitting symbols represented as analog pulses through a communication medium. The benefit is that at the signaling instances (baud rate) there is no intersymbol interference (ISI) from other pulses except for a controlled amount from immediately adjacent, overlapping pulses. Allowing the pulses to overlap in a controlled manner leads to an increase in the symbol rate (linear recording density) without losing performance in terms of signal-to-noise ratio (SNR).

PR channels are characterized by the polynomials $$(1-D)(1+D)^n$$

where D represents a delay of one symbol period and n is an integer. For n=1,2,3, the PR channels are referred to as PR4, EPR4 and EEPR4, with their respective frequency responses shown in FIG. 1A. The channel's dipulse response, the response to an isolated symbol, characterizes the transfer function of the system (the output for a given input). With a binary "1" bit modulating a positive dipulse response and a binary "0" bit modulating a negative dipulse response, the output of the channel is a linear combination of time shifted dipulse responses. The dipulse response for a PR4 channel $(1-D^2)$ is shown as a solid line in FIG. 1B. Notice that at the symbol instances (baud rate), the dipulse response is zero except at times t=0 and t=2. Thus, the linear combination of time shifted PR4 dipulse responses will result in zero ISI at the symbol instances except where immediately adjacent pulses overlap.

With the PR4 dipulse samples normalized to (+1, 0 −1) it should be apparent that the linear combination of time shifted PR4 dipulse responses will result in a channel output of +2, 0, or −2 at the symbol instances depending on the binary input sequence. The output of the channel can therefore be characterized as a state machine driven by the binary input sequence, and conversely, the input sequence can be estimated or demodulated by running the signal samples at the output of the channel through an "inverse" state machine. Because noise will obfuscate the signal samples, the inverse state machine is actually implemented as a trellis sequence detector which computes a most likely input sequence associated with the signal samples (i.e., the sequence through a trellis that is closest to the signal samples in Euclidean space).

The performance of the trellis sequence detector in terms of bit error rate depends on the amount and character of noise in the system, including noise due to the spectrum of the read signal diverging from the ideal partial response. A channel equalizer is typically employed to shape the response of the read channel into the target partial response and to remove linear distortions in the read signal. The channel equalizer may be implemented in continous-time operating on the analog read signal, or it may be implemented in discrete-time operating on samples of the read signal, or both. Typical read channels employ an analog equalizer, such as a biquad analog filter, followed by a nth order finite-impulse response (FIR) discrete-time filter.

A drawback of the channel equalizers is that they tend to correlate the noise in the read signal, thereby degrading the performance of the trellis sequence detector which is a maximum likelihood detector only if the noise is additive white Gausian (AWG). Further, the undesirable noise correlating effect of the channel equalizers increases as the amount of equalization required to match the channel response to the target response increases. Increasing the order of the PR target generally decreases the amount of equalization required, but it also increases the cost and complexity of the trellis sequence detector due to the increase in the number of states in the trellis state machine. The amount of equalization required also increases as the linear bit density increases, which is inevitable given the perpetual increase in demand for higher capacity disk drives.

The aforementioned co-pending U.S. patent entitled "A SAMPLED AMPLITUDE READ CHANNEL EMPLOYING ITERATIVE ERROR CORRECTION TECHNIQUES TO MINIMIZE A EUCLIDEAN DISTANCE" ameliorates the degrading effect of the channel equalizers by providing a sample error filter which effectively whitens the noise in the read signal at the output of the channel equalizers. A post processor then evaluates the filtered sample errors (noise) to detect and correct errors made by the trellis sequence detector due to the noise correlating effect of the channel equalizers. In an alternative embodiment, an error detection channel code is also employed to further enhance the operation of the post processor by correcting only those errors detected by the error detection channel code, which reduces the probability of miscorrections. The particular error detection channel code disclosed in that application is a simple parity check bit over a predetermined number of channel data bits to form a parity error detection codeword. A simple parity code, however, is capable of detecting only a limited number of dominant error events associated with the trellis sequence detector. Error detection codes other than, or in addition to, a simple parity code could be employed to detect a greater number of the dominant error events, but an overall performance gain is realized only if the resulting code rate (channel bits to codeword bits) is high enough such that there is an increase in the user data density while still achieving some arbitrarily low bit error rate.

There is, therefore, a need for a sampled amplitude read channel for use in disk storage systems that improves the performance of a post processor by detecting and correcting a greater number of error events than that detectable using a simple parity code. An additional aspect of the present invention is to employ a high rate channel code capable of correcting several dominant error events of a trellis sequence detector, thereby allowing a significant increase in the user data density while still achieving some arbitrarily low bit error rate.

SUMMARY OF THE INVENTION

In a disk storage system for digital computers (e.g., optical or magnetic disk drives) a sampled amplitude read channel is disclosed comprising a convolutional code channel encoder for encoding check bits into channel data recorded to a disk storage medium, a trellis sequence detector for detecting a preliminary sequence from read signal sample values generated during read back, a convolutional code syndrome generator for generating an error syndrome from the preliminary sequence, and a post processor for evaluating the error syndrome to detect and correct errors made by the trellis sequence detector. The post processor remodulates the preliminary sequence output by the trellis sequence detector into a sequence of estimated sample values which are subtracted from the actual read signal sample values to form a sequence of sample errors. When the error syndrome indicates the presence of an error in the preliminary sequence, the post processor processes the sample errors to determine the most likely location of the error and corrects it. The convolution code provides a significant performance gain due to its high rate and capacity to detect several of the dominant error events associated with the trellis sequence detector.

In one embodiment of the present invention, the post processor comprises a sample error filter for filtering the sample errors to effectively whiten the noise in the read signal. During a first pass over the preliminary sequence, the post processor operates in an unguided mode to detect and correct errors made by the trellis sequence detector due to the noise correlating effect of the channel equalizers. Thereafter, the post processor evaluates the error syndrome in a guided mode in order to detect and correct residual error events that were not detected during the first pass over the preliminary sequence.

BRIEF DESCRIPTION OF THE DRAWINGS

The above and other aspects and advantages of the present invention will be better understood by reading the following detailed description of the invention in conjunction with the drawings, wherein:

FIG. 12 illustrates the pipelined operation of the circuitry shown in FIG. 11B.

FIG. 13 illustrates the pipelined operation of the circuitry shown in FIG. 11C.

FIG. 14A shows a time line illustrating the pipelined operation of the error pattern detector and guided error corrector of FIG. 10C.

FIG. 14B shows further details of the buffering and control circuitry for carrying out the pipelined generation of the error metrics for detecting error events in the preliminary sequence output by the trellis sequence detector, and for correcting errors in the filtered sample error sequence and the preliminary sequence using the guided error corrector of FIG. 10C.

FIG. 15 illustrates the pipelined operation of the circuitry shown in FIG. 14B.

DETAILED DESCRIPTION OF EMBODIMENTS

Data Format

Figure 2A:
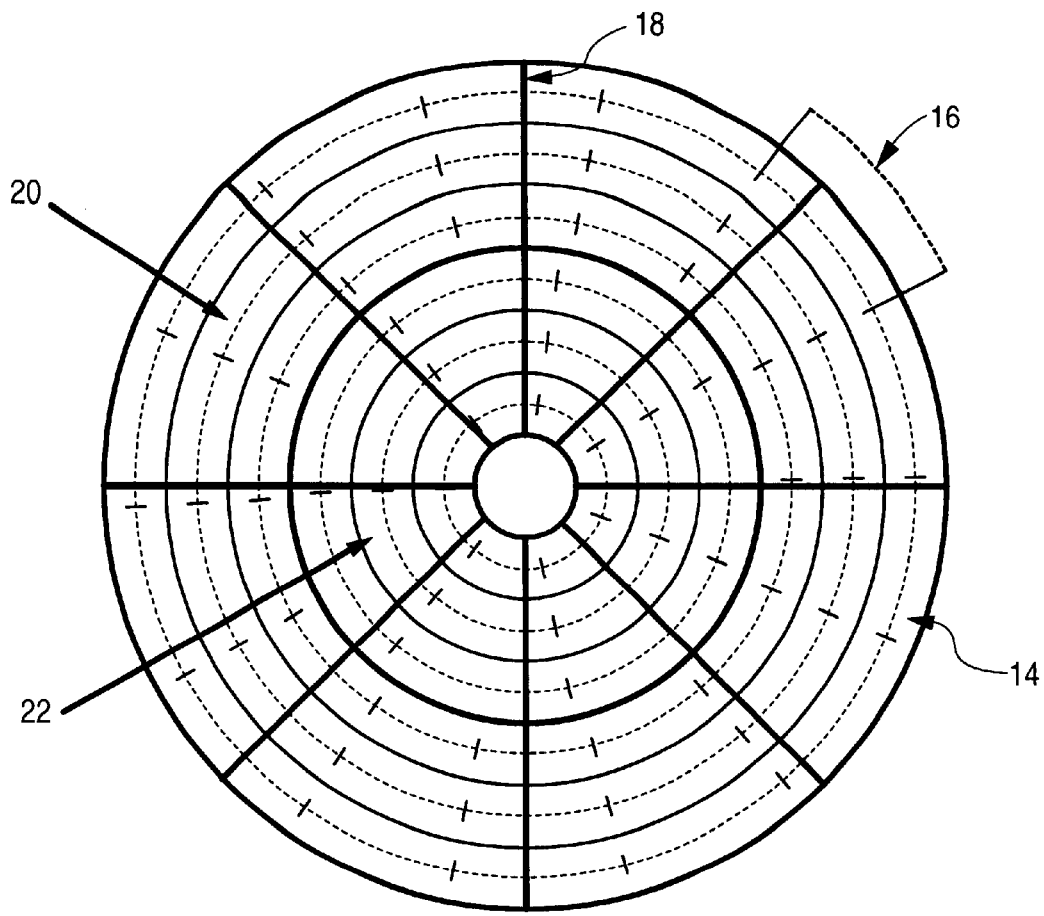
FIG. 2A shows a typical data format for a magnetic disk storage medium, comprising a plurality of concentric data tracks grouped in predefined zones, where each data track is partitioned into a number of data sectors.

FIG. 2A shows a conventional data format of a magnetic disk storage medium comprising a series of concentric, radially spaced data tracks 14, wherein each data track 14 comprises a plurality of data sectors 16 with embedded servo wedges 18. A servo controller (not shown) processes the servo data in the servo wedges 18 and, in response, positions a read/write head over a selected data track. Additionally, the servo controller processes servo bursts within the servo wedges 18 to keep the head aligned over a centerline of the selected track while writing and reading data. The format of the servo wedges 18 includes a preamble and a sync mark, similar to the user data sectors 16 described below with reference to FIG. 2B.

Zoned recording is a technique known in the art for increasing the storage density by recording the user data at different rates in predefined zones between the inner diameter and outer diameter tracks. The data rate can be increased at the outer diameter tracks due to the increase in circumferential recording area and the decrease in intersymbol interference. This allows more data to be stored in the outer diameter tracks as is illustrated in FIG. 2A where the disk is partitioned into an outer zone 20 comprising fourteen data sectors per track, and an inner zone 22 comprising seven data sectors per track. In practice, the disk is actually partitioned into several zones with increasing data rates from the inner to outer diameter zones.

Figure 2B:
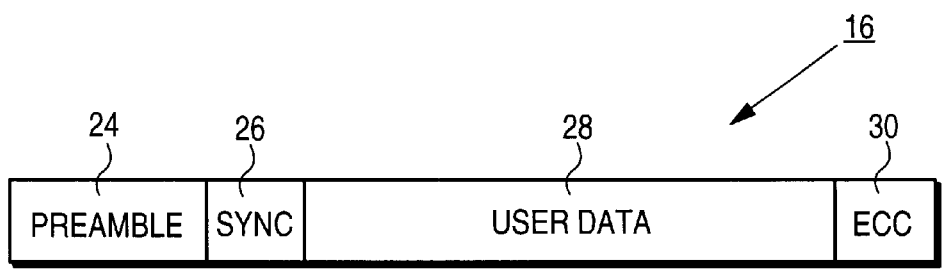
FIG. 2B shows a typical format for a data sector.

FIG. 2B shows the format of a data sector 16 comprised of an acquisition preamble 24, a sync mark 26, a user data field 28, and appended ECC bytes 30 for use in detecting and correcting errors in the user data upon readback. Timing recovery 68 of FIG. 3 processes the acquisition preamble 24 to acquire the correct data frequency and phase before reading the user data field 28, and the sync mark 26 demarks the beginning of the user data field 28 for use in symbol synchronizing the user data 28. In one embodiment of the present invention, the user data 28 are encoded according to an error detection convolution code for enhancing the performance of a post processor 95 shown in FIG. 3 and as described in greater detail below.

Sampled Amplitude Read Channel

Figure 3:
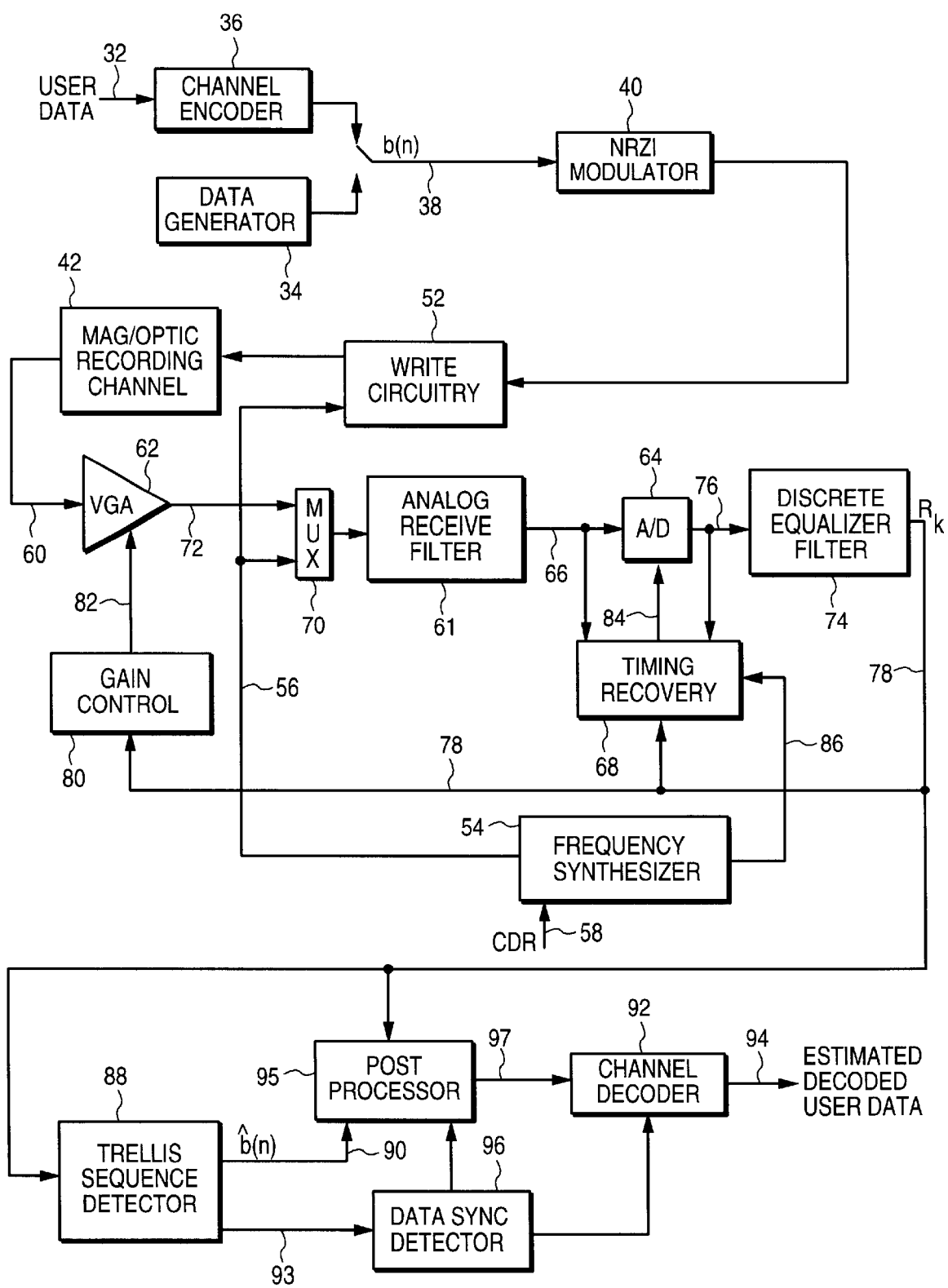
FIG. 3 shows a block diagram of a sampled amplitude read channel employing a trellis sequence detector and a post processor according to an embodiment of the present invention.

Referring now to FIG. 3, shown is a block diagram of a sampled amplitude read channel according to an embodiment of the present invention. During a write operation, the read channel receives user data over line 32 from the host system. A data generator 34 generates the preamble 24 of FIG. 2B (for example 2T preamble data) written to the disk prior to writing the user data 28. The data generator 34 also generates the sync mark 26 of FIG. 2B for use in symbol synchronizing to the user data 28 during a read operation. A channel encoder 36 encodes a channel code into the data sequence b(n) 38 which is written to the disk; as described in greater detail below, a suitable channel encoder 36 encodes the user data to enforce a run-length-limited (RLL) (d,k) constraint as well as to encode error detection check bits for use by the post processor 95 in correcting errors made by the trellis sequence detector 88.

After encoding 36 the channel code, a NRZI modulator 40 modulates the current of write circuitry 52, thereby modulating the current in the recording head coil (or intensity of a laser beam) at the zone baud rate to record a sequence of transitions onto the disk 42 which represent the recorded data. In NRZI recording, for each "1" bit in the write data sequence b(n) 38 the NRZI modulator 40 toggels the write current (from positive to negative, or vise versa), and for each "0" bit in the write data sequence b(n) 38 the NRZI modulator 40 leaves the write current unchanged. A frequency synthesizer 54 provides a baud rate write clock 56 to the write circuitry 52 which is adjusted by a baud or channel data rate signal (CDR) 58 according to the current zone the recording head is over.

Figure 1A:
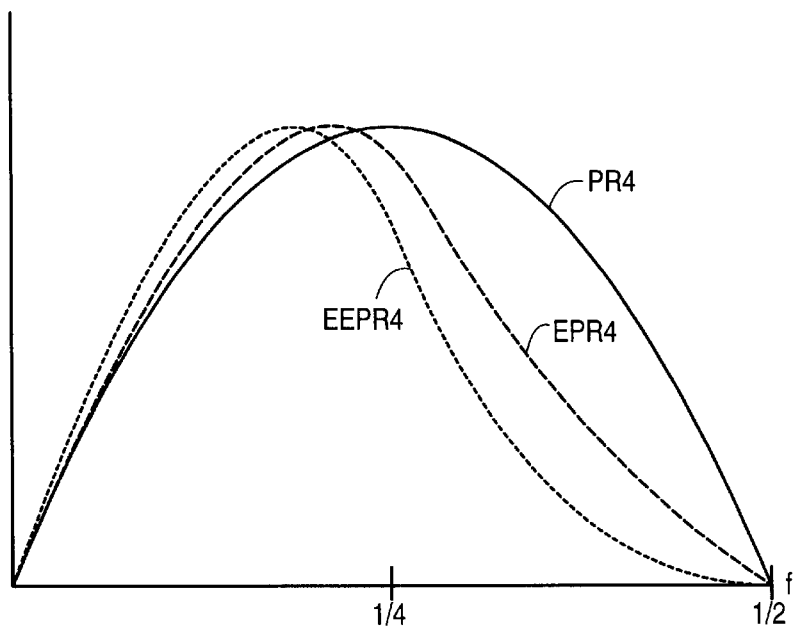
FIG. 1A shows the frequency response for a PR4, EPR4 and EEPR4 read channel.
Figure 1B:
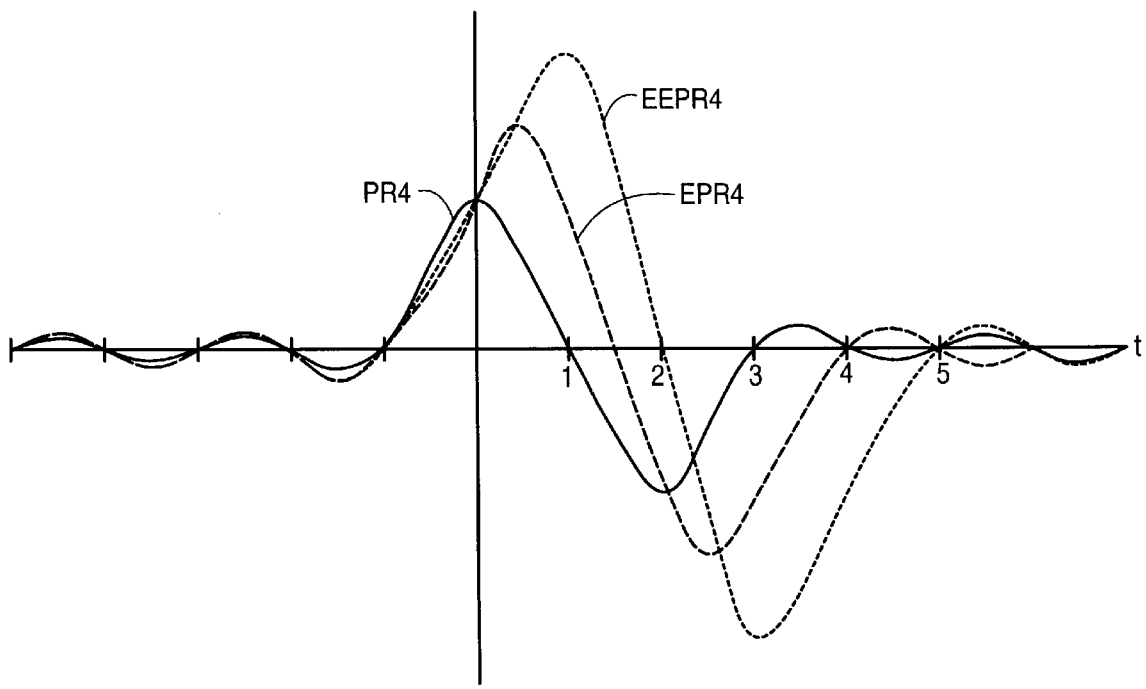
FIG. 1B shows the dipulse responses for the PR4, EPR4 and EEPR4 read channels of FIG. 1A.

When reading the recorded binary sequence from the disk storage medium 42, timing recovery 68 first locks to the write frequency of the zone by selecting, as the input to the read channel, the write clock 56 through a multiplexer 70. Once locked to the write frequency, which is the nominal sampling frequency, the multiplexer 70 selects the signal 72 from the read head as the input to the read channel in order to acquire the acquisition preamble 24 recorded on the disk prior to the recorded user data 28 as shown in FIG. 2B. A variable gain amplifier 62 adjusts the amplitude of the analog read signal 60, and an analog receive filter 61 provides initial equalization toward the desired response as well as attenuating aliasing noise. A sampling device 64 samples the analog read signal 66 from the analog filter 61, and a discrete-time equalizer filter 74 provides further equalization of the sample values 76 toward the desired response. Table 1 shows normalized values for the PR4, EPR4 and EEPR4 dipulse responses of FIG. 1B:

TABLE 1

| Channel | Transfer Function | Dipulse Response |
|---------|-------------------|------------------|
| PR4     | $(1 - D)(1 + D)$    | 0, 1, 0, −1, 0, 0, 0, . . . |
| EPR4    | $(1 - D)(1 + D)^2$  | 0, 1, 1, −1, −1, 0, 0, . . . |
| EEPR4   | $(1 - D)(1 + D)^3$  | 0, 1, 2, 0, −2, −1, 0, . . . |

The discrete-time equalizer filter 74 may be implemented as a real-time adaptive filter which compensates for parameter variations over the disk radius (i.e., zones), disk angle, and environmental conditions such as temperature drift.

After equalization, the equalized sample values $R_k$ 78 are applied to a decision directed gain control 80 and timing recovery 68 circuit for adjusting the amplitude of the read signal 60 and the frequency and phase of the sampling device 64, respectively. Gain control 80 adjusts the gain of variable gain amplifier 62 over line 82 in order to match the magnitude of the channel's frequency response to the desired PR target, and timing recovery 68 adjusts the frequency of sampling device 64 over line 84 in order to synchronize the equalized samples 78 to the baud rate. Frequency synthesizer 54 provides a course center frequency setting to the timing recovery circuit 68 over line 86 in order to center the timing recovery frequency over temperature, voltage, and process variations. An alternative embodiment for synchronizing the read signal samples to the baud rate is to sample the analog read signal 66 asynchronously and to interpolate the asynchronous sample values to synchronous sample values as described in the above referenced U.S. Pat. No. 5,771,127, "A SAMPLED AMPLITUDE READ CHANNEL EMPLOYING INTERPOLATED TIMING RECOVERY AND A REMOD/DEMOD SEQUENCE DETECTOR."

The sampling device 64 is shown in FIG. 3 as an analog-to-digital (A/D) converter. However, those skilled in the art understand that the sampling device 64 could be a simple sample and hold circuit for converting the analog read signal 66 into a sequence of discrete-time analog samples, and the downstream circuitry, such as the discrete-time equalizer filter 74, timing recovery 68, gain control 80, etc., could be implemented using conventional discrete-time analog (DTA) circuitry. In an alternative embodiment the read channel could be implemented using a hybrid of DTA and digital circuits; for example, the discrete-time equalizer filter 74 could be implemented using DTA, the equalized sample values 78 converted to digital values, and the sequence detector 88 implemented using digital circuitry.

In one embodiment of the present invention the discrete-time equalizer 74 equalizes the sample values 76 into a PR4 response so that a simple slicer circuit (not shown) can generate estimated sample values for use in the timing recovery 68 and gain control 80 decision-directed feedback loops. The PR4 equalized samples 78 are then passed through a target filter (see FIG. 10A) to generate target samples according to the PR target of the trellis sequence detector 88. For implementation details concerning various alternative embodiments for sample value estimation for timing recovery 68 and gain control 80, see the above referenced U.S. Pat. No. 5,585,975, "EQUALIZATION FOR SAMPLE VALUE ESTIMATION AND SEQUENCE DETECTION IN A SAMPLED AMPLITUDE READ CHANNEL."

The synchronous, equalized channel samples 78 are ultimately input into a trellis sequence detector 88 which detects a preliminary sequence $\hat{b}(n)$ 90 from the channel samples 78. A post processor 95 processes the preliminary sequence $\hat{b}(n)$ 90 and the channel samples 78 to detect and correct the most likely errors made by the trellis sequence detector 88. In one embodiment, the post processor 95 comprises a sample error filter to effectively whiten the noise in the read signal which provides a performance enhancing gain by compensating for the noise correlating effect of the channel equalizers. In an alternative embodiment, the post processor 95 is responsive to a high rate error detection convolution code directed at detecting several dominant error events of the trellis sequence detector 88. As described in greater detail below, the post processor 95 makes a first pass over the preliminary sequence $\hat{b}(n)$ 90 to correct errors caused by the noise correlating effect of the channel equalizers, and then corrects residual errors using the error detection convolution code.

The corrected binary sequence 97 output by the post processor 95 is decoded by a channel decoder 92 which implements the inverse operation of the channel encoder 36 to thereby generate an estimated user data sequence 94. A data sync detector 96 detects the sync mark 26 (shown in FIG. 2B) in the data sector 16 in order to frame operation of the post processor 95 and channel decoder 92. In one embodiment described below, the sync mark detector 96 detects the sync mark 26 early by processing an estimated data sequence 93 output four bits prior to the end of the path memory in the trellis sequence detector 88. A detailed description of the trellis sequence detector 88 and post processor 95, including the performance enhancing aspects of the sample error filter and error detection convolution code, is provided in the following sections.

Trellis Sequence Detector

Figure 4A:
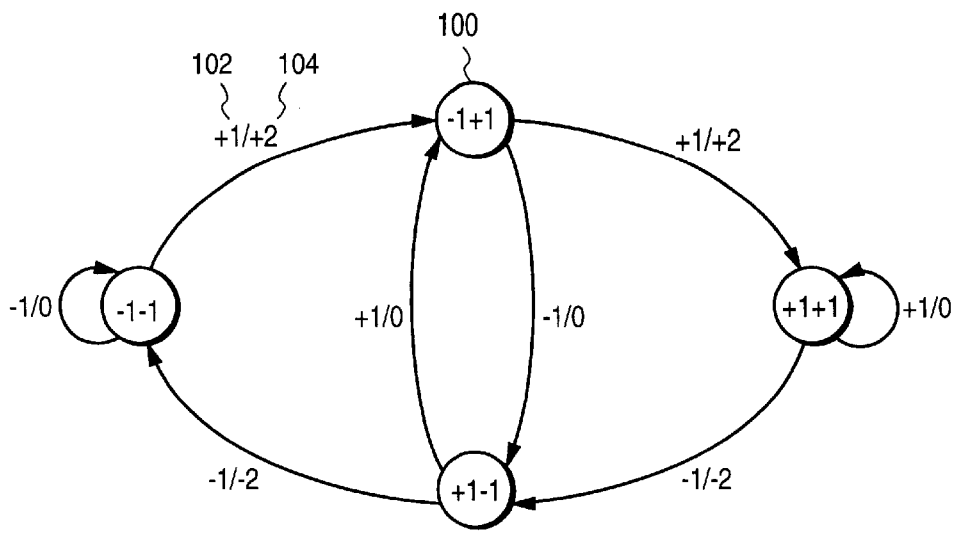
FIG. 4A is a state transition diagram for a PR4 sequence detector.

The general operation of the trellis sequence detector 88 shown in FIG. 3 is understood from the state transition diagram for a simple PR4 sequence detector shown in FIG. 4A. Each state 100 is represented by the last two input symbols in the NRZ domain (a "1" bit corresponds to a positive write current and a "0" bit corresponds to a negative write current), and each branch from one state to another is labeled with the current input symbol in NRZ 102 and the corresponding sample value 104 it will produce during readback. The demodulation process of the PR4 sequence detector is understood by representing the state transition diagram of FIG. 4A as a trellis diagram shown in FIG. 4B. The trellis diagram represents a time sequence of sample values and the possible recorded input sequences that could have produced the sample sequence. For each possible input sequence, an error metric is computed relative to a difference between the sequence of expected sample values that would have been generated in a noiseless system and the actual sample values output by the channel. For instance, a Euclidean metric is computed as the accumulated square difference between the expected and actual sample values. The input sequence that generates the smallest Euclidean metric is the most likely sequence to have created the actual sample values because it is the "closest" valid sequence to the actual sample values; this sequence is therefore selected as the output of the sequence detector.

To facilitate the demodulation process, the sequence detector comprises path memories for storing each of the possible input sequences and a corresponding metric. A well known property of the sequence detector is that the paths storing the possible input sequences will "merge" into a most likely input sequence after a certain number of sample values are processed, as long as the input sequence is appropriately constrained through use of a channel code. In fact, the maximum number of path memories needed equals the number of states in the trellis diagram; the most likely input sequence will always be represented by one of these paths, and these paths will eventually merge into one path (i.e., the most likely input sequence) after a certain number of sample values are processed.

Figure 4B:
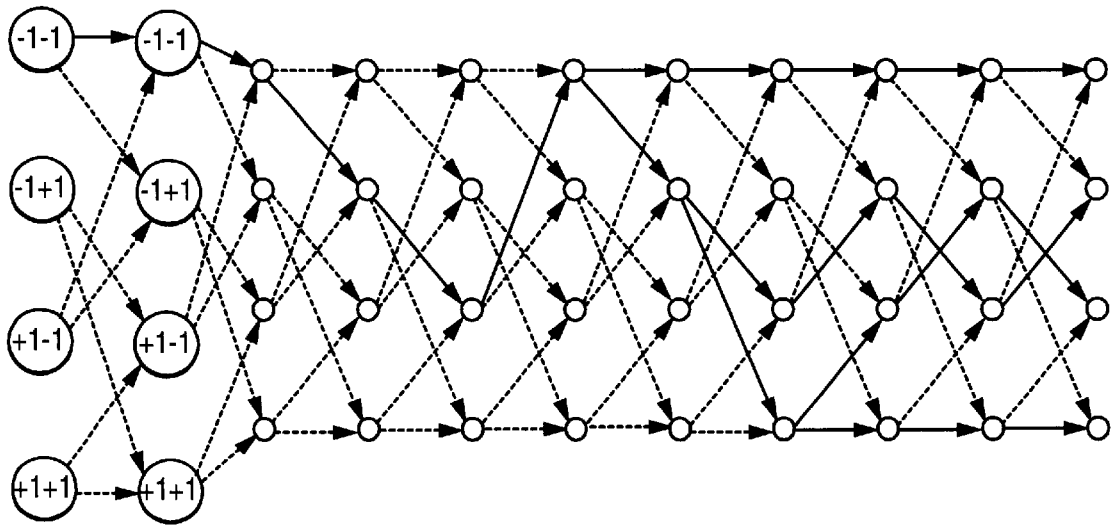
FIG. 4B is a trellis diagram corresponding to the PR4 state transition diagram of FIG. 4A showing the path memory and survivor sequence for a given input sequence.

The "merging" of path memories is understood from the trellis diagram of FIG. 4B where the "survivor" sequences are represented as solid lines. Notice that each state in the trellis diagram can be reached from one of two states; that is, there are two transition branches leading to each state. With each new sample value, the Viterbi algorithm recursively computes a new error metric and retains a single survivor sequence for each state corresponding to the minimum error metric. In other words, the Viterbi algorithm will select one of the two input branches into each state since only one of the branches will correspond to the minimum error metric, and the paths through the trellis corresponding to the branches not selected will merge into the paths that were selected. Eventually, all of the survivor sequences will merge into one path through the trellis which represents the most likely estimated data sequence to have generated the sample values as shown in FIG. 4B.

In some cases, if the input sequence is not appropriately constrained through the use of a channel code, the path memories will not merge into one survivor sequence. Consider the PR4 trellis shown in FIG. 4B; an input sequence of all zeros or all ones will prevent the paths from merging which leads to multiple possible survivor sequences output by the detector. Data sequences which prevent the path memories from merging are referred to as "quasi-catastrophic" data sequences since they result in quasi-catastrophic errors in the output sequence. In order to avoid quasi-catastrophic errors, a channel code is typically employed which codes out of the recorded data all sequences which can prevent the path memories from merging.

Even if the quasi-catastrophic data sequences are coded out of the input sequence, the sequence detector can still make an error in detecting the output sequence if enough destructive noise is present in the read signal. The possible output sequences are different from one another by a minimum Euclidean distance; a detection error typically occurs when the signal noise breaches this minimum distance between valid output sequences. A minimum distance error event can occur where the data sequences diverge from a particular state in the trellis and then remerge at a later state. In a perfect system, all of the minimum distance error events will occur with equal probability. However, because the channel equalizers correlate the noise in the read signal samples, the minimum length, minimum distance error events are more likely to occur. Further, depending on the partial response polynomial and recording density employed, error events other than the minimum distance error events may become the most dominant.

An increase in performance can be achieved by employing a channel code to code out data sequences associated with the minimum distance error events (similar to coding out the quasi-catastrophic data sequences), and then to match the sequence detector to this channel code using conventional trellis coded modulation (TCM) techniques. For example, the minimum distance error events of a PR4 sequence detector can be coded out by removing the bit sequences consisting of (1,0,1) or (0,1,0) from the input sequence. The state machine of a PR4 sequence detector can then be matched to this code constraint by removing the inner branches shown in FIG. 4A. With these branches removed, the minimum distance of the PR4 sequence detector increases from $dmin^2=2$ to $dmin^2=4$ (with the signal samples normalized to +1, 0, −1).

Although matching the trellis state machine to a channel code constraint often provides a significant increase in detector performance, there are certain drawbacks. For instance, employing a simple RLL d=1 constraint to code out the inner branches of the PR4 state machine shown in FIG. 4A typically requires a code rate of ⅔ which is a significant reduction in bandwidth. More complex let channel codes with higher code rates can be employed, but this usually increases, significantly, the cost and complexity of matching the state machine of the trellis sequence detector to the code constraint. One aspect of the present invention, then, is to employ a high rate channel code and a post processor 95 which approximate the performance enhancing gain provided by matching the trellis state machine to the channel code constraint, but with a significant reduction in cost and complexity.

Another aspect of the present invention is to attenuate the noise correlating effect of the channel equalizers described above which also degrades the performance of the trellis sequence detector 88 which is a maximum likelihood detector only if the signal noise is white (statistically independent) with a Gaussian probability distribution. Furthermore, the amount of equalization required and the degree of correlation varies depending on the PR target and the channel density employed. In one embodiment of the present invention, the trellis sequence detector 88 is matched to a special "2,2,1" PR target having a dipulse response of:

( . . . , 0,0,+2,+2,−1,−2,−1,0,0, . . . )

which requires less equalization to match the recording channel's response to the corresponding PR target.

Figure 5:
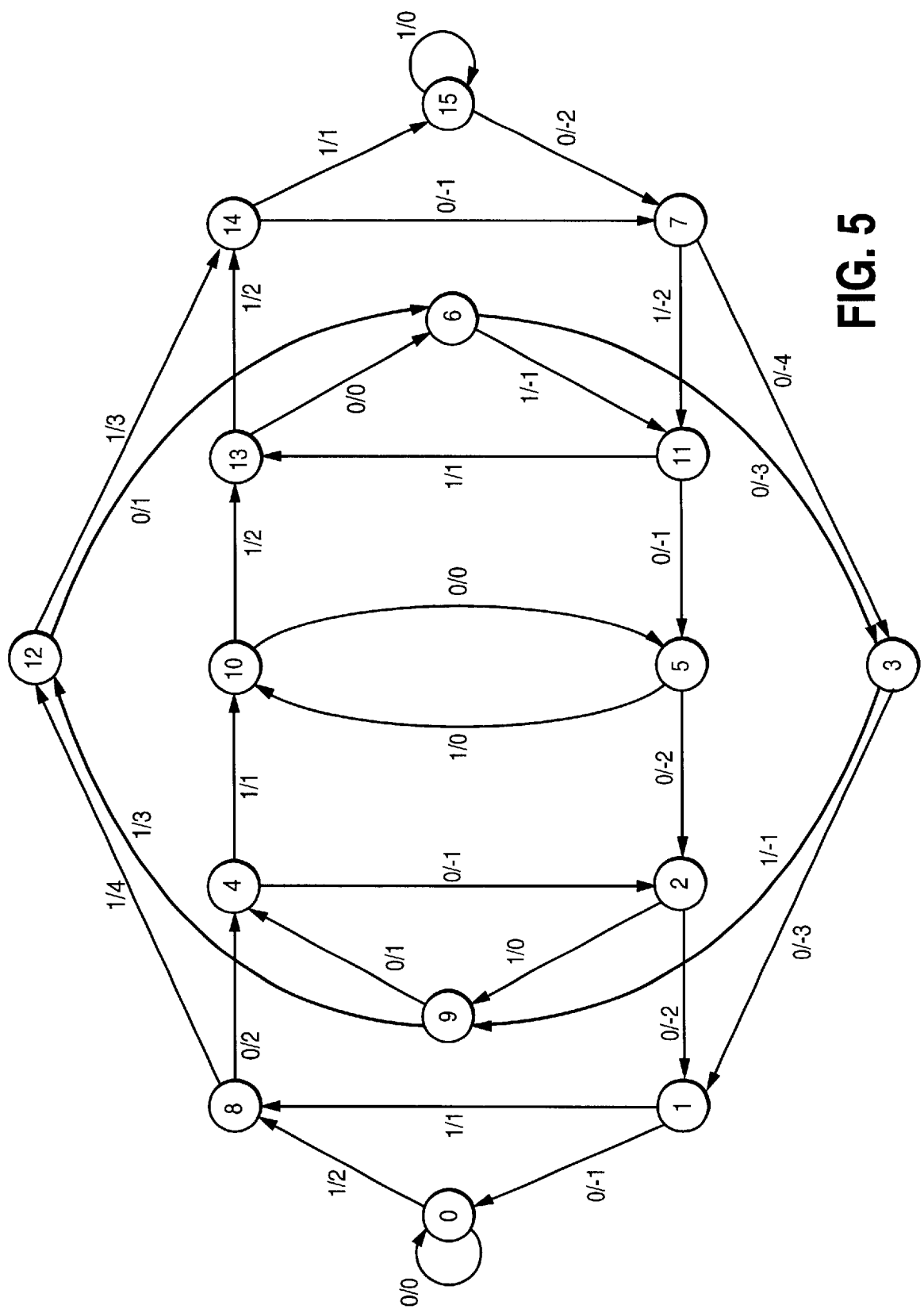
FIG. 5 is a state transition diagram for a "2,2,1" trellis sequence detector according to one embodiment of the present invention.

The state transition diagram for a trellis sequence detector matched to a "2,2,1" PR target is shown in FIG. 5. Those skilled in the art understand how to implement a trellis sequence detector (e.g., a Viterbi sequence detector) from this state transition diagram. An example implementation of a Viterbi sequence detector is disclosed in the above referenced U.S. Pat. No. 5,291,499, "METHOD AND APPARATUS FOR REDUCED-COMPLEXITY VITERBI-TYPE SEQUENCE IT DETECTORS." The state transition branches are labeled in FIG. 5 such that the preliminary sequence 90 output by the trellis sequence detector 88 is in the NRZ domain. The post processor 95 corrects the preliminary sequence 90 and outputs a corrected sequence 97 in the NRZI domain for decoding by the channel decoder 92. Implementation details concerning the channel encoder 36 and channel decoder 92, including the preferred method for encoding the error detection convolution code check bits, are disclosed in the following section.

Channel Encoder/Decoder

Figure 6A:
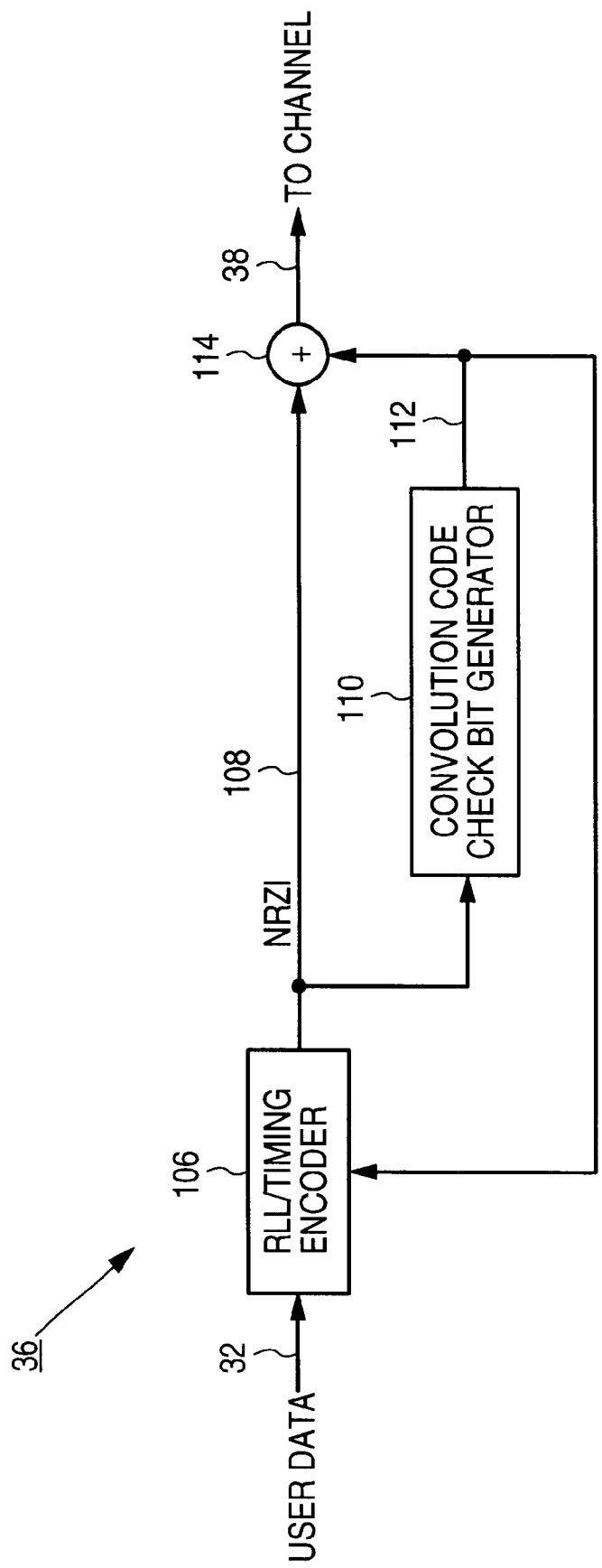
FIG. 6A shows a block diagram of the components which constitute a suitable channel encoder for the channel encoder shown in FIG. 3.

A block diagram showing a suitable channel encoder 36 for use in encoding the user data 32 input into the read channel of FIG. 3 is shown in FIG. 6A. An RLL/timing encoder 106 first encodes the user data 32 to encode a run-length limit (RLL) constraint on the number of consecutive zero bits to facilitate optimal timing recovery and gain control. The RLL/timing encoder 106 also encodes the user data in order to optimize the phase error estimate generated by the phase locked loop (PLL) in the timing recovery circuit 68 of FIG. 3. Details concerning how the RLL/timing encoder 106 improves the phase error estimate are disclosed in the above referenced U.S. Pat. No. 5,838,738, "CODING TO IMPROVE TIMING RECOVERY IN A SAMPLED AMPLITUDE READ CHANNEL."

The RLL/timing encoder 106 encodes m bits of user data bits into n bits of an RLL codeword 108, which in the embodiment disclosed herein is 24 user data bits encoded into a 25-bit RLL codeword 108. The bits of the RLL codeword 108 are in the NRZI domain which means each "1" bit represents a medium transition and each "0" bit represents no transition. A convolution code check bit generator 110 processes the bits of two consecutive RLL codewords 108 to generate a check bit 112 according to a convolution code described in greater detail below. The check bit 112 is appended to the two 25-bit RLL codewords 108 (conceptually shown using an adder 114) to form a 51 bit convolution code codeword 38 written to the disk storage medium through the NRZI modulator 40 of FIG. 3.

Figure 6B:
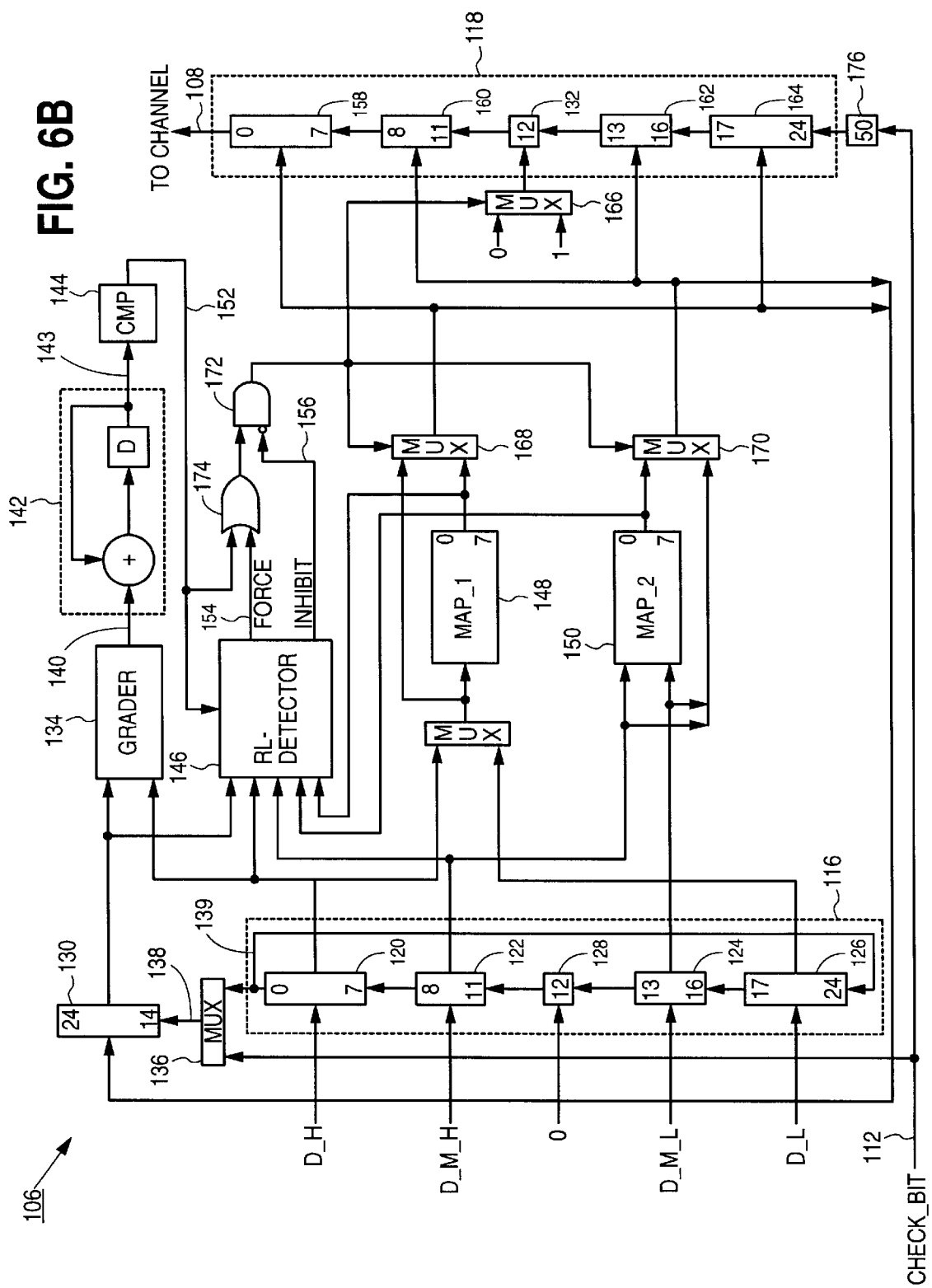
FIG. 6B is a block diagram of the RLL/timing encoder of FIG. 6A for encoding the user data according to a run-length limit (RLL) and optimal timing constraint together with the check bits generated by the convolution code check bit generator of FIG. 6A.

Details of the RLL/timing encoder 106 of FIG. 6A are shown in FIG. 6B. A 24-bit block of user data 32 is loaded into a shift register 116 for encoding into a 25-bit block RLL/timing codeword stored in register 118. The 24-bit input block is divided into three bytes: a high byte D_H, a medium byte D_M, and a low byte D_L. The high byte D_H is stored in register 120, the most significant nibble of the medium byte D_M_H is stored in register 122, the least significant nibble of the medium byte D_M_L is stored in register 124, and the low byte D_L is stored in register 126. A "0" bit is loaded into register 128 in between the D_M_H and D_M_L nibbles to form a 25-bit input block. The most significant 11 bits of the previously encoded 25-bit output codeword are loaded into shift register 130.

The "middle bit" of the 25-bit input block (in register 128), which corresponds to the middle bit of the output codeword (in register 132), indicates whether or not the 25-bit output codeword is mapped, or unmapped as explained below. Placing a "0" in the middle bit (register 128) specifies that the default status for the output codeword is "unmapped." Whether the 25-bit input block is actually mapped into a different 25-bit output codeword depends on the quality of the phase error estimate that the unmapped codeword will generate during read back.

Thus, the encoding process is carried out in two steps. First, a grader 134 grades each bit of the 25-bit input codeword stored in shift register 116 in order evaluate the quality of the phase error estimate that it will generate upon read back. As the 25-bit input block is shifted through shift register 116, the grader 134 grades each bit 138 by evaluating the sequence of bits stored in register 120 and register 130, and outputs a grade value 140. During the grading procedure, a multiplexer 136 selects the output 139 of the shift register 116 as the input into shift register 130. The output 139 of shift register 116 is also shifted back into the input of the shift register 116 so that after the grading procedure, the 25-bit input block is restored to shift register 116.

Figures 6C, 6D:
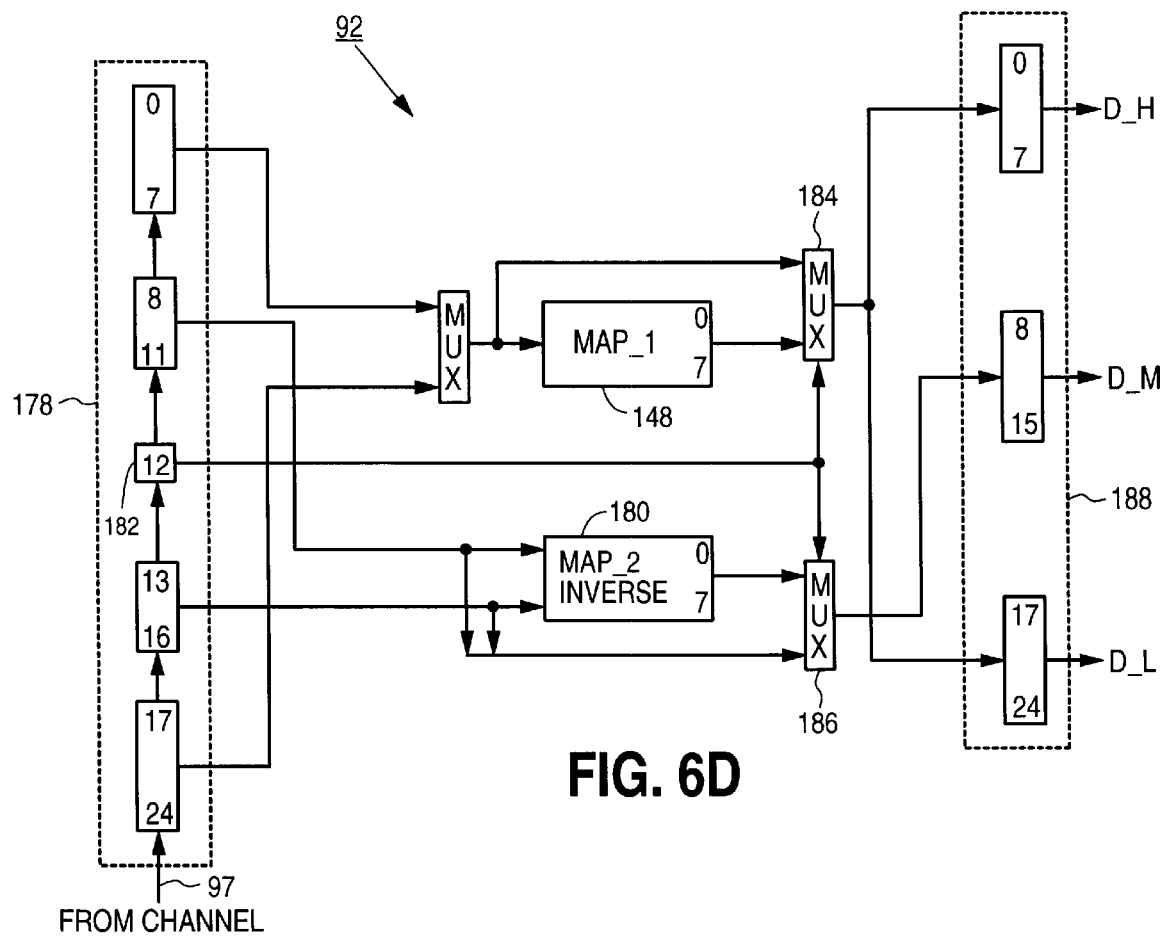
FIG. 6C is a table used by the grader in the RLL/timing encoder of FIG. 6B.
FIG. 6D illustrates a suitable channel decoder for implementing the inverse operation of the channel encoder of FIG. 3 in order to decode the detected data during a read operation.

The grade value 140 for each bit 138 of the 25-bit input block is generated according to the table shown in FIG. 6C. For the bit sequences which provide the best phase error estimates, FIG. 6C shows a grade value associated with a corresponding bit being graded designated by the arrows in the table header. That is, the grader 134 in FIG. 6B evaluates the bit being graded 138 in context with the surrounding bits. If there is a match between the input sequence and one of the sequences in FIG. 6C, then the grader 134 outputs the corresponding grade value 140 for the graded bit; otherwise, the grader 134 outputs a grade of zero.

Consider, for example, a previous codeword and a current input block, previous | current codeword | input block

. . . XXX01101|1100101100111011 . . .

The grader 134 of FIG. 6B would output a bit grade of 2 for the first bit of the current input block because it is the third bit in the sequence 01110 in row 6 of FIG. 6C. A grade of 2 would be output for the second bit because it is the fourth bit in the sequence 01110 in row 6 of FIG. 6C, a grade of 0 would be output for the third bit because it does not match any of the rows in FIG. 6C, a grade of 2 would be assigned to the fourth bit because it matches the sequence in row 1, etc.

A match is found only if the sequence in FIG. 6C does not extend beyond the current codeword. For example, when grading bit 24 of the current codeword, only the third column in row 3 and the first column of rows 10 and 11 in FIG. 6C are used since all other sequences will extend out beyond the end of the current input block. Furthermore, the last row in FIG. 6C is used to grade bits 21–24 of the current input block in the event that no other matches are found.

The bit grades 140 output by the grader 134 are accumulated in accumulator 142, and the accumulated grade 143 is compared to a threshold (e.g., 29) at comparator 144. If the grade 143 exceeds the threshold, it means the 25-bit input block 116 will generate an adequate phase error estimate during read back and therefore it should not be mapped into a different 25-bit output codeword (unless the RL-detector 146 forces a mapping as described below). If the grade 143 does not exceed the threshold, it means the 25-bit input block 116 will generate a poor phase error estimate during read back and therefore it should be mapped into a different 25-bit output codeword (unless the RL-detector 146 inhibits the mapping as described below).

The mapping of the 25-bit input block is carried out using two 8-to-8 lookup tables shown in FIG. 6B: MAP_1 148 and MAP_2 150. If the output 152 of comparator 144 indicates the 25-bit input block should be mapped or a FORCE signal 154 generated by the RL-detector 146 is active, and an INHIBIT signal 156 generated by the RL-detector 146 is inactive, then the 25-bit input block stored in shift register 116 is mapped according to the following procedure. The D_H input byte stored in register 120 is mapped by MAP_1 148 and the mapped byte loaded into register 158, the D_M_H and D_M_L input nibbles are mapped by MAP_2 150 and the mapped nibbles loaded into registers 160 and 162, and the D_L input byte is mapped by MAP_1 150 and loaded into register 164. The table lookup values for MAP_1 150 are listed below in Table 2, and the table lookup values for MAP_2 152 are listed below in Table 3. The most significant bit (left most bit) of each entry in Tables 2 and 3 correspond to the least significant bit in each register of the output shift register 118. For example, the left most bit of each entry in Table 2 is loaded into bit 0 of register 158 when mapping the D_H input byte, and it is loaded into bit 17 of register 164 when mapping the D_L input byte. Register 132 of the output shift register 118 is loaded with a "1" bit via multiplexer 166 to indicate that the output codeword was mapped.

If the 25-bit input block is not mapped, then it is simply loaded into the respective registers of the output shift register 118 via multiplexers 168 and 170, and register 132 of the output shift register 118 is loaded with a "0" bit via multiplexer 166 to indicate that the output codeword was not mapped.

In addition to encoding the user data to provide optimal phase error estimates during read back, the RLL/timing encoder 106 of FIG. 6B also encodes the user data according to a run-length limit (RLL). constraint which limits the maximum number of consecutive non-zero sample values (in PR4 space). This constraint is necessary to ensure proper timing recovery and gain control since timing and gain information is derived only when non-zero sample values are processed. Preferably, the RLL/timing encoder 106 encodes the user data so that the number consecutive zero samples (in PR4 space) in the recorded output sequence does not exceed 22. Also, to minimize the length of the quasi-catastrophic error events, the user data is encoded so that there are no runs of 12 or more consecutive zero samples in either interleave beginning with bit 14 of the previous codeword and extending to bit 22 of the next codeword (mapped or unmapped), so that the next codeword does not end in 7 or more zero samples in the interleave ending in bit 24, and so that the next codeword does not end in 6 or more zero samples in the interleave ending in bit 23.

The RLL constraints are satisfied by the RL-detector 146 of FIG. 6B forcing or inhibiting the mapping of the 25-bit input block. In other words, if the grading indicates that the input block should be mapped but the mapped codeword will not satisfy the RLL constraints, then the RL-detector 146 activates the INHIBIT signal 156 to inhibit the mapping via AND gate 172. Conversely, if the grading indicates that the input block should not be mapped but the unmapped codeword will not satisfy the RLL constraints, then the RL-detector 146 activates the FORCE signal 154 to force mapping via OR gate 174 and AND gate 172.

The RL-detector 146 evaluates the potential output codewords (mapped and unmapped) appended to the 11 bits of the previous output codeword (in register 130) to determine whether the RLL constraints will be violated. Since the RLL constraints are evaluated in the PR4 space, the RL-detector 146 converts the data sequences into the PR4 domain by passing the sequences through a (1+D) filter. A pseudo code listing executed by the RL-detector 146 in order to generate the FORCE signal 154 and the INHIBIT signal 156 is attached hereto as Appendix A.

The check bit 112 generated by the convolution code check bit generator 110 of FIG. 6A is loaded into register 176 and appended to every other output codeword in register 118 to form 51-bit convolution code codewords recorded to the disk. The check bit 112 is also loaded into register 130 via multiplexer 136 to facilitate the grading and RLL checking described above.

During read back, the NRZI data 97 generated by the post processor 95 are decoded by the channel decoder 92 of FIG. 3, the details for which are shown in FIG. 6D. The check bits 112 appended to the codewords to implement the error detection convolution code have been stripped from the codewords prior to decoding by the channel decoder 92. Thus, the 25-bit codewords are shifted into a 25-bit shift register 178 and then decoded using two lookup tables: MAP_1 148 and MAP_2 INVERSE 180. The MAP_1 148 lookup table is the same as the MAP_1 148 lookup table in the encoder 106 of FIG. 6B; in other words, MAP_1 148 is its own inverse. The MAP_2 INVERSE 180 lookup table implements the inverse mapping for the MAP_2 150 lookup table in the encoder 106 of FIG. 6B, the values for which are listed below in Table 4. When the middle bit 182 of the 25-bit codeword indicates that the codeword was mapped by the encoder 106, then the MAP_1 148 lookup table decodes the first and third byte of the codeword stored in register 178, and the MAP_2 INVERSE 180 decodes the middle byte of the codeword stored in register 178. If the middle bit 182 of the codeword indicates that the codeword was not mapped by the encoder 106, then the codeword is simply passed through multiplexers 184 and 186 (without the middle bit) to the 24-bit output register 188 (i.e., no decoding in necessary).

Convolution Code Encoder

Figure 7:
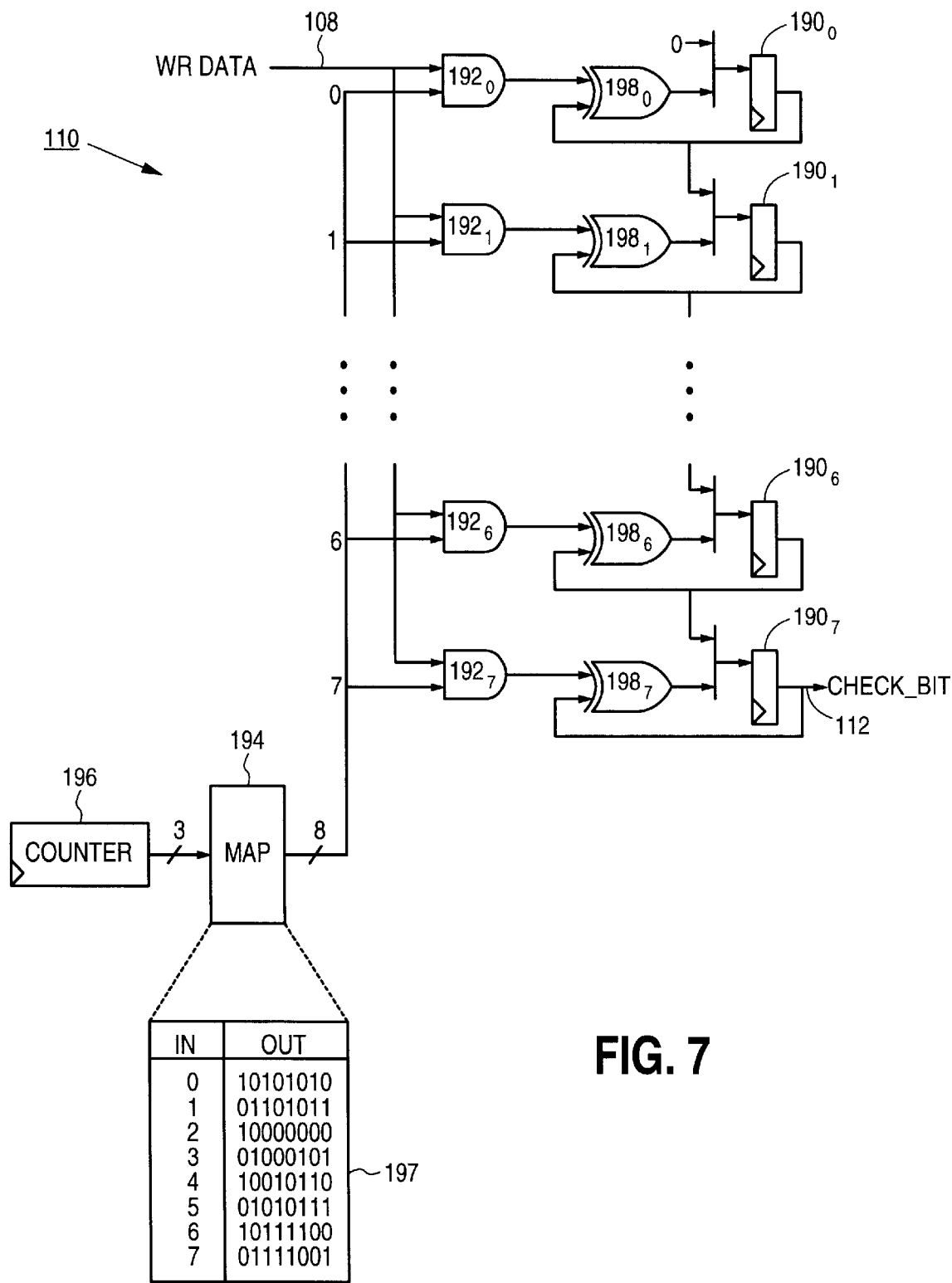
FIG. 7 illustrates a suitable convolution code check bit generator for encoding the data according to a convolution code directed at the dominant error events of the trellis sequence detector of FIG. 3.

Details of the convolution code check bit generator 110 of FIG. 6A are shown in FIG. 7. The convolution code check bit generator 110 is initialized at the beginning of a data sector 16 (FIG. 2A) by resetting registers $190_0$–$190_7$. Thereafter, the write data 108 from the 25-bit codewords generated by the RLL/timing encoder 106 of FIG. 6A are applied serially, one bit at a time, to AND gates $192_0$–$192_7$. On each clock cycle, a MAP circuit 194 outputs an 8-bit value which is applied to the other input of AND gates $192_0$–$192_7$. The least significant (right most) bit in the MAP circuit 194 corresponds to bit 0 and is applied to AND gate $192_0$, the next bit is applied to AND gate $192_1$, and so on. The MAP circuit 194 is indexed by the output of a 3-bit counter 196 which increments on each clock cycle in order to cycle through the 8-bit values 197 stored in the MAP circuit 194. The output of AND gates $192_0$–$192_7$ are applied to XOR gates $198_0$–$198_7$ together with the output of the respective registers $190_0$–$190_7$, and the result of the XOR is restored to the respective registers $190_0$–$190_7$.

The convolution code check bit generator 110 is clocked 50 times to process two consecutive 25-bit codewords output by the RLL/timing encoder 106 of FIG. 6A. On the 51st clock cycle, the CHECK_BIT 112 at the output of register $190_7$ is then appended to the two 25-bit codewords to form a 51 bit convolution code codeword written to the disk storage medium. Also on the 51st clock cycle, the contents of registers $190_0$–$190_7$ are shifted down one; that is, the content of register $190_0$ is loaded into register $190_1$, the content of register $190_1$ is loaded into register $190_2$, and so on. This process continues until the entire data sector 16 has been encoded and written to the disk.

Because the CHECK_BITS 112 are generated by encoding the input data 108 as a continuous stream, the encoder of FIG. 7 implements a convolution code. Notice that each CHECK_BIT 112 is a function of at most eight consecutive 50-bit input codewords. For example, the eighth CHECK_BIT 112 is a function of the 0–7 input codewords, the ninth CHECK_BIT 112 is a function of the 1–8 codewords, and so on. As explained in greater detail below, during read back an error syndrome associated with several consecutive 50-bit codewords are generated and evaluated by the post processor 95 to detect a plurality of dominant error events made by the trellis sequence detector 88 in a current 50-bit codeword. Thus, an error detection convolution code is very efficient (rate 48/51 in the embodiment disclosed herein) capable of detecting significantly more error events associated with the trellis sequence detector 88 as compared to the simple parity error detection code employed in previous designs.

Post Processor Overview

Figure 8:
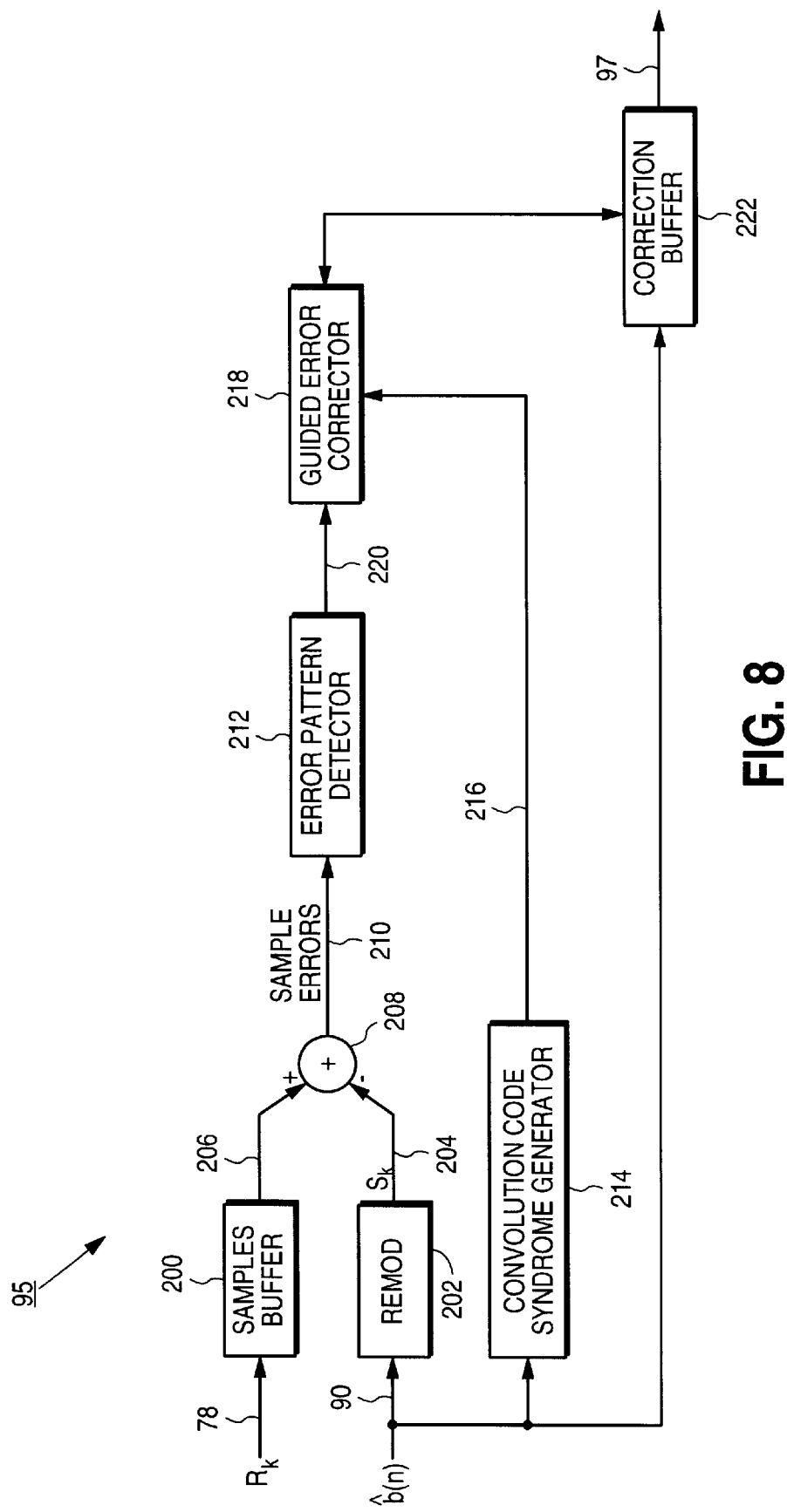
FIG. 8 is a block diagram for one embodiment of the post processor of FIG. 3 comprising a convolutional code syndrome generator for generating an error syndrome processed by a guided error corrector which corrects errors in the preliminary sequence output by the trellis sequence detector.

An overview of a post processor 95 which operates according to the error detection convolution code aspect of the present invention is shown in FIG. 8. The read signal sample values $R_k$ 78 are stored in a samples buffer 200 to account for the delay in the trellis sequence detector 88 of FIG. 3. A remodulator 202 remodulates the preliminary sequence 90 detected by the trellis sequence detector 88 into a sequence of estimated sample values $S_k$ 204 of a PR target (e.g., a PR4 target). The estimated sample values $S_k$ 204 are then subtracted from the delayed read signal sample values 206 at adder 208 to form a sequence of sample errors 210. The sample errors 210 are then processed by an error pattern detector 212 which detects a plurality of dominant error events associated with the trellis sequence detector 88. A convolution code syndrome generator 214 processes the preliminary sequence 90 detected by the trellis sequence detector 88, including the encoded CHECK_BITS 112, to generate an error syndrome 216 according to the convolution code described above. When the error syndrome 216 indicates the presence of an error in the preliminary sequence 90, a guided error corrector 218 corrects the most likely error event 220 detected by the error pattern detector 212 that is consistent with the error syndrome 216 as well as the RLL constraints described above. A correction buffer 222 stores the preliminary sequence 90 to facilitate the correction process. The corrected sequence 97 is then transferred out of the correction buffer 222 for decoding by the channel decoder 92 of FIG. 3.

Figure 9:
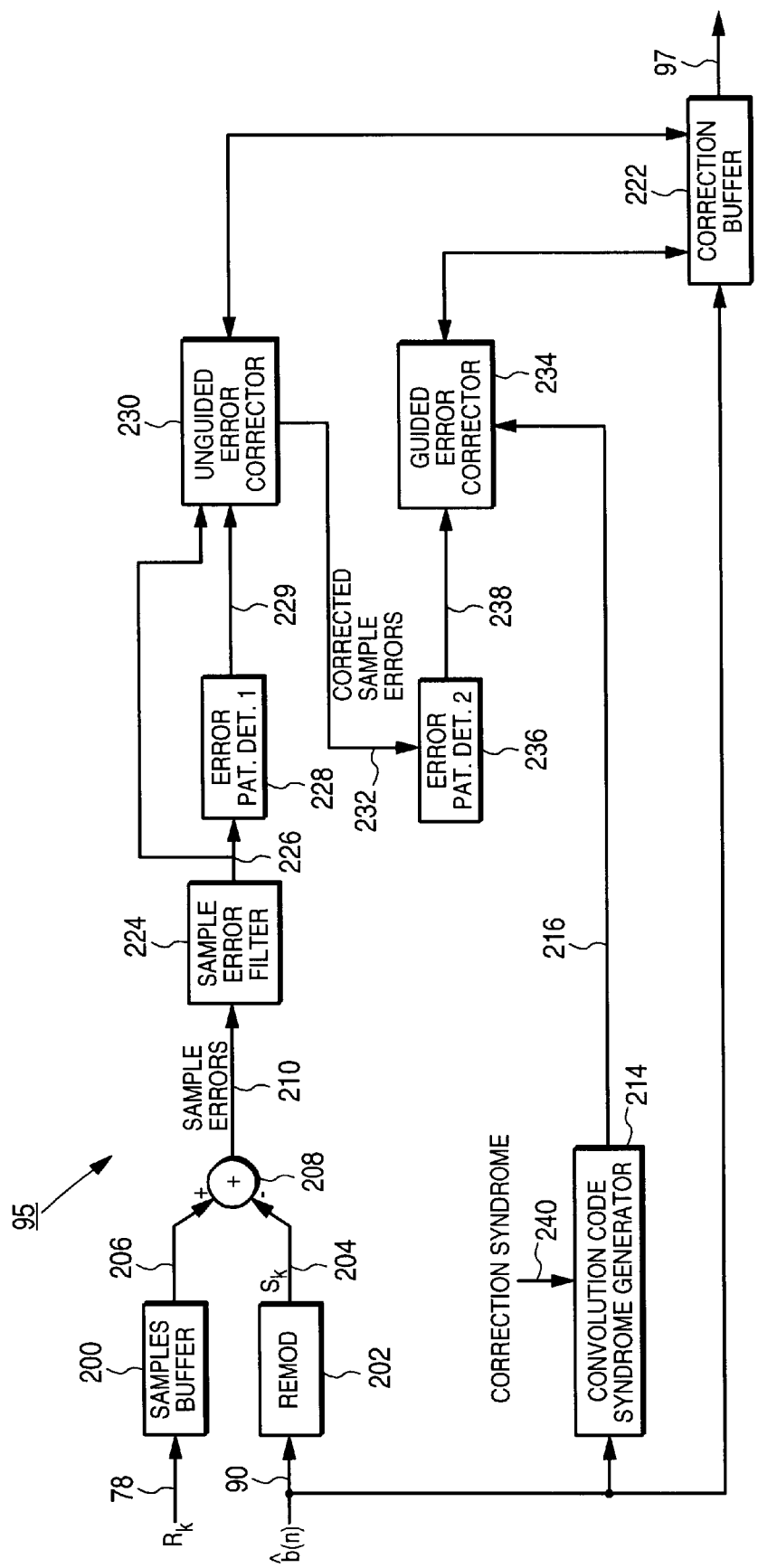
FIG. 9 shows an alternative embodiment for the post processor of FIG. 3 comprising a sample error filter for correcting errors in the preliminary sequence in an unguided mode, followed by a guided error corrector which corrects errors using the convolution code error syndrome.

Referring to FIG. 9, the post processor 95 of FIG. 8 may be optionally augmented by a sample error filter 224 which effectively whitens the noise in the read signal samples 78 after equalization to compensate for the noise correlating effect of the channel equalizers. The filtered sample errors 226 are processed by a first error pattern detector 228 which detects error events that will reduce the Euclidean distance between a corrected data sequence and a valid output sequence as compared to the preliminary sequence 90 originally detected by the trellis sequence detector 88. The detected error events 229 are then used to correct the preliminary sequence 90 as well as the filtered sample error sequence 226. The corrections are performed by an unguided error corrector 230 which verifies that the corrections are consistent with the RLL constraints before making the corrections. In effect, the post processor 95 better approximates a true ML detector by detecting (i.e., correcting) the estimated data sequence in whitened noise.

After correcting all of the error events that will result in a reduction of the Euclidean distance, residual errors detected by the error syndrome 216 of the error detection convolution code are corrected by a guided error corrector 234. A second error pattern detector 236 processes the corrected sample error sequence 232 to again detect a plurality of dominant error events 238 associated with the trellis sequence detector 88 which are consistent with errors detectable by the error detection convolution code. The guided error corrector 234 then corrects the detected error event 238 that will minimize the Euclidean distance as well as satisfy the RLL constraints.

A correction syndrome 240 corresponding to the corrections made to the preliminary sequence 90 by the unguided error corrector 230 are processed by the convolution code syndrome generator 214 to update the error syndrome 216 of the convolution code before processing by the guided error corrector 234.

A mathematical basis for the sample error filter 224 and error pattern detectors 228 and 236 of FIG. 9 is provided next to better understand their operation. The noise component of the read signal 60 at the input to the read channel is substantially white, but then it is correlated by the analog receive filter 61 and the discrete equalizer filter 74 of FIG. 3. With the combined transfer function of these filters represented as $$G(e^{j\omega t})$$

then the noise in the read signal at the output of these filters can be whitened by passing the read signal through a noise whitening filter with a transfer function that is the inverse of the equalizers' transfer function $$H(e^{j\omega t})=G^{-1}(e^{j\omega t}).$$

Of course, the read signal has already been sampled at the output of the discrete equalizer 74, so the noise whitening filter would be implemented in discrete time with a transfer function $$H(e^{jk\theta})$$

and having a discrete impulse response $h_k$. Alternatively, the noise could be extracted from the read signal and then passed through a noise whitening filter. In the latter embodiment, the noise whitening filter is not necessarily the inverse of the channel equalizer filters.

The noise sequence $n_k$ can be extracted from the read signal by remodulating the preliminary sequence output by the trellis sequence detector 88 into an estimated sample sequence $S_k$ in the partial response domain, and then subtracting the remodulated estimated sample sequence $S_k$ from the actual read signal samples 78 $R_k$ $$n_k=R_k-S_k.$$

The above sample error or noise sequence $n_k$ will be accurate as long as the trellis sequence detector 88 does not make a detection error. Assuming, however, that the sequence detector 88 makes a detection error due to the noise correlating effect of the channel equalizers, then the correct sample sequence $T_k$ can be represented by $$T_k=S_k+E_k$$

where $E_k$ is the sample error sequence that, when added to the detected sample sequence $S_k$, generates the correct sample sequence $T_k$. Combining the above equations leads to $$T_k-R_k=S_k+E_k-n_k-S_k=E_k-n_k$$

where $T_k-R_k$ represents the sample error sequence or difference between the received (noise correlated) sample sequence $R_k$ and the correct sample sequence $T_k$.

As described above, the function of the trellis sequence detector 88 is to minimize the sum of the squared errors in selecting the most likely sequence associated with the received signal samples; however, because the noise in the read signal has been correlated by the channel equalizers, the trellis detector at times selects the wrong sequence. An aspect of the present invention, then, is to employ a post processor 95 that effectively whitens the sample error sequence between the received (noise correlated) sample sequence 78 and corrected sample sequences assuming that the sequence detector 88 has made a particular error. The whitened noise sequence is then evaluated by the post processor 95 to determine if the corrected sample sequence is closer to the noise-whitened signal samples in Euclidean space (sum of squared errors) than the sample sequence originally detected by the trellis sequence detector 88. If so, then the post processor 95 corrects the preliminary sequence 90 output by the trellis sequence detector 88 to generate a corrected sequence 97 decoded by the channel decoder 92.

Minimizing the sample error sequence in Euclidean space can be represented mathematically using the above equations $$\frac{\text{MIN}}{T} \|(T_k - R_k) * h_k\|^2 \quad (1)$$

which from the above equations is equivalent to $$\frac{\text{MIN}}{E} \|(E_k - n_k) * h_k\|^2 \quad (2)$$

where $h_k$ is the impulse response of a noise whitening filter. Equation (2) can be rewritten as $$\frac{\text{MIN}}{E} \left\| \sum_{j=0}^{N} E_{k-j} h_j - \sum_{m=0}^{N} n_{k-m} h_m \right\|^2 \quad (3)$$

where N is the length of the impulse response $h_k$ of the noise whitening filter. Equation (3) can be rewritten as $$\frac{\text{MIN}}{E} \sum_{k=0}^{L} \left( \sum_{j=0}^{N} E_{k-j} h_j - \sum_{m=0}^{N} n_{k-m} h_m \right)^2 \quad (4)$$

where L is the length of the received sample sequence, and equation (4) can be rewritten as $$\frac{\text{MIN}}{E} \sum_{k=0}^{L} \left[ \left( \sum_{j=0}^{N} E_{k-j} h_j \right)^2 - 2 \sum_{j=0}^{N} E_{k-j} h_j \sum_{m=0}^{N} n_{k-m} h_m + \left( \sum_{m=0}^{N} n_{k-m} h_m \right)^2 \right]. \quad (5)$$

In equation (5), the term $$\sum_{m=0}^{N} n_{k-m} h_m$$

represents the whitened noise in the read signal assuming that the trellis sequence detector 88 did not make a detection error. If, however, the trellis sequence detector 88 makes a detection error due to the noise correlating effect of the channel equalizers, then the term $$\sum_{k=0}^{L} \left[ \left( \sum_{j=0}^{N} E_{k-j} h_j \right)^2 - 2 \sum_{j=0}^{N} E_{k-j} h_j \sum_{m=0}^{N} n_{k-m} h_m \right] \quad (6)$$

in equation (5) will be negative and the output of equation (5) will be smaller than if $E_k$ were zero. In other words, if there is an $E_k$ which makes equation (6) negative, then the corresponding $T_k$ has a smaller euclidean distance to $R_k$ than the sample sequence $S_k$ selected by the trellis sequence detector 88. Therefore, the sample sequence $S_k$ detected by the trellis sequence detector 88 should be corrected relative to the error event sequence $E_k$ since minimizing the Euclidean distance will better approximate a true maximum likelihood sequence detector. An aspect of the present invention, then, is to calculate equation (6) for various error event sequences $E_k$, and to correct the preliminary sequence 90 detected by the trellis sequence detector 88 if the result of equation (6) is negative. After correcting all of the error events that will reduce Euclidean distance after whitening the noise, residual error events detected by the error syndrome 216 of the error detection convolution code are then corrected by correcting the error event that is consistent with the error syndrome, will minimize equation (6), and will result in a corrected sequence that satisfies the RLL constraints.

The first term in equation (6) is a constant because the error sequence $E_k$ associated with the error event is known. This term reduces to $$\sum_{k=0}^{L} \left( \sum_{j=0}^{N} E_{k-j} h_j \right)^2 = \sum_{k=0}^{L} \sum_{j=0}^{N} E_{k-j} h_j \sum_{m=0}^{N} E_{k-m} h_m \quad (7)$$

$$= \sum_{k=0}^{L} \sum_{j=k-N}^{k} E_j h_{k-j} (E_k * h_k)$$

$$= \sum_{j=0}^{L} E_j \sum_{k=0}^{L} h_{k-j} (E_k * h_k)$$

$$= \sum_{j=0}^{L} E_j (h_{-k} * E_k * h_k)_j$$

$$= \sum_{j=0}^{L} E_j (E_k * h_k * h_{-k})_j.$$

Referring again to equation (6), the term on the right reduces to $$\sum_{k=0}^{L} \left( 2 \sum_{j=0}^{N} E_{k-j} h_j \sum_{m=0}^{N} n_{k-m} h_m \right) = 2 \sum_{k=0}^{L} \sum_{j=0}^{N} E_{k-j} h_j \sum_{m=0}^{N} n_{k-m} h_m \quad (8)$$

$$= 2 \sum_{k=0}^{L} \sum_{j=k-N}^{k} E_j h_{k-j} (n_k * h_k)$$

$$= 2 \sum_{j=0}^{L} E_j \sum_{k=0}^{L} h_{k-j} (n_k * h_k)$$

$$= 2 \sum_{j=0}^{L} E_j (h_{-k} * n_k * h_k)_j$$

$$= 2\sum_{j=0}^{L} E_j(n_k * h_k * h_{-k})_j.$$

Combining equations (7) and (8) leads to the following representation for equation (6)

$$\sum_{j=0}^{L} E_j(E_k * h_k * h_{-k})_j - 2\sum_{j=0}^{L} E_j(n_k * h_k * h_{-k})_j. \quad (9)$$

A mathematical derivation is provided below for an approximation of the impulse response $h_k$ convolved with the time reversal of itself $h_{-k}$ ($h_k*h_{-k}$ in equation (9)). Once the approximated coefficients for $h_k*h_{-k}$ are determined, the solution to equation (9) is complete since all other terms are known. Thus, a number of error event sequences $E_k$ can then be substituted into equation (9) to determine if the trellis sequence detector 88 made a detection error corresponding to the particular error event $E_k$.

A detected error event $E_k$ must be valid before the post processor 95 will make a corresponding correction to the preliminary sequence 90. An error event $E_k$ is valid only if the corrected preliminary sequence $T_k$ will result in a valid PR sequence as well as satisfy the RLL constraints. For example, if the PR domain of interest is PR4, then the corrected sequence $T_k$ will be a valid PR4 sequence if there is a binary-valued flux sequence $F_k$ such that $$F_k*(1-D)(1+D)=T_k.$$

In other words, $$F_k=T_k/(1-D)(1+D)=S_k/(1-D)(1+D)+E_k/(1-D)(1+D)=S_{kFLUX}+E_{kFLUX}$$

where $S_{kFLUX}$ is the preliminary sequence 90 in the flux domain taking on values in the set $\{0,1\}$, and $E_{kFLUX}$ is the error event sequence in the signed flux domain taking on values in the set $\{0,+1,-1\}$. The test is: if $E_{kFLUX}$ is "+1" then $S_{kFLUX}$ must be "0", if $E_{kFLUX}$ is "-1" then $S_{kFLUX}$ must be "1", if $E_{kFLUX}$ is "0" then $S_{kFLUX}$ can be either "0" or "1".

The coefficients of $h_k*h_{-k}$ in equation (9) can be determined using auto-correlation. The auto-correlation of the output sequence of a perfect noise whitening filter is an impulse response $\delta_k$. Therefore, the coefficients $h_k$ of a noise whitening filter will satisfy the following equation $$R_{yy}(\tau)-\delta(\tau)=0$$

where $R_{yy}(\tau)$ represents the auto-correlation of the output sequence. In order to satisfy the above equation, the impulse response $h_k$ would comprise an infinite number of terms; however, because the impulse response also decreases monotonically on average, it can be approximated with a finite length impulse response that satisfies the least-mean-square (LMS) of the above equation $$\frac{\text{MIN}}{R_{yy}}\|R_{yy}(\tau)-\delta(\tau)\|^2. \quad (10)$$

In equation (10), the auto-correlation $R_{yy}(\tau)$ of the output sequence can be written in terms of $h_k*h_{-k}$ together with the auto-correlation of the input sequence, which leads to a solution for the approximated coefficients for $h_k*h_{-k}$.

The auto-correlation $R_{yy}(\tau)$ of a filter's output sequence $Y_k$ is $$E\{Y_k Y_{k-\tau}\} \quad (11)$$

where E is the expectation operator. The auto-correlation of the output sequence $Y_k$ for a filter can be generated by multiplying the input sequence $X_k$ convolved with filter's impulse response by a time-shifted input sequence $X_{k-\tau}$ convolved with the filter's impulse response $$E\left\{\sum_{j=0}^{N} h_j X_{k-j} \sum_{m=0}^{N} h_m X_{k-\tau-m}\right\} \quad (12)$$

where N is the length of the filter's impulse response $h_k$. Equation (12) can be reduced to $$E\left\{\sum_{j=0}^{N} h_j X_{k-j} \sum_{m=0}^{N} h_m X_{k-\tau-m}\right\} = \sum_{j=0}^{N} h_j \sum_{m=0}^{N} h_m E\{X_{k-j} X_{k-\tau-m}\} \quad (13)$$

$$= \sum_{j=0}^{N} h_j \sum_{m=0}^{N} h_m R_{xx}(\tau+m-j)$$

where $R_{xx}$ in equation (13) is the auto-correlation of the input sequence $X_k$. Substituting k=m−j and m=k+j, equation (13) can be rewritten as $$\sum_{j=0}^{N} h_j \sum_{k=-j}^{N-j} h_{k+j} R_{xx}(\tau+k). \quad (14)$$

Equation (14) can be further reduced to $$\sum_{k=-N}^{N} \sum_{j=0}^{N} h_j h_{k+j} R_{xx}(\tau+k). \quad (15)$$

To simplify the following notation, equation (15) is rewritten with $$hh_k = \sum_{j=0}^{N} h_j h_{k+j}.$$

to obtain $$R_{yy}(\tau) = \sum_{k=-N}^{N} hh_k R_{xx}(\tau+k). \quad (16)$$

Substituting equation (16) into equation (10) leads to the following LMS equation $$\frac{\text{MIN}}{R_{xx}}\left\|\sum_{k=-N}^{N} hh_k R_{xx}(\tau+k)-\delta(\tau)\right\|^2. \quad (17)$$

Equation (17), which is written in terms of the auto-correlation of the input sequence $R_{xx}(\tau+k)$ to the noise whitening filter, can be used to derive the coefficients for the LMS approximation of $hh_k$. In order to solve equation (17) it must be truncated by a preselected length L $$\sum_{\tau=-L}^{L}\left(\sum_{k=-N}^{N}hh_k R_{xx}(\tau+k)-\delta(\tau)\right)^2 \qquad (18)$$

where the accuracy of the approximation to equation (17) increases as L increases. The terms of $R_{xx}$ are symmetric about k=0 since it is the auto-correlation of the input sequence. Therefore, equation (18) can be rewritten as $$\sum_{\tau=-L}^{L}\left(\sum_{k=0}^{N}hh_k(R_{xx}(\tau+k)+R_{xx}(\tau-k))\left(1-\frac{1}{2}\delta(k)\right)-\delta(\tau)\right)^2. \qquad (19)$$

The minimum of equation (19) in terms of $hh_n$ can be found by calculating when the partial derivative of equation (19) with respect to $hh_n$ is zero $$\frac{\partial}{\partial hh_n}=\sum_{\tau=-L}^{L}2\left(\sum_{k=0}^{N}hh_k(R_{xx}(\tau+k)+R_{xx}(\tau-k))\left(1-\frac{1}{2}\delta(k)\right)-\delta(\tau)\right)\cdot$$

$$(R_{xx}(\tau+n)+R_{xx}(\tau-n))\left(1-\frac{1}{2}\delta(n)\right)=0.$$

Rearranging terms in the above equation leads to $$\sum_{\tau=-L}^{L}\sum_{k=0}^{N}hh_k(R_{xx}(\tau+k)+R_{xx}(\tau-k))\left(1-\frac{1}{2}\delta(k)\right)\cdot$$

$$(R_{xx}(\tau+n)+R_{xx}(\tau-n))\left(1-\frac{1}{2}\delta(n)\right)=(R_{xx}(n)+R_{xx}(n))\left(1-\frac{1}{2}\delta(n)\right).$$

which further reduces to $$\sum_{k=0}^{N}hh_k\sum_{\tau=-L}^{L}(R_{xx}(\tau+k)+R_{xx}(\tau-k))\left(1-\frac{1}{2}\delta(k)\right)\cdot \qquad (20)$$

$$(R_{xx}(\tau+n)+R_{xx}(\tau-n))\left(1-\frac{1}{2}\delta(n)\right)=2R_{xx}(n)\left(1-\frac{1}{2}\delta(n)\right).$$

Equation (20) can be written in matrix form $$\left(\begin{bmatrix}\frac{1}{2}R_{-L} & \cdots & \frac{1}{2}R_L \\ R_{-L+1} & & R_{L+1} \\ \vdots & & \vdots \\ R_{-L+N} & \cdots & R_{L+N}\end{bmatrix}+\right.$$

$$\begin{bmatrix}\frac{1}{2}R_L & \cdots & \frac{1}{2}R_{-L} \\ R_{L+1} & & R_{-L+1} \\ \vdots & & \vdots \\ R_{L+N} & \cdots & R_{-L+N}\end{bmatrix}\begin{bmatrix}\frac{1}{2}R_{-L} & R_{-L+1} & \cdots & R_{-L+N} \\ \vdots & & & \vdots \\ \frac{1}{2}R_L & R_{L+1} & \cdots & R_{L+N}\end{bmatrix}+$$

$$\left.\begin{bmatrix}\frac{1}{2}R_L & R_{L+1} & \cdots & R_{L+N} \\ \vdots & & & \vdots \\ \frac{1}{2}R_{-L} & R_{-L+1} & \cdots & R_{-L+N}\end{bmatrix}\right)\begin{bmatrix}hh_0 \\ \vdots \\ hh_N\end{bmatrix}=\begin{bmatrix}\frac{1}{2}R_0 \\ \vdots \\ R_N\end{bmatrix}2.$$

A solution for $hh_k$ can be found from the above matrix equation using well known techniques; all that is needed is the auto-correlation values for the input sequence $X_k$. The solution for $hh_k$ will be at least four non-zero real numbers or coefficients, where each coefficient comprises an integer and a fractional component.

As described in more detail below, the input sequence $X_k$ is the estimated noise sequence $n_k$ generated as the difference between the sample sequence detected by the trellis sequence detector 88 and the actual signal samples. Thus, the auto-correlations of the estimated noise sequence $n_k$ are computed and substituted into the above matrix equation in order to derive approximated coefficients for $hh_k$ ($h_k*h_{-k}$ of equation (9)). A more accurate approximation for $hh_k$ is provided by calculating $R_{xx}$ over longer signal sample sequences, and by averaging $R_{xx}$ for a number of different signal sample sequences generated from different data sequences recorded on the disk storage medium.

In the preferred embodiment, the read channel comprises only the circuitry for computing the auto-correlation of the noise sequence $n_{xx}(\tau)$ for the various values of $\tau$ in the above matrix equation. The auto-correlations are then transferred to a disk controller (not shown) which carries out the matrix computations in solving for $hh_k$. Due to the extensive number of computations, the above-described process for computing approximated coefficients for $hh_k$ is carried out infrequently, for example, only during manufacturing of the storage device or during an off-line calibration process executed periodically during the lifetime of the storage device.

Also in the preferred embodiment, the approximated coefficients for $hh_k$ are calculated for each zone of the disk storage medium (see FIG. 2A and above description of zoned recording). This is necessary because the channel equalizers are adaptively adjusted to operate in each zone. Consequently, the noise correlating effect of the channel equalizers changes across zones which necessitates a corresponding change in $hh_k$. Once the coefficients for $hh_k$ have been determined for each zone, they are stored in memory and loaded into the post processor 95 of FIG. 3 when the recording head crosses over into a new zone.

Post Processor Implementation

Figure 10A:
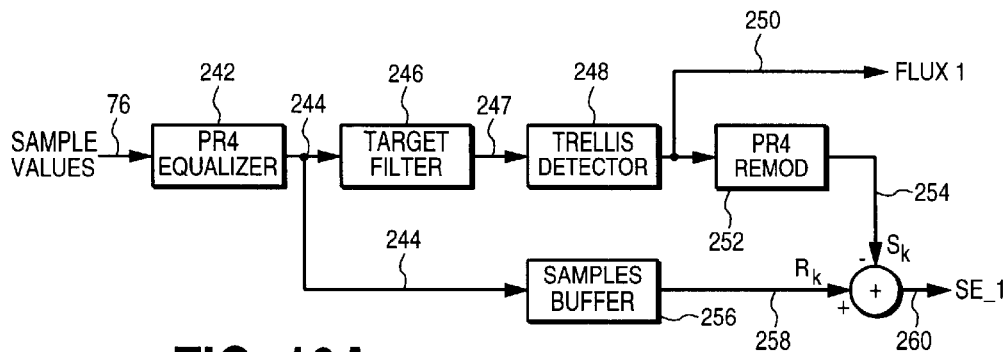
FIG. 10A shows the preferred embodiment for the read channel of FIG. 3 wherein the channel equalizers equalize the read signal into a PR4 response for timing recovery and gain control, and a target filter filters the read signal sample values into target samples according to a PR target for processing by the trellis sequence detector.

Referring now to FIG. 10A, shown is a sampled amplitude read channel according to one embodiment of the present invention. In this embodiment, the sample values 76 output by the A/D 64 of FIG. 3 are equalized by equalizer 242 according to a PR4 response so that the timing recovery 68 and gain control 80 circuits of FIG. 3 can be implemented using a simple slicer circuit (not shown). The PR4 equalized samples 244 are then filtered by target filter 246 to generate target samples 247 equalized to the desired PR target of the trellis sequence detector 248. For example, the target filter 246 may be of the form $$(2+2D+D^2)$$

in order to generate target samples 247 equalized to the "2,2,1" PR target described above with reference to the state transition diagram shown in FIG. 5.

The target samples 247 are then processed by a trellis sequence detector 248 matched to the desired PR target (e.g., the "2,2,1" target described above) which detects a preliminary sequence FLUX1 250 in the NRZ domain (also referred to as the FLUX domain). The preliminary sequence 250 is then remodulated by a PR4 remodulator 252 into a sequence of estimated sample values $S_k$ 254 in the PR4 domain. The PR4 remodulator 252 may be implemented as a $1-D^2$ filter where "−" is an XOR operator. The estimated sample values $S_k$ 254 are then subtracted from the original PR4 equalized samples $R_k$ 258 (after passing through a samples buffer 256 to account for the delay of the trellis sequence detector 248) to generate a sequence of sample errors SE_1 260. The PR4 remodulator 252 and samples buffer 256 are implemented as part of the post processor 95 of FIG. 3.

In order to maximize the throughput of the read channel, the post processor 95 shown in FIG. 9 performs the error detection and correction operations in a pipelined manner. The first error pattern detector 228 and unguided error corrector 230 process the filtered sample errors 226 for a number of codewords. Once enough codewords have been processed to generate the error syndrome 216, the second error pattern detector 236 and guided error corrector 234 begin correcting a current codeword while the first error pattern detector 228 and unguided error corrector 230 process the next incoming codeword. In this manner, the unguided and guided circuitry operate concurrently which increases throughput. In addition, the syndrome generator 214, error pattern detectors 228 and 236 and the error correctors 230 and 234 also operate in a pipelined manner so that the sample values are processed in a substantially continuous stream.

Figure 10B:
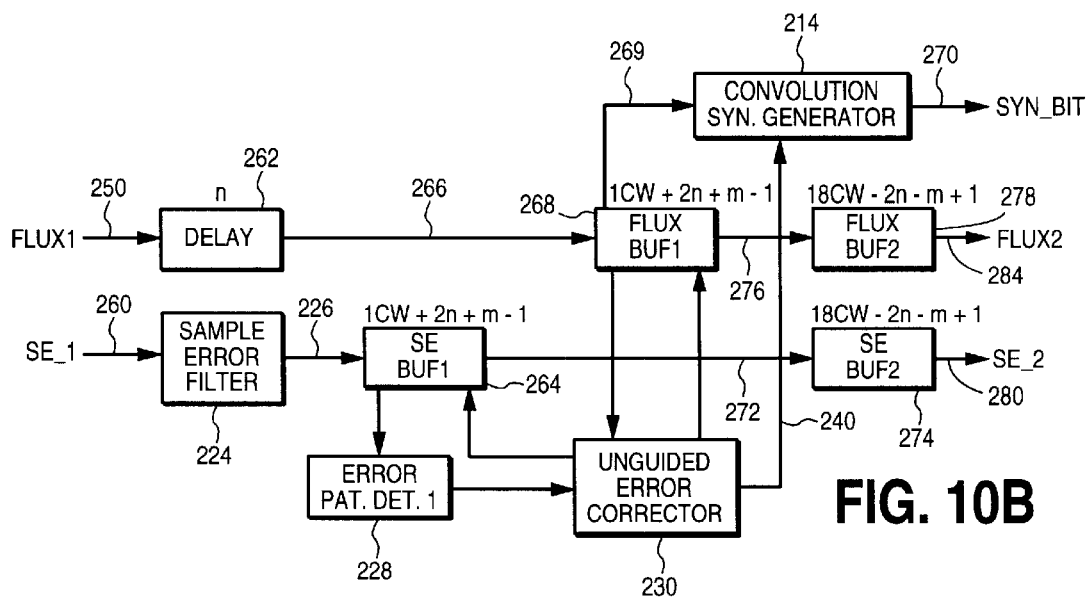
FIG. 10B shows further implementation details of the unguided error corrector of FIG. 9.
Figure 10C:
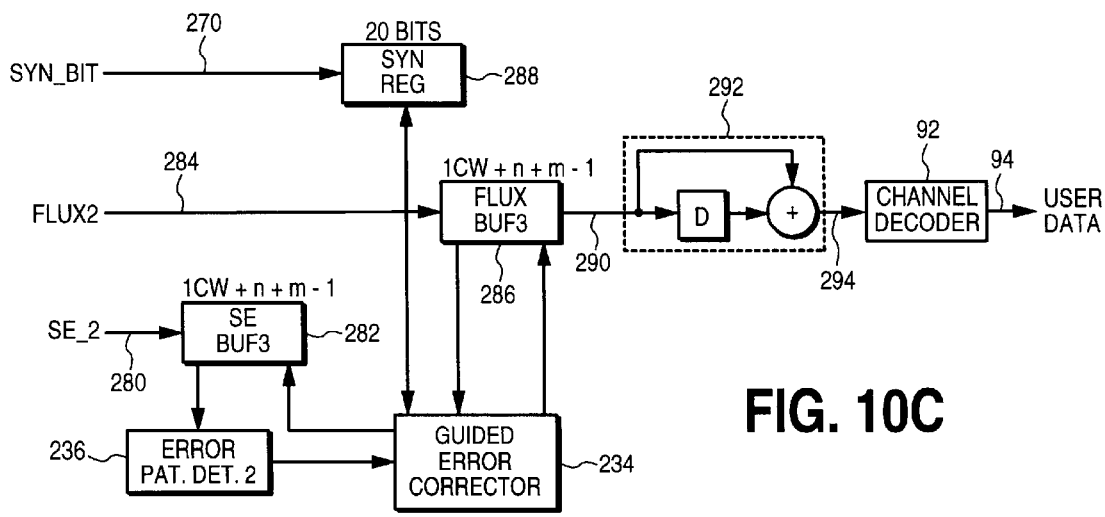
FIG. 10C shows further implementation details of the guided error corrector of FIG. 9.

An overview of the buffering to facilitate the pipelined operation of the post processor 95 is illustrated in FIG. 10B and 10C. The sample errors SE_1 260 are filtered by the sample error filter 224 to generate the sequence of filtered sample errors 226. The sample error filter 224 has a non-causal impulse response of length 2n which means its output is a function of the next n samples as well as the previous n samples. To account for this non-causal response, the preliminary sequence FLUX1 250 is delayed n bits by buffer DELAY 262.

The filtered samples 226 are processed by the first error pattern detector 228 which detects the most likely error event that will minimize the Euclidean distance after whitening the noise (i.e., the error event that generates the most negative result for equation (9)). In the embodiment of FIG. 10B, the error events are detected and corrected a codeword at a time so that the corresponding syndrome bit generated for each detected codeword can be generated correctly. Thus, the filtered sample errors 226 are buffered by buffer SE BUF1 264 which stores one codeword (1CW) plus (2n+m−1) samples, where m is the length of the longest error event in the PR4 domain targeted by the first error pattern detector 228. Buffer SE BUF1 264 stores the last n samples of the previous codeword to account for the n-length non-causal response of the sample error filter 224, all of the samples for the current codeword, and the n+m−1 samples of the next codeword. The overlap of n+m−1 into the next codeword accounts for the case where the longest error event (of length m) begins with the last bit of the current codeword. This error event will extend m−1 samples into the next codeword, and will further extend an additional n sample errors into the next codeword due to the n-length causal response of the sample error filter 224.

The delayed preliminary sequence FLUX1 266 is buffered in FLUX BUF1 268 which also stores one codeword (1CW) plus (2n+m−1) bits. When the first error pattern detector 228 detects an error event, the unguided error corrector 230 corrects the preliminary sequence FLUX1 266 stored in FLUX BUF1 268 and also corrects the filtered sample errors 226 stored in SE BUF1 264 (after evaluating the preliminary sequence stored in FLUX BUF1 268 to verify that the correction will not violate the RLL constraints). The convolution code syndrome generator 214 generates the syndrome bit 270 for the current codeword using the originally detected preliminary sequence FLUX1 269 extracted from FLUX BUF1 268, as well as correction syndromes 240 corresponding to the corrections made to the preliminary sequence by the unguided error corrector 230.

The corrected sample errors 272 are buffered in buffer SE BUF2 274 which stores eighteen codewords (18CW) minus (2n+m−1) corrected sample errors; that is, SE BUF1 264 together with SE BUF2 174 store the corrected sample errors for nineteen codewords. Similarly, the corrected preliminary sequence FLUX1 276 is buffered in buffer FLUX BUF2 278 which stores eighteen codewords (18CW) minus (2n+m−1) bits; that is, FLUX BUF1 268 together with FLUX BUF2 278 store the FLUX bits for nineteen codewords. Buffering for an additional codeword is provided in the guided circuitry of the post processor 95 as shown in FIG. 10C, bringing the total number of buffered codewords to twenty. As will be explained in greater detail below, twenty codewords are buffered to enable detection of multiple error events in twenty consecutive codewords using the error syndrome of the convolution code.

Referring to FIG. 10C, one codeword (1CW) plus (n+m−1) sample errors 280 are buffered in buffer SE BUF3 282. Only n+m−1 sample errors are buffered at this stage (compared to the 2n+m−1 sample errors buffered in buffer 268 of FIG. 10B) since it is not necessary to correct the sample errors corresponding to the last n samples of the previous codeword (due to the n-length non-causal response of the sample error filter 224). Similarly, one codeword (1CW) plus (n+m−1) bits of the preliminary sequence 284 are buffered in buffer FLUX BUF3 286. The syndrome bits 270 for the twenty buffered codewords are stored in a shift register SYN REG 288.

When the error syndrome stored in the SYN REG 288 indicates that an error exists in the codeword stored in FLUX BUF3 286, the guided error corrector 234 corrects the most likely error event as identified by the second error pattern detector 236 (i.e., the error event that minimizes equation (9)). The detected error event must be consistent with the error syndrome in SYN REG 288 as well as consistent with the RLL constraints when evaluating the preliminary sequence stored in FLUX BUF3 286 relative to the proposed correction. The guided error corrector 234 corrects the preliminary sequence stored in FLUX BUF3 286 as well as the sample errors stored in SE BUF3 282, including the sample errors that extend n+m−1 samples into the next codeword when the longest error event (length m) begins in the last bit of the current codeword. The guided error corrector 234 also updates the error syndrome stored in SYN REG 288 to reflect the correction so that errors in the following codewords are accurately detected.

The corrected preliminary sequence 290 output from FLUX BUF3 286 is then filtered by filter 292 having a response of (1+D) in order to convert the FLUX sequence 290 (NRZ sequence) into a NRZI sequence 294 consistent with the format expected by the channel decoder 92 of FIG. 6D. The channel decoder 92 decodes the NRZI sequence 294 into the user data 94.

The error pattern detectors 228 and 236 shown in FIG. 10B and 10C implement equation (9) for a predetermined number of dominant error events. In the embodiment disclosed herein, the error events are evaluated in the PR4 domain in order to reduce the cost and complexity of implementation. However, this is not a limiting aspect of the present invention; equation (9) could be implemented for error events evaluated in other PR domains without departing from the essential function. Although in the disclosed embodiment the error events are detected in the PR4 domain, the validity of the error events as well as the correction to the preliminary sequence 90 is carried out in the flux domain. As described above, an error event is valid only if the corrected sequence is a valid PR sequence and satisfies the RLL constraints. For the disclosed embodiment wherein the error events are evaluated in the PR4 domain, Table 5 below shows a list of dominant error events $E_k$ detected by the error pattern detectors according to equation (9). Table 5 shows the error number En, and the error event $E_k$ in the flux domain ($E_{kFLUX}$), in the signed NRZI domain ($E_{kSNRZI}$), and in the PR4 domain ($E_{kPR4}$). Table 5 also shows the preliminary sequence 90 in the flux domain ($S_{kFLUX}$) that must be detected in order for the corresponding error event $E_k$ to be valid. Checking that the error event $E_k$ is valid with respect to the RLL constraints is carried out by evaluating the corrected sequence to verify that the RLL constraints are satisfied. The negative of all signed values shown in Table 5 are also valid error events (i.e., the same error events having opposite polarity) and are validated by the complement of the preliminary sequence $S_{kFLUX}$ shown in Table 5. The preliminary sequence 90 is corrected by XORing it with the absolute value of the error sequence in the flux domain $E_{kFLUX}$. For example, to correct error event E1 in Table 5, the detected preliminary sequence 90 is XORed with the sequence (11) which is the absolute value of the error sequence $E_{kFLUX}$ (+1,−1).

The guided circuitry of the post processor 95 shown in FIG. 10C operates concurrently with the unguided circuitry shown in FIG. 10B so that the data is processed in a substantially continuous stream. In addition, the unguided and guided circuitry of the post processor 95 are individually pipelined to minimize the delay in processing the data while still providing a cost effective implementation.

Unguided Error Detection/Correction

Figure 11A:
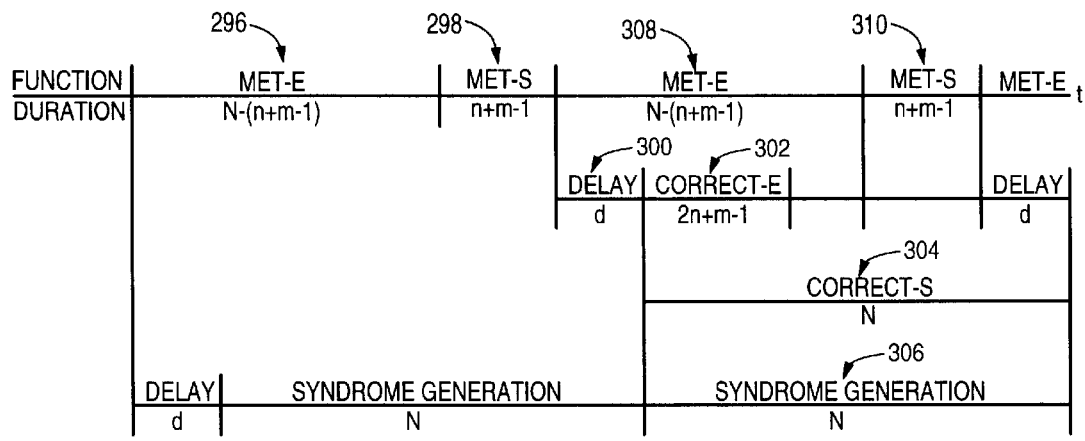
FIG. 11A shows a time line illustrating the pipelined operation of the error pattern detector and unguided error corrector of FIG. 10B.
Figure 11B:
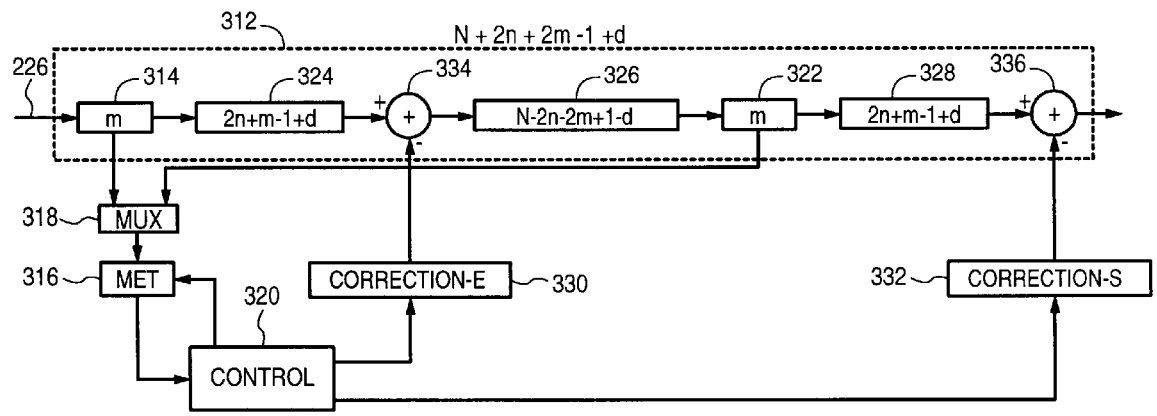
FIG. 11B shows further details of the buffering and control circuitry for carrying out the pipelined generation of the error metrics for detecting error events in the preliminary sequence output by the trellis sequence detector, and for correcting errors in the filtered sample error sequence using the unguided error corrector of FIG. 10B.
Figure 11C:
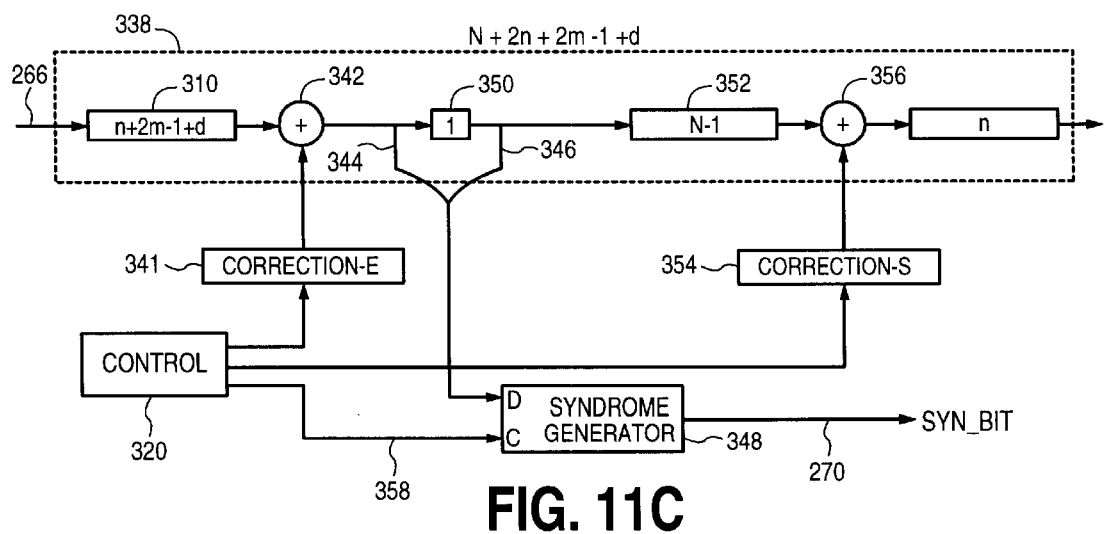
FIG. 11C shows further details of the buffering and control circuitry for carrying out the pipelined generation of the error syndrome for detecting errors in the preliminary sequence output by the trellis sequence detector, and for correcting the detected errors using the guided error corrector of FIG. 10C.

FIG. 11A shows a time line illustrating the pipelined operation of the error pattern detector 228 and unguided error corrector 230 of FIG. 10B. FIGS. 11B and 11C illustrate example buffering and circuitry for carrying out the pipelined operations shown in the time line of FIG. 11A. FIG. 12 shows how the contents of the buffers in FIG. 11B change as the codewords are being processed, and FIG. 13 shows how the contents of the buffers in FIG. 11C change as the codewords are being processed.

In FIGS. 11A–12, the term MET denotes "metric calculation" and it corresponds to the calcuations of equation (9) for the dominant error events (i.e., the function performed by the error pattern detectors). The term MET-E denotes the metric calculations for the end of a codeword, and MET-S denotes the metric calculations for the start of a codeword. The circuitry of FIG. 11B performs the metric calculations and makes corrections to the filtered sample errors in staggered, overlapping operations. First the metrics are calculated for a current codeword, and then as the current codeword is being corrected, the metrics are generated for the following codeword.

When processing a current codeword $CW_k$, an error occurring in the last bit can extend n+m−1 filtered sample errors into the start of following codeword $CW_{k+1}$. Therefore, the corrections to the end of the current codeword $CW_k$ must be completed before calculating the metrics for the start of the following codeword $CW_{k+1}$. However, rather than delay calculating the metrics for the next codeword $CW_{k+1}$ until the current codeword $CW_k$ has been completely corrected, the metrics are first calculated for the end of the next codeword $CW_{k+1}$ and then the metrics are calculated for the start of the next codeword $CW_{k+1}$. This allows time for the unguided corrector 230 to make corrections to the filtered sample errors at the start of the next codeword $CW_{k+1}$ before the metrics are calculated for the start of the next codeword $CW_{k+1}$.

This staggered, overlapping manner of generating the metrics and correcting the filtered sample errors is illustrated in the time line of FIG. 11A. During time MET-E 296, the metrics are calculated for the end of a current codeword $CW_k$. Then during time MET-S 298, the metrics are calculated for the start of the current codeword $CW_k$. After the metrics have been calculated for the current codeword $CW_k$, there is a delay of d 300 during which time the metrics are evaluated to determine the location and correction value for the most likely error event (assuming at least one metric is negative). Then, the end and start of the current codeword CWk are corrected concurrently during times CORRECT-E 302 and CORRECT-S 304. The syndrome bit for the current codeword is also generated concurrent with the correction as denoted by SYNDROME GENERATION 306. Also concurrent with correcting the current codeword $CW_k$, the metrics are calculated for the next codeword $CW_{k+1}$ during times MET-E 308 and MET-S 310 and the process shown in FIG. 11A is repeated for the next codeword $CW_{k+1}$.

The concurrent, overlapping operations shown in FIG. 11A for calculating the metrics and correcting the filtered sample errors for a current codeword $CW_k$ is better understood with reference to FIG. 11B and FIG. 12. Referring to FIG. 11B, buffer 312 stores N+2n+2m−1+d filtered sample errors 226 where N is the length of a codeword (CW) and d is the delay d 300 used to evaluate the metrics as described above. Buffer 312 corresponds to buffer SE BUF1 264 in FIG. 10B with an additional m+d storage elements which are needed to implement the pipelined processing of the codewords. The contents of buffer 312 is illustrated in FIG. 12 as the codewords are processed (the delay d in FIG. 11A is not illustrated in FIG. 12 for clarity).

Referring to FIG. 12, at time t=0 the filtered sample errors 226 have been shifted such that buffer 312 contains the filtered sample errors 226 for the last n samples of codeword $CW_{k−2}$, the entire N samples of codeword $CW_{k−1}$, and the first 2m+n−1 samples of codeword $CW_k$. At this point, the circuitry of FIG. 11B is ready to begin processing the filtered sample errors 226 to calculate the metrics MET-E for the end of the current codeword $CW_k$.

The filtered sample errors 226 stored in segment 314 of buffer 312 are applied to a metrics calculator 316 through a multiplexer 318 (FIG. 11B). The metrics calculator 316 computes a result for equation (9) for the dominant error events of interest and transmits the results to a control circuit 320. The control circuit 320 activates the metrics calculator 316 at the appropriate times.

At time t=N−(n+m−1), the metrics have been calculated for the end of the current codeword $CW_k$, and the filtered sample errors 226 have shifted through the buffer 312 such that the first sample error corresponding to the first bit in the current codeword $CW_k$ is in the end of segment 322 of buffer 312. The metrics for the start of the current codeword $CW_k$ are then calculated by selecting through multiplexer 318 the output of segment 322 as the input to the metrics calculator 316. The metrics are calculated for the n+m−1 filtered sample errors at the start of the current codeword $CW_k$.

After calculating the metrics for the current codeword $CW_k$, there is a delay 300 of d clock cycles to allow the control circuit 320 to evaluate the metrics to determine the location and correction value for the most likely error event detected in the current codeword $CW_k$. This delay 300 is illustrated in FIG. 11A, but not in FIG. 12 for clarity. After the delay d 300, the current codeword $CW_k$ is ready for correcting and the metrics MET-E for the end of the next codeword $CW_{k+1}$ are ready to be calculated (MET-E actually starts at the beginning of the delay d 300 as shown in FIG. 11A). Referring to FIG. 12, at time t=N the first m filtered sample errors corresponding to the end of the next codeword $CW_{k+1}$ are stored in segment 314 of buffer 312, the last n filtered sample errors of the current codeword $CW_k$ and the first n+m−1 filtered sample errors of the next codeword $CW_{k+1}$ are stored in segment 324 of buffer 312, and the first N−n filtered sample errors of the current codeword $CW_k$ and the last n filtered sample errors of the previous codeword $CW_{k-1}$ are stored in segments 326, 322 and 328 of buffer 312. As the buffer 312 shifts, the filtered sample errors stored in segment 324 for the end of the current codeword $CW_k$ and beginning of the next codeword $CW_{k+1}$ are corrected by CORRECTION-E 330 of FIG. 11B, and the filtered sample errors stored in segments 326, 322 and 328 for the start of the current codeword $CW_k$ and the end of the previous codeword $CW_{k-1}$ are corrected by CORRECTION-S 332. The filtered sample errors 226 stored in buffer 312 are corrected by subtracting the factor $E_k * hh_k$ of equation (7) from the corresponding filtered sample errors. FIG. 11B comprises two adders 334 and 336 for performing the subtraction.

Referring again to FIG. 12, at time 2N−(n+m−1) the next codeword $CW_{k+1}$ is in position in buffer 312 to begin calculating the metrics for the start of the next codeword $CW_{k+1}$. This concurrent, overlapping process of calculating the error metrics of a next codeword $CW_{k+1}$ while correcting the filtered sample errors for a current codeword $CW_k$ allows the data stream to be processed in a substantially continuous manner.

Referring to FIG. 11C, shown is the circuitry for correcting the preliminary sequence FLUX1 266 output by the trellis sequence detector 88, and for generating the syndrome bit SYN_BIT 270 for the current codeword $CW_k$ during the unguided mode of the post processor 95. As explained above with reference to FIG. 11A, the syndrome bit SYN_BIT 270 is generated concurrent with correcting the current codeword $CW_k$. The buffer 338 in FIG. 11C corresponds to FLUX BUF1 268 of FIG. 10B with an additional m+d storage elements which are needed to implement the pipelined processing of the codewords similar to buffer 312 of FIG. 11B.

FIG. 13 illustrates the contents of buffer 388 of FIG. 11C as the codewords are processed (the delay d 300 in FIG. 11A is not shown in FIG. 13 for clarity). At time t=0, the first n+2m−1 bits of the start of the current codeword $CW_k$ are stored in segment 340 of buffer 338 and are ready for correcting by CORRECTION-E 341 of FIG. 11C based on an error event detected at the end of the previous codeword $CW_{k-1}$ and extending into the start of the current codeword $CW_k$. As the bits of the preliminary sequence 266 shift out of segment 340, they are corrected at adder 342 by the control circuit 320 and CORRECTION-E 341 at the appropriate location using the correction value corresponding to the detected error event. The CORRECTION-E 341 corrects up to the first m−3 bits in the current codeword $CW_k$ corresponding to the longest error event which is of length m−2 in the FLUX domain. The adder 342 performs the correction by XORing the preliminary sequence 266 with the correction sequence output by CORRECTION-E 341 (the correction sequence is the absolute value of the error sequence in the flux domain $E_{kFLUX}$ shown in Table 5 as described above).

The bit 344 of the preliminary sequence 266 at the output of adder 342 (FIG. 11C), as well as the previous bit 346 of the preliminary sequence 266 are input into a syndrome generator 348. The syndrome generator 348 generates the syndrome bit SYN_BIT 270 over the preliminary sequence 266 in the NRZI domain. Thus, the current bit 344 and the previous bit 346 are XORed by the syndrome generator 348 to convert the preliminary sequence 266 into the NRZI domain which is used to generate the syndrome bit SYN_BIT 270. Details of the syndrome generator are disclosed below with reference to FIG. 17.

Referring again to FIG. 13, at time t=N the N bits of the current codeword $CW_k$ are stored in segments 350 and 352 of buffer 338 and are ready for correcting by CORRECTION-S 354 of FIG. 11C based on an error event detected in the current codeword $CW_k$. As the bits of the preliminary sequence 266 shift out of segment 352, they are corrected at adder 356 by the control circuit 320 and CORRECTION-S 354 at the appropriate locations using the correction value corresponding to the detected error event. The adder 356 performs the correction by XORing the preliminary sequence 266 with the correction sequence output by CORRECTION-S 354. A correction syndrome is also input into the syndrome generator 348 over line 358 so that the syndrome bit SYN_BIT 270 can be updated based on the correction made to the preliminary sequence 266. Updating the syndrome bit SYN_BIT 270 with the correction value is explained in greater detail below with reference to FIG. 17.

Guided Error Detection/Correction

FIG. 14A shows a time line illustrating the pipelined operation of the error pattern detector 236 and guided error corrector 234 of FIG. 10C. FIG. 14B illustrates example buffering and circuitry for carrying out the pipelined operations shown in the time line of FIG. 14A. FIG. 15 shows how the contents of the buffers in FIG. 14B change as the codewords are being processed. In order to expedite the guided circuitry of the post processor 95 the error pattern detector 236 calculates the metrics over the first and second half of a current codeword $CW_k$ concurrently.

Referring to FIG. 14A, during time SYN PROC 360 the 20-bit convolution code error syndrome stored in SYN REG 288 is evaluated to determine whether there is an error in the current codeword $CW_k$. During time (MET-S, MET-E) 362 the metrics are generated for the first and second half of the current codeword $CW_k$ concurrently. During time DELAY 364, a delay of e clock cycles are used to evaluate the metrics to determine the most likely error event in the current codeword $CW_k$ (i.e., the error event that minimizes equation (9)). At the end of the DELAY 364, the error event to be corrected has been selected and the correction syndrome is known. During the next clock cycle, the correction syndrome is added (XORed) into the error syndrome stored in SYN REG 288 in order to update the error syndrome for the next codeword $CW_{k+1}$ as is explained in greater detail below with reference to FIG. 18. While the error syndrome stored in SYN REG 288 is being evaluated for the next codeword $CW_{k+1}$ during time SYN PROC 366, the filtered sample errors SE_2 280 for the end of the current codeword are corrected during time SE-CORRECT-E 368, the preliminary sequence FLUX2 284 at the start (m−3 bits) of the next codeword $CW_{k+1}$ are corrected during time F-CORRECT-E 370 to account for the longest error event ending with the last bit of the current codeword $CW_k$, and the preliminary sequence FLUX2 284 for the N-bits of the current codeword $CW_k$ are corrected during time F-CORRECT-S 372. The process illustrated in FIG. 14A is then repeated for the D next codeword $CW_{k+1}$.

The concurrent, overlapping operations shown in FIG. 14A for calculating the metrics, correcting the filtered sample errors, and correcting the preliminary sequence for a current codeword $CW_k$ is better understood with reference to FIG. 14B and FIG. 15. Referring to FIG. 14B, buffer 374 stores N/2+m filtered sample errors 280 and buffer 376 stores N+m+e bits of the preliminary sequence 284. Buffer 374 corresponds to buffer SE BUF3 282 in FIG. 10C with fewer storage elements needed to implement the pipelined processing of the codewords, and buffer 376 corresponds to buffer FLUX BUF3 286 in FIG. 10C. The contents of buffer 312 is illustrated in FIG. 15 as the codewords are processed.

Referring to FIG. 15, at time t=20N the 20-bit error syndrome for the current codeword $CW_k$ is stored in the SYN REG 288, and the filtered sample errors 280 have been shifted such that the first filtered sample error of the current codeword $CW_k$ is at the end of segment 378 of buffer 374. During time SYNC PROC 360 the control circuit 320 uses N/2−e clock cycles to evaluate the error syndrome stored in SYN REG 288 to determine whether there is an error in the current codeword $CW_k$. At time 20N+N/2−e, the filtered sample errors 280 for the current codeword $CW_k$ have been shifted into buffer 374 and are ready for metrics calculation. During time (MET-S,MET-E) 362 the metrics for the first half of the current codeword $CW_k$ are computed by metrics calculator 380, and the metrics for the last half of the current codeword $CW_k$ are computed by metrics calculator 382 (FIG. 14B).

At time t=21N−e, the metrics have been calculated for the current codeword $CW_k$ and during time DELAY 364, the control circuit 320 uses e clock cycles to evaluate the metrics to determine the location and correction value for the most likely error event detected by the error syndrome (i.e., the error event that minimizes equation (9)). After the DELAY 364, during the next clock cycle the correction syndrome corresponding to the detected error event is added (XORed) to the SYN REG 288 in order to update the error syndrome for the next codeword $CW_{k+1}$.

At time t=21N, the first m+e filtered sample errors for the next codeword $CW_{k+1}$ are stored in segments 384 and 378 of buffer 374, and as they shift out of segment 378, they are corrected by CORRECTION-E 386 at adder 388 using correction values corresponding to an error event extending over from the current codeword $CW_k$. The correction to the filtered sample errors for the start of the next codeword $CW_{k+1}$ occurs concurrently with evaluating the error syndrome for the next codeword during time SYN PROC 366. In this manner, the corrections to the filtered sample errors for the start of the next codeword $CW_{k+1}$ are finished before generating the metrics for the next codeword $CW_{k+1}$ during time (MET-S,MET-E) 367. The CORRECTION-E 386 operates for up to m+n−1 clock cycles to account for the case where the longest error event of length m starts in the last bit of the current codeword $CW_k$.

Notice that in FIGS. 14A, 14B and 15, there are no corrections to the filtered sample errors at the end of the previous codeword $CW_{k-1}$ or to the current codeword $CW_k$. This is because the filtered sample errors are discarded after processing by the guided circuitry. Corrections extending into the start of the next codeword $CW_{k+1}$ are still necessary since these filtered sample errors are processed by the error pattern detector 236 (FIG. 10C) when generating the metrics for the next codeword $CW_{k+1}$.

Referring to FIG. 14B, at time t=21N the preliminary sequence 284 for the first m+e bits of the next codeword $CW_{k+1}$ are stored in segment 390 of buffer 376, and the N-bits of the current codeword $CW_k$ are stored in segment 392 of buffer 376. Concurrent with processing the error syndrome for the next codeword $CW_{k+1}$ during time SYN PROC 366, the first m−3 bits of the first part of the next codeword $CW_{k+1}$ are corrected at adder 394 by CORRECTION-E 396 using the correction values for an error event extending over from the current codeword $CW_k$ (the longest error event is m−2 in the FLUX domain). The current codeword $CW_k$ is corrected at adder 398 by CORRECTION-S 400.

Metrics Calculator

Figure 16A:
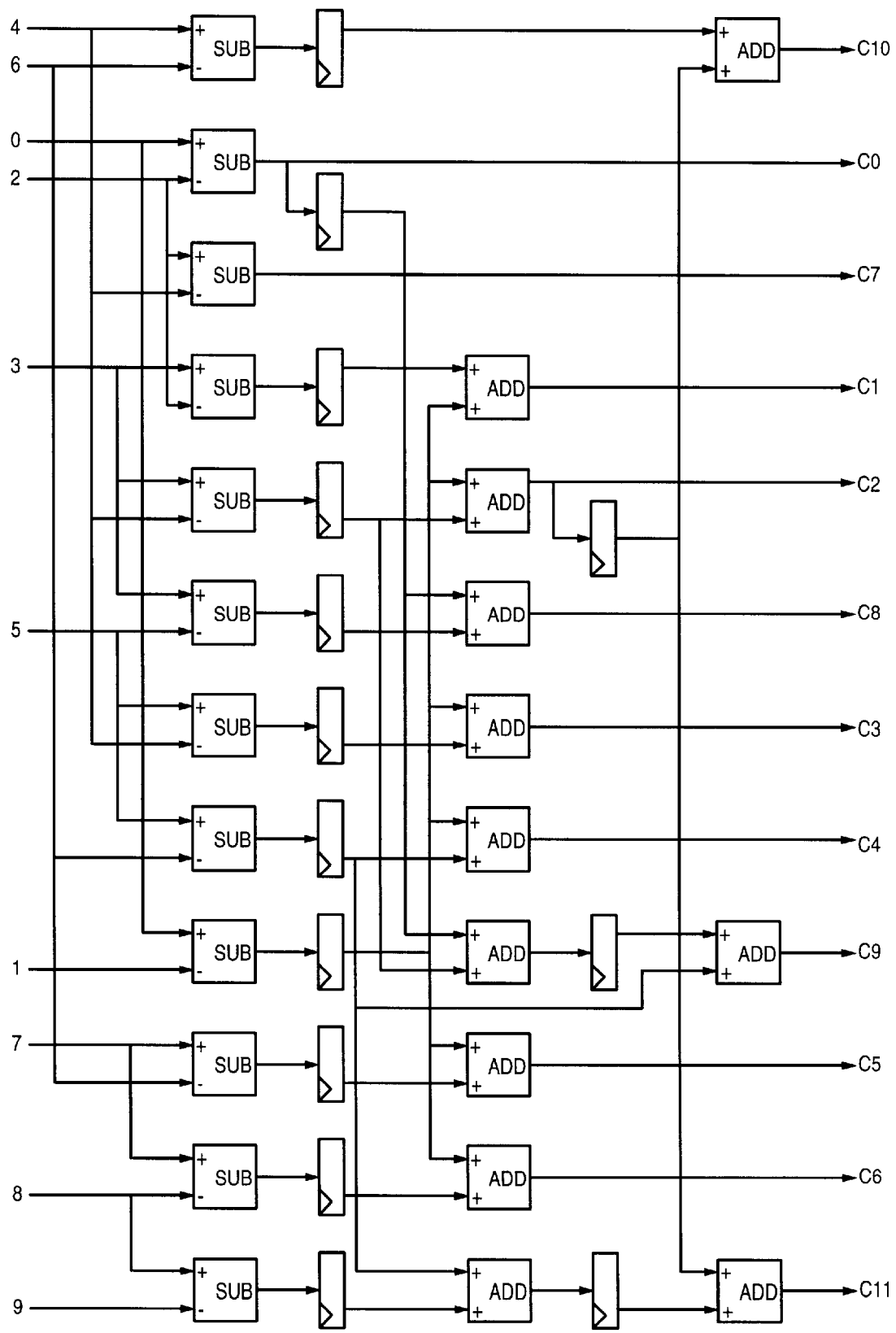
FIGS. 16A, 16B and 16C show details of the circuitry for generating and comparing the error metrics in the error pattern detectors of FIG. 9.
Figure 16B:
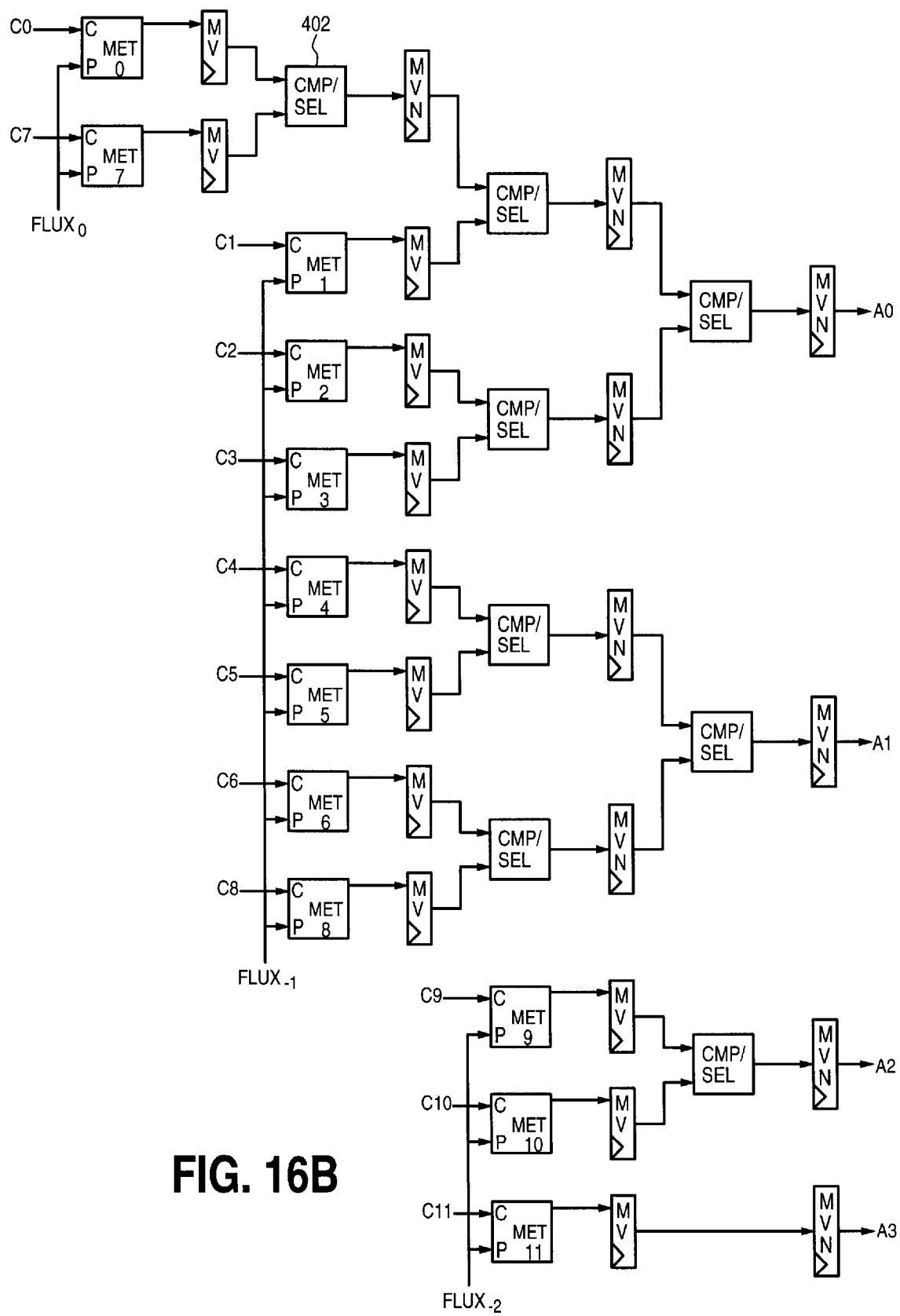
Figure 16C:
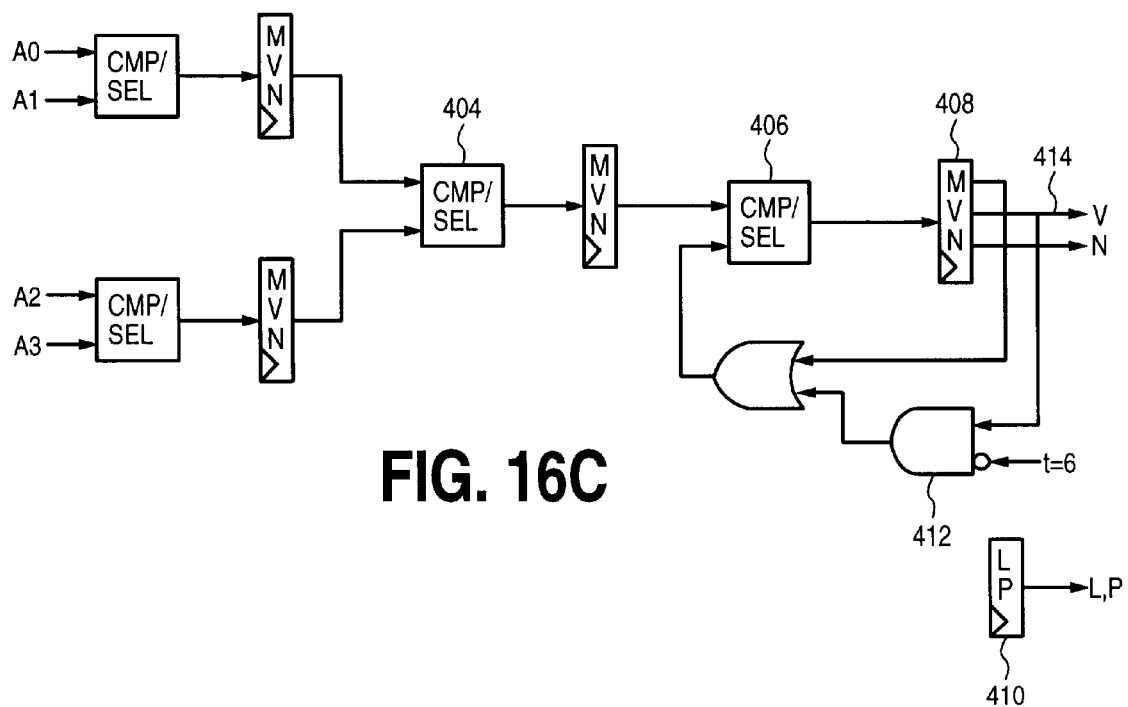

FIGS. 16A, 16B and 16C show further details of the metric calculators of FIGS. 11B and 14B for implementing equation (9) by correlating the sample errors with the error event sequences. The numbered inputs 0–9 of FIG. 16A correspond to the filtered sample errors stored in segment 314 of buffer 312 (FIG. 11B), where input 0 in FIG. 16A corresponds to the right most storage element of segment 314. The metrics calculators are pipelined so that only one add (or subtract) is performed between clocks. For example, consider the last PR4 error sequence shown in Table 5:

1,−1,0,1,−1,1,−1,0,1,−1.

The correlation of equation (8) is obtained by summing samples 0,3,5,8 and subtracting samples 1,4,6,9. This calculation is done in three clocks. On clk 0 it adds n0 and −n1, n3 and −n4, n5 and −n6, n8 and −n9. On clk 1 it adds the two pairs of sums from clk 0. On clk 2 it adds the pair of sums from clk 1 resulting in correlation C11 of FIG. 16A.

The error event correlations are calculated in FIG. 16A. In FIG. 16B the metrics are obtained from the blocks labeled "MET n". They perform the calculation $$C_E - 2*CORR_E \text{ or } C_E + 2*CORR_E \quad (21)$$

where $C_E$ is the constant of equation (7) and $CORR_E$ represents the correlation of equation (8). Whether the term $2*CORR_E$ in equation (21) is subtracted from or added to the constant $C_E$ depends on the polarity of the error event which is determined from the flux polarity of the first bit in the test position (subtracted if the flux is "0", added if it is "1"). The P input to MET 0 and MET 7 is $FLUX_0$ which represents flux bit 0 in buffer 338 of FIG. 11C, where flux bit 0 corresponds to filtered sample error 0 in buffer 312 of FIG. 11B. The P input to MET 1 to MET 6 and MET 8 is $FLUX_{-1}$ (i.e. the bit position previous to $FLUX_0$) due to the one-clock delay in obtaining these correlations, and the P input to the other MET blocks is $FLUX_{-2}$ due to the two-clock delay in obtaining these correlations. The output of each MET block is latched in a register along with a VALID bit. VALID means that the flux sequence starting at position P in buffer 338 matches either the flux sequence $S_{kFLUX}$ in Table 5 or its complement. For example, the V input to the register at the output of MET 11 is "1" if $FLUX_{-2}$ to $FLUX_5$ is 010xx010 or 101xx101.

Comparisons between metrics is performed by the CMP/SEL blocks shown in FIG. 16B. They evaluate two metrics and their corresponding VALID bits. They output the smaller valid metric along with a VALID bit and N. The VALID output is the OR of the VALID input bits. The N output is the error event number of the chosen metric, e.g. the CMP/SEL circuit 402 comparing metrics for 0 and 7 outputs either 0 or 7.

Since the number of non-zero terms in the different error sequences ranges from 2 to 8, the number of clock delays in computing metrics for a particular bit position ranges from 1 to 3. A comparison tree is organized so that comparisons are always made between metrics of different errors at the same bit position. For instance, C0 and C7 for the first position are calculated when t=0 and compared when t=1. C1 for the first position is available when t=1; it is compared to the C0/C7 comparison when t=2. All of the metrics for a particular bit position are compared in this pipelined fashion until the best metric from all of the error events is output from CMP/SEL circuit 404 shown in FIG. 16C. The last CMP/SEL circuit 406 of FIG. 16C compares the previous best metric (from a previous location) to the best metric from the current location. Whenever a new best is found, the bit location L, and flux polarity P, are latched into register 410. During time MET-E of FIG. 11A, the location is $$t-6+n+m-1$$

because when t=6 the best metric for the first MET-E location, $$n+m-1,$$

has reached the final comparator. During MET-S the location is $$t-(N-(n+m-1)+6)$$

because when $$t=N-(n+m-1)+6$$

the best metric for the first MET-S location has reached the final comparator. The polarity is $FLUX_{-6}$ because of the 6 clock delay in the comparison tree.

The C9 metric calculator of FIG. 16A consists of $$n0-n2+n3-n4+n6-n7$$

where the term n0–n2 and n3–n4 are formed in the first level. The term n0–n2+n3–n4 is formed in the second level, i.e. after one clock delay. The term n6–n7 is added one clock later. Since the delay path for n6–n7 is one less than for n0–n2 and n3–n4, n5–n6 is used instead. This is because after one clock n6 becomes n5 and n7 becomes n6. Similarly, the C10 metric calculator uses n4–n6 instead of n5–n7.

The time line in FIG. 11A shows MET-E and MET-S as non-overlapping functions. However, from t=0 to t=6 metrics from MET-S of the previous codeword $CW_{k-1}$ are being output from the comparison tree while MET-E metrics from the current codeword $CW_k$ are being input to the tree. When t=6, the registers 408 and 410 in FIG. 16C contain the best error number, location and polarity of the error event for the previous $CW_{k-1}$. The AND gate 412 in FIG. 16C forces VALID 414 from the best-so-far register 408 off so that the best for the first location in the next codeword $CW_k$ will become the new best-so-far.

Syndrome Generator

Figure 17:
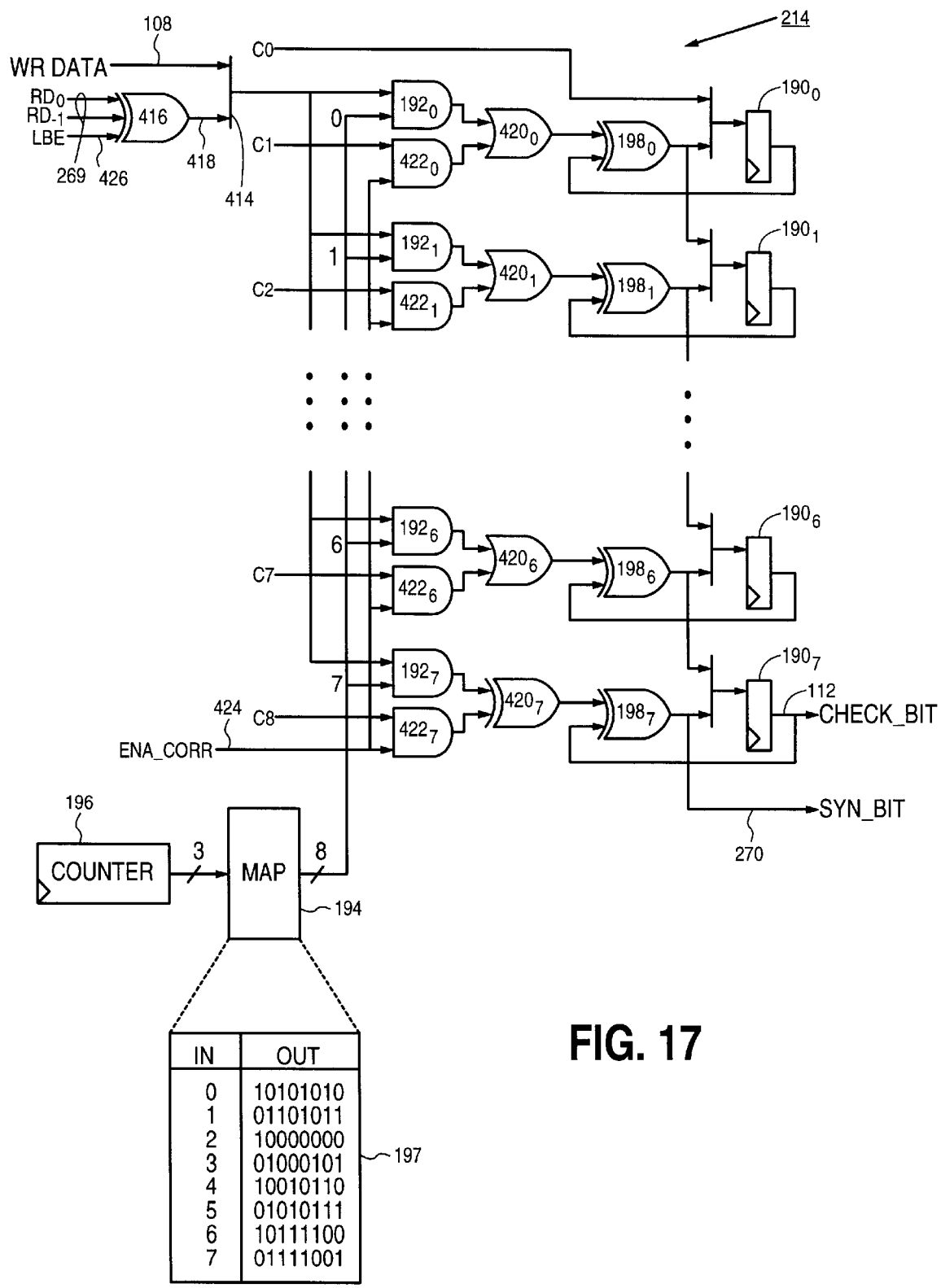
FIG. 17 shows details of the convolution code syndrome generator of FIG. 9, including circuitry to correct the error syndrome when a correction is made to the preliminary sequence.

Details of the convolution code syndrome generator 214 are shown in FIG. 17, the circuitry and operation of which is essentially the same as the check bit generator of FIG. 7 described above, with additional circuitry for adding the correction syndrome 240 (denoted C0–C8 in FIG. 17) generated by the unguided error corrector 230 of FIG. 10B. The circuitry shown in FIG. 17 performs the dual function of generating the check bit CHECK_BIT 112 during a write operation and the syndrome bit SYN_BIT 270 during a read operation. A multiplexer 414 selects as the input the write data 108 during a write operation, and the read data 269 during a read operation.

During a read operation, a current flux bit $RD_0$ and a previous flux bit $RD_{-1}$ in the preliminary sequence 269 are XORed 416 in order to convert the preliminary sequence 269 into the NRZI domain, the domain that the check bit 112 was generated in during the write operation. The resulting NRZI sequence 418 is applied to AND gates $192_0$–$192_7$ with the output of the MAP circuit 194 applied to the other input of the AND gates $192_0$–$192_7$. As the read data 418 is clocked into the convolution code syndrome generator 214, the counter 196 cycles and the contents 197 of the MAP circuit 194 are applied to the AND gates $192_0$–$192_7$. The output of AND gates $192_0$–$192_7$ are applied to XOR gates $198_0$–$198_7$ (via OR gates $420_0$–$420_7$) together with the output of the respective registers $190_0$–$190_7$, and the result of the XOR is restored to the respective registers $190_0$–$190_7$.

The syndrome generator 214 processes an entire convolution code codeword up to the check bit (50 bits in the disclosed embodiment). On the last clock of the syndrome generation, the bits C1–C8 of the correction syndrome are enabled via AND gates $422$–$422_7$ by an ENA_CORR signal 424. The bits C1–C8 of the correction syndrome are then added (XORed) into the existing syndromes stored in registers $190_1$–$190_7$ as the registers shift down. Bit C0 of the correction syndrome is simply loaded into register $190_0$ to initialize it with a starting value for the next codeword.

When the bits C0–C8 of the correction syndrome are being added to the current syndrome on the last clock cycle of syndrome generation, the output of the MAP circuit 194 is 10000000 so the read data (the check bit) is only added to the bottom state (i.e., only AND gate $192_7$ is enabled). Notice the use of an XOR $420_7$ in that stage rather than an OR. The signal LBE 426 ("last bit error") is on for the first clock of syndrome generation only if the last bit of the previous codeword is to be corrected, i.e. there is an error spanning that bit, and $E_{kFLUX}$ for that bit is non-zero. This generates the corrected NRZI bit for the first bit of the next codeword for syndrome generation.

The unguided error corrector 230 of FIG. 10B generates the correction syndrome 240 (C0–C8 in FIG. 17) based on whether the error event extends across the current codeword boundary into the next codeword. The correction syndromes for non-boundary error events are shown in Table 6. The non-boundary correction syndromes are a function of the error event number n and the location of the error L modulo 4. The correction syndromes for boundary error events are shown in Table 7. The boundary correction syndromes are a function of the error event number n and the number of bits k the error event extends into the next codeword.

Syndrome Processor

Figure 18:
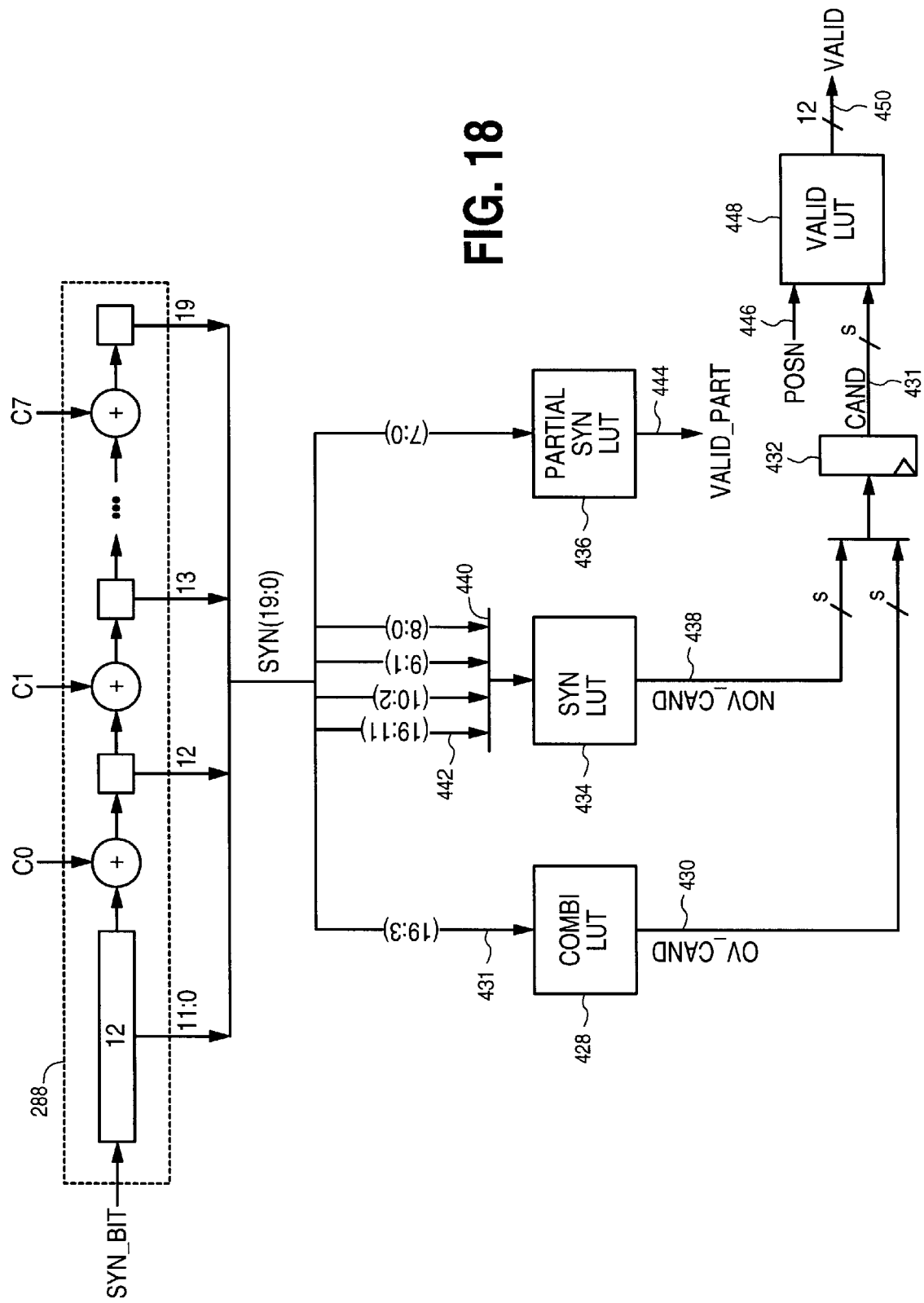
FIG. 18 shows details of a syndrome processor which evaluates the convolution code error syndrome to detect the dominant error events of the trellis sequence detector in a guided mode of the post processor.

The CONTROL circuit 320 of FIG. 14B comprises a syndrome processor, the details of which are shown in FIG. 18. The function of the syndrome processor is to determine candidate error syndromes from the 20-bit error syndrome stored in the SYN REG 288. The 20-bit error syndrome may identify a single error event (single-error), or it may identify a combination of error events (an error syndrome caused by a first error event combined with a shifted error syndrome caused by a later error event). Further, the combined error events may be overlapping in which case the resulting 20-bit error syndrome will be a combination of two overlapping single-error syndromes.

The procedure for evaluating the 20-bit error syndrome is as follows. First the 20-bit error syndrome (SYN) is examined to determine if it is a valid overlapping, combination syndrome (17 bits) followed by three zeros. This is done with a look-up table COMBI LUT 428 which outputs OV_CAND 430, the set of candidates obtained from the syndrome of two overlapping single-error syndromes. OV_CAND 430 is s bits wide, where s is the number of different single-error syndromes, i.e. the total number of different syndromes in Tables 6 and 7. Each "1" in OV_CAND 430 represents a single-error syndrome which when added (XORed) into SYN(19:3) 431 yields a shifted version of another valid single-error syndrome (corresponding to the overlapping syndrome of the later error event). OV_CAND 430 is all zeros if the input to COMBI LUT 428 is not a valid overlapping syndrome combination. If OV_CAND 430 is non-zero then it is latched as CAND 431 by register 432.

If OV_CAND 430 is zero then the next step is to determine if the 20-bit error syndrome corresponds to one single-error syndrome or a combination of non-overlapping single-error syndromes. This is done with lookup table SYN LUT 434 and lookup table PARTIAL SYN LUT 436. The output NOV_CAND 438 of SYN LUT 434 is zero if the 9-bit input does not correspond to a single-error syndrome, and it is $2^k$ if the input is a single-error syndrome from Tables 6 and 7, where k is the syndrome number (third column in the tables). An X in the SHIFT column of Table 7 means that syndrome is a shifted version of another syndrome. The number of the other, unshifted syndrome is listed in the # column for that entry. These syndromes are disqualified from being candidate syndromes because of the ambiguity in determining which codeword contains the error. These syndromes are not assigned their own syndrome number and SYN LUT 434 outputs zero if the input is one of those syndromes. However, these syndromes are generated by the unguided error corrector 230 of FIG. 10B as the correction syndromes 240 applied to the convolution code syndrome generator 214 when the first error pattern detector 228 detects these error events during the unguided mode.

When two error syndromes are shifted versions of one another as described above, the error syndrome that is disqualified as a candidate during the guided mode is the one corresponding to the less likely error event as determined from the constant $C_E$ of equation (7) and as described below. However, disqualifying one of the error syndromes is necessary in the disclosed embodiment only because the second error pattern detector 236 and guided error corrector 234 of FIG. 10C operate on one codeword at a time. In an alternative embodiment, the metrics from the following codewords could be saved and evaluated by the second error pattern detector 236. This would allow the error events corresponding to both the original and shifted error syndromes to be evaluated, and the most likely error event as determined by the metrics computed from equation (9) to be selected for correction rather than disqualifying altogether the error syndrome corresponding to the less likely error event.

If NOV_CAND 438 is non-zero when multiplexer 440 provides SYN(19:11) 442 to its input then it means that the first 9 bits of SYN match the syndrome of a correctable error event. In this case NOV_CAND 438 is latched 432 as CAND 431 and then the remaining SYN bits are examined. If they are zero or match another single-error syndrome in some position, then CAND 431 will be used as the set of candidate syndromes. The multiplexer 440 allows SYN LUT 434 to examine three 9-bit windows of the remaining 11 SYN bits. A valid second error syndrome is detected if at least one of these windows yields a non-zero SYN LUT 434 output while the remaining bits (of the 11) are zero, e.g. SYN(10) and SYN(0) are zero and SYN(9:1) yields a non-zero SYN LUT 434 output.

Another valid combination is when the second error syndrome is not completely contained in the 20 bits, i.e. the start of the second error event is at least 12 codewords from the first error event. In that case SYN(10:8) will be zero and SYN(7:0) will match some partial syndrome with leading zeros. This is detected with the PARTIAL SYN a LUT 436 which generates an output VALID_PART 444 which is "1" if its 8 bit input is k zeros followed by the first 8−k bits of some valid single-error syndrome.

In either case CAND 431 is latched 432, for the first time, at $$t=20N+d+N/2-e-1$$

and then metric calculations begin on the next clock.

If the above procedure indicates that the error syndrome corresponds to a correctable error at location N in a codeword (POSN 446), then a lookup table VALID LUT 448 outputs VALID bits 450 corresponding to one or more of the dominant error events shown in Table 5. During metric calculations, the VALID bits generated as a function of the preliminary flux sequence as described above are ANDed with the VALID bits 450 output from the lookup table VALID LUT 448 of FIG. 18 to generate the VALID bits used by the metrics calculator (FIGS. 16B and 16C) in the error pattern detector 236 of FIG. 10C. Thus, only those error events that are consistent with the 20-bit error syndrome SYN, as well as consistent with the preliminary sequence 90, are deemed valid and correctable.

The VALID LUT 448 can be viewed as 12 lookup tables (LUT), one for each error event. Each LUT can be made with a multiplexer (MUX) and some logic to generate the MUX selects from POSN 448, the codeword bit position 0 to N−1. The MUX selects between bits of CAND 431 which correspond to all the different syndromes that a particular error event can generate. For example, bit 0 at the output by VALID LUT 450 is the output of a MUX which selects between CAND bits 0,1,2,3 (the non-boundary syndromes) and bit 15 (the only boundary syndrome for E0). A logic block translates POSN 446 into the MUX select (SEL):

for POSN<N−1 SEL=POSN mod 4, for POSN=N−1 SEL=4.

When a valid error syndrome and thus a valid error event is detected and corrected, the contribution of the detected 9-bit error syndrome is subtracted from the 20-bit error syndrome stored in the syndrome register 288, thereby updating the 20-bit error syndrome and enabling the accurate detection of subsequent error events. This is accomplished by XORing the least significant eight bits of the detected 9-bit error syndrome C0–C7 (from Tables 6 and 7) into the 20-bit syndrome register 288 as shown in FIG. 18.

There may be times when the 20-bit syndrome register 288 contains a non-zero value in the last bit (bit 19) indicating the presence of an error in the current codeword, but the non-zero 20-bit error syndrome may not identify a valid 9-bit error syndrome. In other words, the output OV_CAND 430 of COMBI LUT 428 will be zero indicating that it is not a valid overlapping error syndrome, and the output NOV_CAND 438 of SYN LUT 434 will also be zero or the output VALID_PART 444 of PARTIAL SYN LUT 436 will be false indicating that it is not a valid single-error syndrome or partial single-error syndrome. If this happens, the error event is deemed uncorrectable and the 20-bit error syndrome is "flushed" by shifting it out of the syndrome register 288 without making any corrections. The syndrome register 288 is shifted one bit per codeword until some predetermined number of zeros (e.g., eight) shift into the syndrome register 288 indicating that the uncorrectable error event has passed. Thereafter, the guided error corrector 234 begins again to evaluate the 20-bit error syndrome to detect and correct error events.

In alternative embodiment if the 20-bit error syndrome does not identify a valid 9-bit error syndrome, then rather than ignore the error event and flush the syndrome register 288, it is presumed that the unidentifiable error syndrome corresponds to the most likely error event or error events. For example, in the embodiment disclosed herein, the most likely error events are E0 and E2 in Table 5. Thus, the guided error corrector 234 could correct the most likely of these two types of error events as detected by the second error pattern detector 236 FIG. 10C. The corresponding 9-bit error syndrome would then be subtracted from the 20-bit error syndrome and the correction procedure continued. Subsequently, if the residual 20-bit error syndrome is still invalid after shifting to the end of the syndrome register 288, then the error event is deemed uncorrectable and the syndrome register 288 is flushed as described above. Alternatively, the most likely error event is again corrected and the correction procedure continued for some number of iterations before the error event is deemed uncorrectable and the syndrome register 288 flushed. If the error event is eventually deemed uncorrectable, then the previous corrections made using the presumption that it was the most likely error event(s) could be rescinded.

Lookup Table Generation

The lookup tables COMBI LUT 428, SYN LUT 434, and PARTIAL SYN LUT 436 of FIG. 18 are generated using a computer search program.

The lookup table COMBI LUT 428 is generated according to the following algorithm:
1. Generate a list of all overlapping, combination syndromes. Each one is obtained by taking a single-error syndrome that is left shifted by 8 bits and then adding to that another single-error syndrome that is left shifted 0 to 7 bits. Each of these combination syndromes are 17 bits in length. There are s*s*8 members of this list because there are s different syndromes for the first syndrome, s different syndromes for the second syndrome, and 8 different shifts between the first and second syndromes.
2. Save two values for each list member: the leading (first) syndrome number and a $C_E$ sum which is the sum of 1) the smallest $C_E$ (equation (7)) of all the error events that generate the leading syndrome and 2) the smallest $C_E$ (equation (7)) of all the error events that generate the trailing syndrome.
3. Collapse all duplicates members in the list into one member and save with that member a list of the leading syndrome numbers from all of its duplicates and the lowest $C_E$ sum of any of its duplicates.
4. If a combination syndrome matches some single-error syndrome that's been left-shifted 8 bits, then it means that the combination error has the same syndrome as a single error in the same block as the leading error of the combination. In this case, one of two things will happen. If the combination syndrome can be made from a pair of errors that are both from the set {E0, E2} in Table 5 (the two most likely errors), then the number of the single-error syndrome that matched the combination syndrome is added to the combination syndrome's list of leading syndrome numbers. Otherwise the combination syndrome is dropped from the list.
5. If a combination syndrome matches some single-error syndrome that's been left-shifted more than 8 bits, then it means that the combination error has the same syndrome as a single error in an earlier block than the leading error of the combination. In this case the combination syndrome is retained in the list.
6. If a combination syndrome matches some single-error syndrome that's been left-shifted less than 8 bits, then it means that the combination error has the same syndrome as a single error in a later block than the leading error of the combination. In this case the combination syndrome is dropped from the list.
7. Form a list of all non-overlapping combination syndromes. Each one is formed by taking a single-error syndrome followed by zero or more "0"s and then followed by another single-error syndrome. If the result has length of 17 or more, from leading "1" to trailing "1", then discard it from the list.
8. Compare every overlapping combination syndrome with each non-overlapping combination syndrome. If a non-overlapping combination syndrome matches an overlapping combination syndrome when the two are left-justified, then add the number of the leading error of the non-overlapping combination to the list of leading syndromes for the overlapping combination syndrome.
9. If a non-overlapping combination syndrome matches an overlapping combination syndrome when the two are left-justified and then the non-overlapping combination is right-shifted some amount, and if the $C_E$ sum of the non-overlapping combination syndrome is less than the $C_E$ sum of the overlapping combination syndrome, then drop the overlapping combination syndrome from its list.
10. Compare all remaining overlapping combination syndromes with each other. If any one matches a shifted version of another, then drop the left-shifted one if its $C_E$ sum is greater than the $C_E$ sum of the other.

The lookup table SYN LUT 434 is generated according to the following algorithm: If the input is a syndrome from Table 6 or a non-Xed syndrome from Table 7 then the output NOV_CAND 438 is $2^k$ where k is the syndrome number (the # column in Table 6 or 7), else the output NOV_CAND 438 is zero.

The lookup table PARTIAL SYN LUT 436 is generated according to the following algorithm: If the input is k zero bits followed by 8–k bits of some syndrome of Table 6 or some non-Xed syndrome from Table 7, where k is from 0 to 8, then the output VALID_PART 444 is "1" (true) else the output VALID_PART 444 is "0" (false).

Discontinuities

Discontinuities can occur in a data sector, for example at the beginning and end of a data sector, as well as when a data sector is interrupted by a secondary sync mark or embedded servo field. If an error event spans a discontinuity, the contribution of the error event outside of the data field will not be included in the error syndrome. For example, an error event might begin at the end of a sync mark and extend into the data field. However, the convolution code error syndrome will not reflect this error event because the sync mark bits are not used to generate the check bits. It is, therefore, desirable to account for these types of boundary error events, for example, by updating the convolution code error syndrome or by inserting into the remodulator a correct data sequence corresponding to a known data pattern written to the disk at the discontinuities preceding or following the use data fields. Various techniques for compensating for boundary error events are disclosed in the above-referenced U.S.

patent entitled, "A SAMPLED AMPLITUDE READ CHANNEL EMPLOYING A POST PROCESSOR WITH A BOUNDARY ERROR COMPENSATOR WHICH COMPENSATES FOR BOUNDARY ERROR EVENTS IN A SPLIT-FIELD DATA SECTOR."

Figures 19, 20A, 20B:
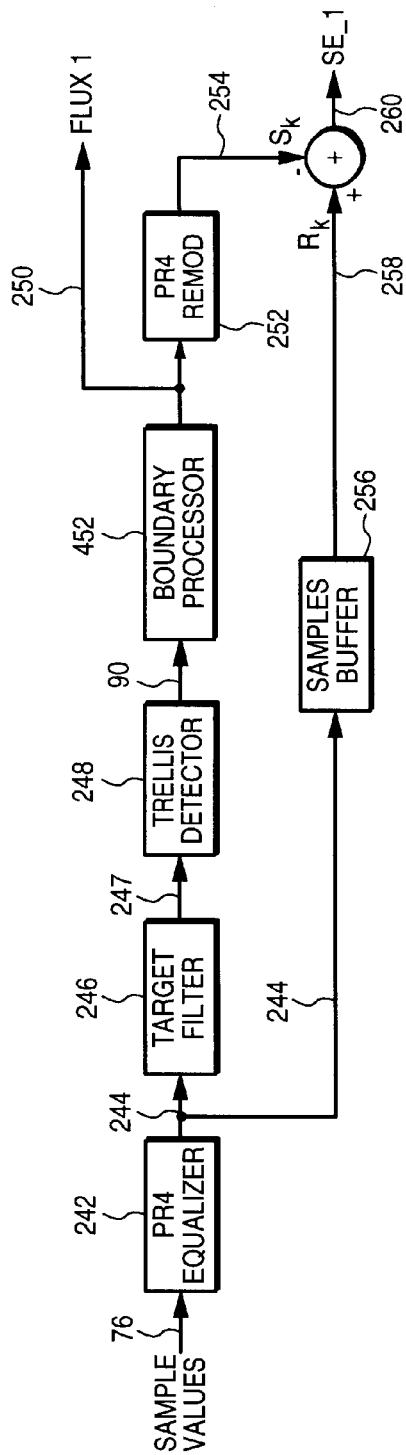
FIG. 19 is an embodiment of the present invention comprising a boundary error processor which compensates for boundary error events in split-field data sectors.
FIG. 20A is a generator matrix G for generating three EDC bits over an eleven bit field for protecting the last eight check bits at the end of a data sector.
FIG. 20B is a parity check matrix H for generating the error syndrome corresponding to the three EDC bits at the end of a data sector.

A suitable method for compensating for the boundary error events is the aforementioned technique of inserting into the remodulator a correct data sequence corresponding to a known data pattern written to the disk at the discontinuities preceding or following the user data fields. An overview of this embodiment is illustrated in FIG. 19. The circuitry is essentially the same as shown in FIG. 10A with the addition of a boundary processor 452 which evaluates the flux sequence 90 output by the trellis sequence detector 248 and the known data sequence written to the disk in order to generate a correct flux sequence 250 input into the remodulator 252. A suitable known data sequence is the known sync mark pattern at the beginning of a data field, or a special postamble at the end of the data field which prevents the dominant error events from extending past the user data field.

During sync detection, the output of the trellis sequence detector 248 should be taken four bits early (four bits from the end of path memory) so that the sync mark is detected four bits in advance. This allows the last four bits of the sync mark sequence to be input into the remodulator 252. However, because the sync mark sequence is a known pattern, the boundary processor 452 substitutes the known four bits since the last four bits of detected sync mark may be in error. The correct flux polarity for the known four bits can be determined by employing the sync mark detection technique disclosed in U.S. Pat. No. 5,729,396, the disclosure of which is incorporated herein by reference. If an error event begins in the last four bits of the sync mark and extends into the user data field, the contribution of the error event in the sync mark field will effectively be canceled by remodulating the correct four bits of the sync mark. The part of the error extending into the user data field will likely be detected and corrected by the post processor 95 because that part of the error event is covered by the convolution code error syndrome.

For discontinuities that occur at the end of a user data field, for example at the end of a data sector or when a data sector is interrupted by an embedded field (e.g., a secondary sync mark or an embedded servo field), a special postamble is added which prevents the dominant error events from extending past the end of the user data field. For example, a postamble of 010101 in NRZI will prevent the error events 1–6, 9 and 11 listed in Table 5 from occurring in the trellis sequence detector 248. This can be verified by examining the $S_{kFLUX}$ column in Table 5 with respect to the NRZI postamble sequence 010101. Assuming the last data flux bit is zero, then the written boundary flux is 0|0110011 where the left-most bit is the last data bit. The error event 0 can still occur, and the error events 7, 8 and 10 can cross over into a NRZI postamble sequence 010101, but these error events can be detected and corrected by evaluating the check bit (the last bit of the user data field) and the second and third bits of the postamble. Table 8 illustrates the possible sequences that could be detected, and the corresponding corrected output sequence (where C denotes the check bit and PPPx denotes the first four bits of the postamble). Notice that because the postamble is a known NRZI sequence, the check bit C can also be corrected. The corrected sequence (output of Table 8) is then substituted into the remodulator 252 by the boundary processor 452 and the boundary error events are disabled by controlling the VALID bits in the metrics calculators. This effectively cancels the contribution of an error event extending into the postamble leaving the contribution in the user data field which will likely be detected and corrected by the post processor 95 because that part of the error event is covered by the convolution code error syndrome.

Ending Conditions

During a write operation, it is necessary to pad the end of the data stream so that the syndrome bits are generated correctly during read back. Further, the size of a codeword may not integer divide into the size of the user data to be written to a data sector. Thus, at the end-of-data the channel encoder 36 of FIG. 6A shifts out its eight bits into the write stream 38. This is equivalent to filling out the data portion of the current codeword with "0"s, appending 7 codewords of "0" data after it, generating check bits and then deleting all of the added "0"s, keeping only the check bits.

Because the last eight check bits are recorded together, a single error event could corrupt two or more of the eight check bits potentially rendering the correction capability of the check bits useless. Thus, in order to protect the last eight check bits a 3-bit error detection code (EDC) can be employed which covers the last eleven bits of a data sector (eight check bits and three EDC bits). A corresponding EDC error syndrome is then generated at the end of a read operation which is used by the post processor 95 to correct errors detected in this eleven bit field.

An example generator matrix G for generating three EDC bits over an eleven bit field is shown in FIG. 20A. If C is a row vector consisting of the last eight check bits with the first check bit on the left, then the EDC bits are generated by multiplying C by G. The corresponding parity check matrix H is shown in FIG. 20B. If D is an eleven bit row vector consisting of the eleven bit field (eight check bits and three EDC bits), then the error syndrome is generated by multiplying D by H.

Additional protection to the ending eleven bit field can be provided by writing a NRZI postamble sequence of the form 0101 at the end of the user data field prior to the eight check bits and a NRZI postamble sequence of 010101 after the last three EDC bits. As described above with respect to discontinuities, the NRZI postamble sequence 0101 prevents the dominant error events 1–6, 9 and 11 listed in Table 5 from extending past the user data field, and it allows correcting the dominant error events 0, 7, 8 and 10 listed in Table 5 using Table 8.

At the end of a read operation, the eight check bits and three EDC bits are input into the post processor 95, and thereafter the read data is forced to zero. The eight check bits are added into the syndrome generator shift register ($190_0$–$190_7$) by MUXing them onto C8 to C1. An EDC error syndrome is generated, as explained above, and if it indicates an error occurred in the last eleven bits, the first error pattern detector 228 is used to detect the most likely error event associated with the EDC error syndrome, and the unguided error corrector 230 (guided by the EDC error syndrome) is used to correct the error event. If an error event is detected and corrected, then the error syndrome in the syndrome generator shift register ($190_0$–$190_7$) is also updated as described above.

The last codeword containing only data and no virtual pads is the last codeword for which unguided corrections can be made and boundary error corrections are prohibited in that codeword. For guided post-processing, corrections may be made in the last, partial codeword but no corrections are made that span the end of data. This is enforced by controlling the VALID bits in the metrics calculators so that no metric calculation which involves noise samples after end-of-data will be enabled.

Conclusion

The objects of the invention have been fully realized through the embodiments disclosed herein. Those skilled in the art will appreciate that the various aspects of the invention can be achieved through different embodiments without departing from the essential function. Merely manipulating the above mathematics to achieve a different implementation will not avoid the intended scope of the present invention. Further, the above-described aspects of the present invention operate essentially independent of one another. For example, an error detection convolution code could be employed in a post processor without implementing the noise whitening filter or unguided error corrector of the present invention. Similarly, an error detection code other than a convolution code could be employed to implement a post processor operating in an unguided/guided mode. These aspects do not necessarily interact to limit the scope of the present invention as appropriately construed from the following claims.

TABLE 2

| INPUT | OUTPUT | INPUT | OUTPUT |
|---|---|---|---|
| 00000000 | 01010010 | 10000000 | 10010010 |
| 00000001 | 10100101 | 10000001 | 01010011 |
| 00000010 | 10110010 | 10000010 | 10110110 |
| 00000011 | 01001011 | 10000011 | 00101001 |
| 00000100 | 01000010 | 10000100 | 10011100 |
| 00000101 | 10010111 | 10000101 | 01111101 |
| 00000110 | 11010010 | 10000110 | 11010100 |
| 00000111 | 10101001 | 10000111 | 01010010 |
| 00001000 | 00100010 | 10001000 | 10010000 |
| 00001001 | 11101001 | 10001001 | 01100011 |
| 00001010 | 11110100 | 10001010 | 11000110 |
| 00001011 | 11100101 | 10001011 | 00110011 |
| 00001100 | 10010100 | 10001100 | 01100100 |
| 00001101 | 11001001 | 10001101 | 01110111 |
| 00001110 | 10101110 | 10001110 | 01110110 |
| 00001111 | 01001001 | 10001111 | 10111111 |
| 00010000 | 00010010 | 10010000 | 10001000 |
| 00010001 | 11011011 | 10010001 | 00011011 |
| 00010010 | 00010000 | 10010010 | 10000000 |
| 00010011 | 00100011 | 10010011 | 10111111 |
| 00010100 | 01100110 | 10010100 | 00001100 |
| 00010101 | 11111011 | 10010101 | 00011111 |
| 00010110 | 11100100 | 10010110 | 01111100 |
| 00010111 | 11010111 | 10010111 | 00000101 |
| 00011000 | 01001000 | 10011000 | 01001110 |
| 00011001 | 11011101 | 10011001 | 11101011 |
| 00011010 | 11011100 | 10011010 | 01110000 |
| 00011011 | 10010001 | 10011011 | 01110001 |
| 00011100 | 11101010 | 10011100 | 10000100 |
| 00011101 | 11010001 | 10011101 | 01100111 |
| 00011110 | 10111010 | 10011110 | 11001010 |
| 00011111 | 10010101 | 10011111 | 01001101 |
| 00100000 | 11011010 | 10100000 | 01101110 |
| 00100001 | 11000101 | 10100001 | 01011111 |
| 00100010 | 00001000 | 10100010 | 01111110 |
| 00100011 | 00010011 | 10100011 | 00110011 |
| 00100100 | 01111100 | 10100100 | 11111100 |
| 00100101 | 11111001 | 10100101 | 00000001 |
| 00100110 | 11110010 | 10100110 | 01000000 |
| 00100111 | 11110101 | 10100111 | 00111101 |
| 00101000 | 11111010 | 10101000 | 00111110 |
| 00101001 | 10000011 | 10101001 | 00000011 |
| 00101010 | 11111000 | 10101010 | 11000000 |
| 00101011 | 11100111 | 10101011 | 00111111 |
| 00101100 | 11101110 | 10101100 | 00111000 |
| 00101101 | 11110111 | 10101101 | 11111101 |
| 00101110 | 11101100 | 10101110 | 00001110 |

TABLE 2-continued

| INPUT | OUTPUT | INPUT | OUTPUT |
|---|---|---|---|
| 00101111 | 10110111 | 10101111 | 01000001 |
| 00110000 | 01101010 | 10110000 | 01010000 |
| 00110001 | 10111001 | 10110001 | 01110011 |
| 00110010 | 11101000 | 10110010 | 00000010 |
| 00110011 | 10100011 | 10110011 | 00111001 |
| 00110100 | 11100010 | 10110100 | 11100110 |
| 00110101 | 01111011 | 10110101 | 11110001 |
| 00110110 | 11010110 | 10110110 | 10000010 |
| 00110111 | 10001011 | 10110111 | 00101111 |
| 00111000 | 10101100 | 10111000 | 01111010 |
| 00111001 | 10110011 | 10111001 | 00110001 |
| 00111010 | 11011000 | 10111010 | 00011110 |
| 00111011 | 11101011 | 10111011 | 10001111 |
| 00111100 | 01010110 | 10111100 | 01001100 |
| 00111101 | 10100111 | 10111101 | 01001111 |
| 00111110 | 10101000 | 10111110 | 01101000 |
| 00111111 | 10101011 | 10111111 | 10010011 |
| 01000000 | 10100110 | 11000000 | 10101010 |
| 01000001 | 10101111 | 11000001 | 11010101 |
| 01000010 | 00000100 | 11000010 | 01100010 |
| 01000011 | 11011001 | 11000011 | 01110101 |
| 01000100 | 01100000 | 11000100 | 01101100 |
| 01000101 | 11100001 | 11000101 | 00100001 |
| 01000110 | 11010000 | 11000110 | 10001010 |
| 01000111 | 11001101 | 11000111 | 01101011 |
| 01001000 | 00011000 | 11001000 | 01011110 |
| 01001001 | 00001111 | 11001001 | 00001101 |
| 01001010 | 11111110 | 11001010 | 10011110 |
| 01001011 | 00000011 | 11001011 | 01111001 |
| 01001100 | 10111100 | 11001100 | 01011100 |
| 01001101 | 10011111 | 11001101 | 01000111 |
| 01001110 | 10011000 | 11001110 | 01011000 |
| 01001111 | 10111101 | 11001111 | 01011011 |
| 01010000 | 10110100 | 11010000 | 01000010 |
| 01010001 | 10000111 | 11010001 | 00011101 |
| 01010010 | 00000000 | 11010010 | 00000110 |
| 01010011 | 10000001 | 11010011 | 01100001 |
| 01010100 | 11110000 | 11010100 | 10000110 |
| 01010101 | 11111111 | 11010101 | 11000001 |
| 01010110 | 00111100 | 11010110 | 00110110 |
| 01010111 | 11110011 | 11010111 | 00010111 |
| 01011000 | 11001000 | 11011000 | 00111010 |
| 01011001 | 11101111 | 11011001 | 01000011 |
| 01011010 | 11100000 | 11011010 | 00100000 |
| 01011011 | 11001111 | 11011011 | 00010001 |
| 01011100 | 11001011 | 11011100 | 00010100 |
| 01011101 | 01111111 | 11011101 | 00011001 |
| 01011110 | 11001000 | 11011110 | 01110100 |
| 01011111 | 10100001 | 11011111 | 01101001 |
| 01100000 | 01000100 | 11100000 | 01011010 |
| 01100001 | 11010011 | 11100001 | 01000101 |
| 01100010 | 11000010 | 11100010 | 00110100 |
| 01100011 | 10001001 | 11100011 | 01100101 |
| 01100100 | 10001100 | 11100100 | 00010110 |
| 01100101 | 11100011 | 11100101 | 00001011 |
| 01100110 | 00010100 | 11100110 | 10110100 |
| 01100111 | 10011101 | 11100111 | 00101011 |
| 01101000 | 10111110 | 11101000 | 00110010 |
| 01101001 | 11011111 | 11101001 | 00001001 |
| 01101010 | 00110000 | 11101010 | 00011100 |
| 01101011 | 11000111 | 11101011 | 10011001 |
| 01101100 | 11000100 | 11101100 | 00101110 |
| 01101101 | 01101111 | 11101101 | 00111011 |
| 01101110 | 10100000 | 11101110 | 00101100 |
| 01101111 | 01101101 | 11101111 | 01011001 |
| 01110000 | 10011010 | 11110000 | 01010100 |
| 01110001 | 10011011 | 11110001 | 10110101 |
| 01110010 | 11110110 | 11110010 | 00100110 |
| 01110011 | 10110001 | 11110011 | 01010111 |
| 01110100 | 11011110 | 11110100 | 00001010 |
| 01110101 | 11000011 | 11110101 | 00100111 |
| 01110110 | 10001110 | 11110110 | 01110010 |
| 01110111 | 10001101 | 11110111 | 00101101 |
| 01111000 | 00100100 | 11111000 | 00101010 |
| 01111001 | 11001011 | 11111001 | 00100101 |
| 01111010 | 10111000 | 11111010 | 00101000 |
| 01111011 | 00110101 | 11111011 | 00010101 |

TABLE 2-continued

| INPUT | OUTPUT | INPUT | OUTPUT |
| --- | --- | --- | --- |
| 01111100 | 10010110 | 11111100 | 10100100 |
| 01111101 | 10000101 | 11111101 | 10101101 |
| 01111110 | 10100010 | 11111110 | 01001010 |
| 01111111 | 01011101 | 11111111 | 01010101 |

TABLE 3

| INPUT | OUTPUT | INPUT | OUTPUT |
| --- | --- | --- | --- |
| 00000000 | 01000010 | 10000000 | 10100100 |
| 00000001 | 10100010 | 10000001 | 01010101 |
| 00000010 | 01001101 | 10000010 | 01100110 |
| 00000011 | 01000101 | 10000011 | 00100100 |
| 00000100 | 11000010 | 10000100 | 01101011 |
| 00000101 | 11000101 | 10000101 | 01100111 |
| 00000110 | 01100010 | 10000110 | 11011010 |
| 00000111 | 01000100 | 10000111 | 01100101 |
| 00001000 | 10100010 | 10001000 | 01000001 |
| 00001001 | 10010010 | 10001001 | 01100000 |
| 00001010 | 10111101 | 10001010 | 10010001 |
| 00001011 | 10010101 | 10001011 | 00110110 |
| 00001100 | 01000110 | 10001100 | 00100110 |
| 00001101 | 01000111 | 10001101 | 01100011 |
| 00001110 | 01000001 | 10001110 | 10010100 |
| 00001111 | 10100101 | 10001111 | 10110101 |
| 00010000 | 01011001 | 10010000 | 01011110 |
| 00010001 | 10110110 | 10010001 | 01001110 |
| 00010010 | 00011011 | 10010010 | 11110011 |
| 00010011 | 11001010 | 10010011 | 10010011 |
| 00010100 | 11111010 | 10010100 | 00001000 |
| 00010101 | 11101100 | 10010101 | 11111100 |
| 00010110 | 11011001 | 10010110 | 11100000 |
| 00010111 | 10110011 | 10010111 | 01101000 |
| 00011000 | 11000000 | 10011000 | 00110000 |
| 00011001 | 00001010 | 10011001 | 11101111 |
| 00011010 | 01110001 | 10011010 | 00111111 |
| 00011011 | 00000110 | 10011011 | 11011111 |
| 00011100 | 10011001 | 10011100 | 01110110 |
| 00011101 | 11011001 | 10011101 | 00011000 |
| 00011110 | 10111100 | 10011110 | 00010111 |
| 00011111 | 10101001 | 10011111 | 01010000 |
| 00100000 | 10000101 | 10100000 | 01010111 |
| 00100001 | 10100001 | 10100001 | 01011101 |
| 00100010 | 00000011 | 10100010 | 00010011 |
| 00100011 | 10000011 | 10100011 | 00101000 |
| 00100100 | 11011100 | 10100100 | 11001111 |
| 00100101 | 11010000 | 10100101 | 10111111 |
| 00100110 | 10101110 | 10100110 | 01001011 |
| 00100111 | 10111010 | 10100111 | 11101100 |
| 00101000 | 11001000 | 10101000 | 10011111 |
| 00101001 | 00111001 | 10101001 | 11111001 |
| 00101010 | 00001011 | 10101010 | 11111110 |
| 00101011 | 00011110 | 10101011 | 11110001 |
| 00101100 | 11010011 | 10101100 | 01101110 |
| 00101101 | 11110101 | 10101101 | 00001100 |
| 00101110 | 11110100 | 10101110 | 00001011 |
| 00101111 | 10110111 | 10101111 | 11101011 |
| 00110000 | 01000011 | 10110000 | 00100011 |
| 00110001 | 00101010 | 10110001 | 01010011 |
| 00110010 | 10010010 | 10110010 | 01001111 |
| 00110011 | 10000100 | 10110011 | 01111010 |
| 00110100 | 11001011 | 10110100 | 00000000 |
| 00110101 | 10111011 | 10110101 | 11110110 |
| 00110110 | 11010010 | 10110110 | 11100111 |
| 00110111 | 01101010 | 10110111 | 01001000 |
| 00111000 | 10001101 | 10111000 | 00111101 |
| 00111001 | 10010111 | 10111001 | 11101110 |
| 00111010 | 01110111 | 10111010 | 01111110 |
| 00111011 | 10000000 | 10111011 | 11001110 |
| 00111100 | 11000110 | 10111100 | 00111010 |
| 00111101 | 10000111 | 10111101 | 00110001 |
| 00111110 | 10000001 | 10111110 | 00101111 |
| 00111111 | 10011010 | 10111111 | 00000100 |
| 01000000 | 01010110 | 11000000 | 01011010 |

TABLE 3-continued

| INPUT | OUTPUT | INPUT | OUTPUT |
| --- | --- | --- | --- |
| 01000001 | 01011000 | 11000001 | 01010100 |
| 01000010 | 11110010 | 11000010 | 00110010 |
| 01000011 | 10101000 | 11000011 | 10110100 |
| 01000100 | 10011100 | 11000100 | 00100000 |
| 01000101 | 10010000 | 11000101 | 00011010 |
| 01000110 | 01101001 | 11000110 | 10100111 |
| 01000111 | 01101100 | 11000111 | 10110010 |
| 01001000 | 10001000 | 11001000 | 00000101 |
| 01001001 | 00011101 | 11001001 | 00010101 |
| 01001010 | 11111100 | 11001010 | 00010110 |
| 01001011 | 00010001 | 11001011 | 00010100 |
| 01001100 | 10101111 | 11001100 | 11100101 |
| 01001101 | 11101001 | 11001101 | 00110101 |
| 01001110 | 01111001 | 11001110 | 00110100 |
| 01001111 | 10001010 | 11001111 | 10101101 |
| 01010000 | 10110000 | 11010000 | 01001001 |
| 01010001 | 11011110 | 11010001 | 00101001 |
| 01010010 | 11111000 | 11010010 | 10111110 |
| 01010011 | 01111000 | 11010011 | 00010010 |
| 01010100 | 00011111 | 11010100 | 10001111 |
| 01010101 | 00001111 | 11010101 | 01111110 |
| 01010110 | 10001110 | 11010110 | 00101110 |
| 01010111 | 10111000 | 11010111 | 11100001 |
| 01011000 | 01110000 | 11011000 | 00011001 |
| 01011001 | 11110000 | 11011001 | 00001001 |
| 01011010 | 11111111 | 11011010 | 00111110 |
| 01011011 | 01111111 | 11011011 | 01111101 |
| 01011100 | 11111011 | 11011100 | 00110011 |
| 01011101 | 00111000 | 11011101 | 00001101 |
| 01011110 | 00011111 | 11011110 | 00000111 |
| 01011111 | 11001001 | 11011111 | 11101101 |
| 01100000 | 00100101 | 11100000 | 00100010 |
| 01100001 | 11100010 | 11100001 | 01010010 |
| 01100010 | 01101100 | 11100010 | 00101100 |
| 01100011 | 01001100 | 11100011 | 10100110 |
| 01100100 | 01111011 | 11100100 | 11100110 |
| 01100101 | 10001100 | 11100101 | 11100011 |
| 01100110 | 11010100 | 11100110 | 10101011 |
| 01100111 | 01001011 | 11100111 | 10100011 |
| 01101000 | 10001011 | 11101000 | 10110001 |
| 01101001 | 11010001 | 11101001 | 11001100 |
| 01101010 | 11110110 | 11101010 | 00000001 |
| 01101011 | 11011101 | 11101011 | 11010111 |
| 01101100 | 10000110 | 11101100 | 11100100 |
| 01101101 | 01110010 | 11101101 | 00101011 |
| 01101110 | 01110101 | 11101110 | 00100111 |
| 01101111 | 01000000 | 11101111 | 10000010 |
| 01110000 | 00101101 | 11110000 | 10101010 |
| 01110001 | 01101101 | 11110001 | 01001010 |
| 01110010 | 10111001 | 11110010 | 00100001 |
| 01110011 | 11000011 | 11110011 | 11000010 |
| 01110100 | 01110011 | 11110100 | 11010110 |
| 01110101 | 01101111 | 11110101 | 11001101 |
| 01110110 | 01011100 | 11110110 | 10101100 |
| 01110111 | 01010001 | 11110111 | 01100100 |
| 01111000 | 10011110 | 11111000 | 00000010 |
| 01111001 | 00111100 | 11111001 | 11000111 |
| 01111010 | 00010000 | 11111010 | 00110111 |
| 01111011 | 00111011 | 11111011 | 11000001 |
| 01111100 | 10011000 | 11111100 | 11010101 |
| 01111101 | 10011101 | 11111101 | 11101010 |
| 01111110 | 10001001 | 11111110 | 11011011 |
| 01111111 | 10011011 | 11111111 | 01011011 |

TABLE 4

| INPUT | OUTPUT | INPUT | OUTPUT |
| --- | --- | --- | --- |
| 00000000 | 10110100 | 10000000 | 00111011 |
| 00000001 | 11101010 | 10000001 | 00111110 |
| 00000010 | 11111000 | 10000010 | 11101111 |
| 00000011 | 00100010 | 10000011 | 00100011 |
| 00000100 | 10111111 | 10000100 | 00110011 |
| 00000101 | 11001000 | 10000101 | 00100000 |

TABLE 4-continued

| INPUT | OUTPUT | INPUT | OUTPUT |
|---|---|---|---|
| 00000110 | 00011011 | 10000110 | 01101100 |
| 00000111 | 11011110 | 10000111 | 00111101 |
| 00001000 | 10010100 | 10001000 | 01001000 |
| 00001001 | 11011001 | 10001001 | 01111110 |
| 00001010 | 00011001 | 10001010 | 01001111 |
| 00001011 | 10101110 | 10001011 | 01101000 |
| 00001100 | 10101101 | 10001100 | 01100101 |
| 00001101 | 11011101 | 10001101 | 00111000 |
| 00001110 | 00101010 | 10001110 | 01010110 |
| 00001111 | 01010101 | 10001111 | 11010100 |
| 00010000 | 01111010 | 10010000 | 01000101 |
| 00010001 | 01001011 | 10010001 | 10001010 |
| 00010010 | 11010011 | 10010010 | 00001001 |
| 00010011 | 10100010 | 10010011 | 10010011 |
| 00010100 | 11001011 | 10010100 | 10001110 |
| 00010101 | 11001001 | 10010101 | 00001011 |
| 00010110 | 11001100 | 10010110 | 00110110 |
| 00010111 | 10011110 | 10010111 | 00111001 |
| 00011000 | 10011101 | 10011000 | 01111100 |
| 00011001 | 11011000 | 10011001 | 00011100 |
| 00011010 | 11000101 | 10011010 | 00111111 |
| 00011011 | 00010010 | 10011011 | 01111111 |
| 00011100 | 01011110 | 10011100 | 01000100 |
| 00011101 | 01001001 | 10011101 | 01111101 |
| 00011110 | 00101011 | 10011110 | 01111000 |
| 00011111 | 01010100 | 10011111 | 10101000 |
| 00100000 | 11000100 | 10100000 | 00100001 |
| 00100001 | 11110010 | 10100001 | 00001000 |
| 00100010 | 11100000 | 10100010 | 00000001 |
| 00100011 | 10110110 | 10100011 | 11100111 |
| 00100100 | 10000011 | 10100100 | 10000000 |
| 00100101 | 01100000 | 10100101 | 00001111 |
| 00100110 | 10001100 | 10100110 | 11100011 |
| 00100111 | 11101110 | 10100111 | 11000110 |
| 00101000 | 10100011 | 10101000 | 01000011 |
| 00101001 | 11010001 | 10101001 | 00011111 |
| 00101010 | 00110001 | 10101010 | 11110000 |
| 00101011 | 11101101 | 10101011 | 11100110 |
| 00101100 | 11100010 | 10101100 | 11110110 |
| 00101101 | 01110000 | 10101101 | 11001111 |
| 00101110 | 11010110 | 10101110 | 00100110 |
| 00101111 | 10111110 | 10101111 | 01001100 |
| 00110000 | 10011000 | 10110000 | 01010000 |
| 00110001 | 10111101 | 10110001 | 11101000 |
| 00110010 | 11000010 | 10110010 | 11000111 |
| 00110011 | 11001100 | 10110011 | 00010111 |
| 00110100 | 11001110 | 10110100 | 11000011 |
| 00110101 | 11001101 | 10110101 | 10001111 |
| 00110110 | 10001011 | 10110110 | 00010001 |
| 00110111 | 11111010 | 10110111 | 00101111 |
| 00111000 | 01011101 | 10111000 | 01010111 |
| 00111001 | 00101001 | 10111001 | 01110010 |
| 00111010 | 10111100 | 10111010 | 00100111 |
| 00111011 | 01111011 | 10111011 | 00110101 |
| 00111100 | 01111111 | 10111100 | 00011011 |
| 00111101 | 10111000 | 10111101 | 00001010 |
| 00111110 | 11011010 | 10111110 | 11010010 |
| 00111111 | 10011010 | 10111111 | 10100101 |
| 01000000 | 01101111 | 11000000 | 00011011 |
| 01000001 | 00001110 | 11000001 | 11111011 |
| 01000010 | 00000000 | 11000010 | 11110011 |
| 01000011 | 00110000 | 11000011 | 01110011 |
| 01000100 | 00000111 | 11000100 | 00000100 |
| 01000101 | 00000011 | 11000101 | 00000101 |
| 01000110 | 00001100 | 11000110 | 00111100 |
| 01000111 | 00001101 | 11000111 | 11111001 |
| 01001000 | 10110100 | 11001000 | 00101001 |
| 01001001 | 11010000 | 11001001 | 01011111 |
| 01001010 | 11110001 | 11001010 | 00010011 |
| 01001011 | 01100111 | 11001011 | 00110100 |
| 01001100 | 01100011 | 11001100 | 11101001 |
| 01001101 | 00000010 | 11001101 | 11110101 |
| 01001110 | 10010001 | 11001110 | 10111011 |
| 01001111 | 10100110 | 11001111 | 10100100 |
| 01010000 | 10011111 | 11010000 | 00100101 |

TABLE 4-continued

| INPUT | OUTPUT | INPUT | OUTPUT |
|---|---|---|---|
| 01010001 | 01110111 | 11010001 | 01101001 |
| 01010010 | 11100001 | 11010010 | 00110110 |
| 01010011 | 10110001 | 11010011 | 00101100 |
| 01010100 | 11000001 | 11010100 | 01100110 |
| 01010101 | 10000001 | 11010101 | 11111100 |
| 01010110 | 01000000 | 11010110 | 11110100 |
| 01010111 | 10100000 | 11010111 | 11101011 |
| 01011000 | 01000001 | 11011000 | 00011101 |
| 01011001 | 00010000 | 11011001 | 00010110 |
| 01011010 | 11000000 | 11011010 | 10000110 |
| 01011011 | 11111111 | 11011011 | 11111110 |
| 01011100 | 01110110 | 11011100 | 00100100 |
| 01011101 | 10100001 | 11011101 | 01101011 |
| 01011110 | 10010000 | 11011110 | 01010001 |
| 01011111 | 10110010 | 11011111 | 10011011 |
| 01100000 | 10001001 | 11100000 | 10010110 |
| 01100001 | 10001000 | 11100001 | 11010111 |
| 01100010 | 00000110 | 11100010 | 01100001 |
| 01100011 | 10001101 | 11100011 | 11100101 |
| 01100100 | 11110111 | 11100100 | 11101100 |
| 01100101 | 10000111 | 11100101 | 11001100 |
| 01100110 | 10000010 | 11100110 | 11100100 |
| 01100111 | 10000101 | 11100111 | 10110110 |
| 01101000 | 10010111 | 11101000 | 00010101 |
| 01101001 | 01000110 | 11101001 | 01001101 |
| 01101010 | 00110111 | 11101010 | 11111101 |
| 01101011 | 10000100 | 11101011 | 10101111 |
| 01101100 | 01000111 | 11101100 | 10100111 |
| 01101101 | 01110001 | 11101101 | 11011111 |
| 01101110 | 10101100 | 11101110 | 10111001 |
| 01101111 | 01110101 | 11101111 | 10011001 |
| 01110000 | 01011000 | 11110000 | 01011001 |
| 01110001 | 00011010 | 11110001 | 10101011 |
| 01110010 | 01101101 | 11110010 | 01000010 |
| 01110011 | 01110100 | 11110011 | 10010010 |
| 01110100 | 01100010 | 11110100 | 00101110 |
| 01110101 | 01101110 | 11110101 | 00101101 |
| 01110110 | 10011100 | 11110110 | 10110101 |
| 01110111 | 00111010 | 11110111 | 01101010 |
| 01111000 | 01010011 | 11111000 | 01010010 |
| 01111001 | 01001110 | 11111001 | 10101001 |
| 01111010 | 10110011 | 11111010 | 00010100 |
| 01111011 | 01100100 | 11111011 | 01011100 |
| 01111100 | 11010101 | 11111100 | 01001010 |
| 01111101 | 11011011 | 11111101 | 10010101 |
| 01111110 | 10111010 | 11111110 | 10101010 |
| 01111111 | 01011011 | 11111111 | 01011010 |

TABLE 5

| En | $E_{kFLUX}$ | $E_{kSNRZ1}$ | $E_{kPR4}$ | $S_{kFLUX}$ |
|---|---|---|---|---|
| 0  | +         | 1, −1                      | 1, 0, −1                         | 0       |
| 1  | +−        | 1, −2, 1                   | 1, −1, −1, 1                     | 01      |
| 2  | +−+       | 1, −2, 2, −1               | 1, −1, 0, 1, −1                  | 010     |
| 3  | +−+−      | 1, −2, 2, −2, 1            | 1, −1, 0, 0, −1, 1               | 0101    |
| 4  | +−+−+     | 1, −2, 2, −2, 2, −1        | 1, −1, 0, 0, 0, 1, −1            | 01010   |
| 5  | +−+−+−    | 1, −2, 2, −2, 2, −2, 1     | 1, −1, 0, 0, 0, 0, −1, 1         | 010101  |
| 6  | +−+−+−+   | 1, −2, 2, −2, 2, −2, 2, −1 | 1, −1, 0, 0, 0, 0, 0, 1, −1      | 0101010 |
| 7  | +0+       | 1, −1, 1, −1               | 1, 0, 0, 0, −1                   | 0x0     |
| 8  | +00+      | 1, −1, 0, 1, −1            | 1, 0, −1, 1, 0, −1               | 0xx0    |
| 9  | +00+−+    | 1, −1, 0, 1, −2, 2, −1     | 1, 0, −1, 1, −1, 0, 1, −1        | 0xx010  |
| 10 | +−+00+    | 1, −2, 2, −1, 0, 1, −1     | 1, −1, 0, 1, −1, 1, 0, −1        | 010xx0  |
| 11 | +−+00+−+  | 1, −2, 2, −1, 0, 1, −2, 2, −1 | 1, −1, 0, 1, −1, 1, −1, 0, 1, −1 | 010xx010 |

TABLE 6

| En-L mod 4 | SYNDROME | # |
|---|---|---|
| E0-0, E6-1 | 110000010 | 0 |
| E0-1, E6-2 | 111010110 | 1 |
| E0-2, E6-3 | 110001010 | 2 |
| E0-3, E6-0 | 110100110 | 3 |
| E2-0, E4-3 | 111011110 | 4 |
| E2-1, E4-0 | 111111010 | 5 |
| E2-2, E4-1 | 110101110 | 6 |
| E2-3, E4-2 | 111110010 | 7 |
| E1-0, E5-2, E8-1, E11-1 | 001010100 | 8 |
| E1-1, E5-3, E8-2, E11-2 | 001011100 | 9 |
| E1-2, E5-0, E8-3, E11-3 | 000101100 | 10 |
| E1-3, E5-1, E8-0, E11-0 | 000100100 | 11 |
| E3 | 001111000 | 12 |
| E7-0,2, E9-1,3, E10-0,2 | 000001000 | 13 |
| E7-1,3, E9-0,2, E10-1,3 | 001110000 | 14 |

TABLE 7

| En-k | SYNDROME | # | SHIFT |
|---|---|---|---|
| E0-1 | 110101010 | 15 | |
| E1-1 | 001111100 | 16 | |
| E1-2 | 101101011 | 17 | |
| E2-1 | 111111110 | 18 | |
| E2-2 | 010111101 | 19 | |
| E2-3 | 110000000 | 20 | |
| E3-1 | 001011000 | 10 | X |
| E3-2 | 100111111 | 21 | |
| E3-3 | 001010110 | 22 | |
| E3-4 | 101000101 | 23 | |
| E4-1 | 111010010 | 24 | |
| E4-2 | 010011001 | 25 | |
| E4-3 | 111010100 | 26 | |
| E4-4 | 010010011 | 27 | |
| E4-5 | 110010110 | 28 | |
| E5-1 | 000000100 | 13 | X |
| E5-2 | 100010011 | 29 | |
| E5-3 | 001110010 | 30 | |
| E5-4 | 100010001 | 31 | |
| E5-5 | 001000000 | 13 | X |
| E5-6 | 101010111 | 32 | |
| E6-1 | 110000110 | 33 | |
| E6-2 | 011000101 | 2 | X |
| E6-3 | 111111000 | 34 | |
| E6-4 | 010110111 | 35 | |
| E6-5 | 111000010 | 36 | |
| E6-6 | 010000001 | 37 | |
| E6-7 | 110111100 | 38 | |
| E7-1, E9-1 | 000101000 | 39 | |
| E7-2 | 100010111 | 40 | |
| E7-3, E10-6, E11-4 | 101000001 | 41 | |
| E8-1, E11-1 | 000001100 | 18 | X |
| E8-2 | 101000011 | 42 | |
| E8-3 | 100111101 | 43 | |
| E8-4, E10-2, E11-8 | 101101111 | 44 | |
| E9-2 | 100110111 | 45 | |
| E9-3 | 000100110 | 46 | |
| E9-4 | 101101101 | 47 | |
| E9-5 | 100101011 | 48 | |
| E9-6 | 101111101 | 49 | |
| E10-1 | 001010000 | 39 | X |
| E10-3 | 100011001 | 50 | |
| E10-4 | 100111011 | 51 | |
| E10-5 | 00110111a | 52 | |
| E11-2 | 101100011 | 53 | |
| E11-3 | 001111010 | 54 | |
| E11-5 | 100001111 | 55 | |
| E11-6 | 100101001 | 56 | |
| E11-7 | 001000100 | 57 | |

TABLE 8

| CPPPx | OUTPUT |
|---|---|
| 0x00x | 11001 |
| 0xx1x | 00110 |
| 0x1xx | 00110 |
| 1xx0x | 11001 |
| 1x0xx | 11001 |
| 1x11x | 00110 |

APPENDIX A

PR4-PREV-14 = PREV-13 XOR PREV-14
PR4-PREV-15 = PREV-14 XOR PREV-15
PR4-PREV-16 = PREV-15 XOR PREV-16
PR4-PREV-17 = PREV-16 XOR PREV-17
PR4-PREV-18 = PREV-17 XOR PREV-18
PR4-PREV-19 = PREV-18 XOR PREV-19
PR4-PREV-20 = PREV-19 XOR PREV-20
PR4-PREV-21 = PREV-20 XOR PREV-21
PR4-PREV-22 = PREV-21 XOR PREV-22
PR4-PREV-23 = PREV-22 XOR PREV-23
PR4-PREV-24 = PREV-23 XOR PREV-24
PR4-RAW-0 = PREV-16 XOR UNMAPPED-NEXT-0
PR4-RAW-1 = UNMAPPED-NEXT-0 XOR UNMAPPED-NEXT-1
PR4-RAW-2 = UNMAPPED-NEXT-1 XOR UNMAPPED-NEXT-2
PR4-RAW-3 = UNMAPPED-NEXT-2 XOR UNMAPPED-NEXT-3
PR4-RAW-4 = UNMAPPED-NEXT-3 XOR UNMAPPED-NEXT-4
PR4-RAW-5 = UNMAPPED-NEXT-4 XOR UNMAPPED-NEXT-5
PR4-RAW-6 = UNMAPPED-NEXT-5 XOR UNMAPPED-NEXT-6
PR4-RAW-7 = UNMAPPED-NEXT-6 XOR UNMAPPED-NEXT-7
PR4-RAW-8 = UNMAPPED-NEXT-7 XOR UNMAPPED-NEXT-8
PR4-RAW-9 = UNMAPPED-NEXT-8 XOR UNMAPPED-NEXT-9
PR4-RAW-10 = UNMAPPED-NEXT-9 XOR UNMAPPED-NEXT-10
PR4-RAW-11 = UNMAPPED-NEXT-10 XOR UNMAPPED-NEXT-11

APPENDIX A-continued

```
PR4-RAW-12 = UNMAPPED-NEXT-11
PR4-RAW-13 = UNMAPPED-NEXT-13
PR4-RAW-14 = UNMAPPED-NEXT-13 XOR UNMAPPED-NEXT-14
PR4-RAW-15 = UNMAPPED-NEXT-14 XOR UNMAPPED-NEXT-15
PR4-RAW-16 = UNMAPPED-NEXT-15 XOR UNMAPPED-NEXT-16
PR4-RAW-17 = UNMAPPED-NEXT-16 XOR UNMAPPED-NEXT-17
PR4-RAW-18 = UNMAPPED-NEXT-17 XOR UNMAPPED-NEXT-18
PR4-RAW-19 = UNMAPPED-NEXT-18 XOR UNMAPPED-NEXT-19
PR4-RAW-20 = UNMAPPED-NEXT-19 XOR UNMAPPED-NEXT-20
PR4-RAW-21 = UNMAPPED-NEXT-20 XOR UNMAPPED-NEXT-21
PR4-RAW-22 = UNMAPPED-NEXT-21 XOR UNMAPPED-NEXT-22
PR4-RAW-23 = UNMAPPED-NEXT-22 XOR UNMAPPED-NEXT-23
PR4-RAW-24 = UNMAPPED-NEXT-23 XOR UNMAPPED-NEXT-24
PR4-MAP-0 = PREV-16 XOR MAPPED-NEXT-0
PR4-MAP-1 = MAPPED-NEXT-0 XOR MAPPED-NEXT-1
PR4-MAP-2 = MAPPED-NEXT-1 XOR MAPPED-NEXT-2
PR4-MAP-3 = MAPPED-NEXT-2 XOR MAPPED-NEXT-3
PR4-MAP-4 = MAPPED-NEXT-3 XOR MAPPED-NEXT-4
PR4-MAP-5 = MAPPED-NEXT-4 XOR MAPPED-NEXT-5
PR4-MAP-6 = MAPPED-NEXT-5 XOR MAPPED-NEXT-6
PR4-MAP-7 = MAPPED-NEXT-6 XOR MAPPED-NEXT-7
PR4-MAP-8 = MAPPED-NEXT-7 XOR MAPPED-NEXT-8
PR4-MAP-9 = MAPPED-NEXT-8 XOR MAPPED-NEXT-9
PR4-MAP-10 = MAPPED-NEXT-9 XOR MAPPED-NEXT-10
PR4-MAP-11 = MAPPED-NEXT-10 XOR MAPPED-NEXT-11
PR4-MAP-12 = NOT MAPPED-NEXT-11
PR4-MAP-13 = NOT MAPPED-NEXT-13
PR4-MAP-14 = MAPPED-NEXT-13 XOR MAPPED-NEXT-14
PR4-MAP-15 = MAPPED-NEXT-14 XOR MAPPED-NEXT-15
PR4-MAP-16 = MAPPED-NEXT-15 XOR MAPPED-NEXT-16
PR4-MAP-17 = MAPPED-NEXT-16 XOR MAPPED-NEXT-17
PR4-MAP-18 = MAPPED-NEXT-17 XOR MAPPED-NEXT-18
PR4-MAP-19 = MAPPED-NEXT-18 XOR MAPPED-NEXT-19
PR4-MAP-20 = MAPPED-NEXT-19 XOR MAPPED-NEXT-20
PR4-MAP-21 = MAPPED-NEXT-20 XOR MAPPED-NEXT-21
PR4-MAP-22 = MAPPED-NEXT-21 XOR MAPPED-NEXT-22
PR4-MAP-23 = MAPPED-NEXT-22 XOR MAPPED-NEXT-23
PR4-MAP-24 = MAPPED-NEXT-23 XOR MAPPED-NEXT-24
FORCE = NOR(PR4-PREV-14, 16, 18, 20, 22, 24
PR4-RAW-1, 3, 5, 7, 9, 11) OR
NOR(PR4-PREV-16, 18, 20, 22, 24 PR4-RAW-1, 3, 5, 7, 9, 11, 13) OR
NOR(PR4-PREV-18, 20, 22, 24 PR4-RAW-1, 3, 5, 7, 9, 11, 13, 15) OR
NOR(PR4-PREV-20, 22, 24 PR4-RAW-1, 3, 5, 7, 9, 11, 13, 15, 17) OR
NOR(PR4-PREV-22, 24 PR4-RAW-1, 3, 5, 7, 9, 11, 13, 15, 17, 19) OR
NOR(PR4-PREV-24 PR4-RAW-1, 3, 5, 7, 9, 11, 13, 15, 17, 19, 21) OR
NOR(PR4-RAW-13, 15, 17, 19, 21, 23) OR
NOR(PR4-PREV-15, 17, 19, 21, 23 PR4-RAW-0, 2, 4, 6, 8, 10, 12) OR
NOR(PR4-PREV-17, 19, 21, 23 PR4-RAW-0, 2, 4, 6, 8, 10, 12, 14) OR
NOR(PR4-PREV-19, 21, 23 PR4-RAW-0, 2, 4, 6, 8, 10, 12, 14, 16) OR
NOR(PR4-PREV-21, 23 PR4-RAW-0, 2, 4, 6, 8, 10, 12, 14, 16, 18) OR
NOR(PR4-PREV-23 PR4-RAW-0, 2, 4, 6, 8, 10, 12, 14, 16, 18, 20) OR
NOR(PR4-RAW-0, 2, 4, 6, 8, 10, 12, 14, 16, 18, 20, 22) OR
NOR(PR4-RAW-12, 14, 16, 18, 20, 22 , 24)
INHIBIT = NOR(PR4-PREV-14, 16, 18, 20, 22, 24
PR4-MAP-1, 3, 5, 7, 9, 11) OR
NOR(PR4-PREV-16, 18, 20, 22, 24 PR4-MAP-1, 3, 5, 7, 9, 11, 13) OR
NOR(PR4-PREV-18, 20, 22, 24 PR4-MAP-1, 3, 5, 7, 9, 11, 13, 15) OR
NOR(PR4-PREV-20, 22, 24 PR4-MAP-1, 3, 5, 7, 9, 11, 13, 15, 17) OR
NOR(PR4-PREV-22, 24 PR4-MAP-1, 3, 5, 7, 9, 11, 13, 15, 17, 19) OR
NOR(PR4-PREV-24 PR4-MAP-1, 3, 5, 7, 9, 11, 13, 15, 17, 19, 21) OR
NOR(PR4-MAP-13, 15, 17, 19, 21, 23) OR
NOR(PR4-PREV-15, 17, 19, 21, 23 PR4-MAP-0, 2, 4, 6, 8, 10, 12) OR
NOR(PR4-PREV-17, 19, 21, 23 PR4-MAP-0, 2, 4, 6, 8, 10, 12, 14) OR
NOR(PR4-PREV-19, 21, 23 PR4-MAP-0, 2, 4, 6, 8, 10, 12, 14, 16) OR
NOR(PR4-PREV-21, 23 PR4-MAP-0, 2, 4, 6, 8, 10, 12, 14, 16, 18) OR
NOR(PR4-PREV-23 PR4-MAP-0, 2, 4, 6, 8, 10, 12, 14, 16, 18, 20) OR
NOR(PR4-MAP-0, 2, 4, 6, 8, 10, 12, 14, 16, 18, 20, 22) OR
NOR(PR4-MAP-12, 14, 16, 18, 20, 22, 24)
```

I claim:

1. A sampled amplitude read channel for reading data recorded on a disk storage medium by detecting an estimated data sequence from a sequence of read signal sample values generated by sampling an analog read signal emanating from a read head positioned over the disk storage medium, the sampled amplitude read channel comprising:

(a) a sampling device for sampling the analog read signal to generate the read signal sample values;

(b) a trellis sequence detector for detecting a preliminary sequence from the read signal sample values; and (c) a post processor for detecting and correcting errors in the preliminary sequence comprising:

(i) a remodulator for remodulating the preliminary sequence into a sequence of estimated sample values;

(ii) a sample error generator, responsive to the read signal sample values and the estimated sample values, for generating a sequence of sample errors;

(iii) a sample error filter for filtering the sample errors to generate filtered sample errors;

(iv) a first error pattern detector, responsive to the filtered sample errors, for detecting errors in the preliminary sequence;

(v) an unguided error corrector, responsive to the first error pattern detector, for correcting errors detected in the preliminary sequence by the first error pattern detector;

(vi) a syndrome generator, responsive to the preliminary sequence, for generating an error syndrome according to a predetermined error detection code;

(vii) a second error pattern detector, responsive to the filtered sample errors, for detecting errors in the preliminary sequence; and (viii) a guided error corrector, responsive to the second error pattern detector and the error syndrome, for correcting errors detected in the preliminary sequence by the second error pattern detector.

2. The sampled amplitude read channel as recited in claim 1, wherein the error syndrome is generated according to a convolution code.

3. The sampled amplitude read channel as recited in claim 2, wherein:

(a) the preliminary sequence comprises a plurality of codewords where each codeword comprises codeword data and an appended convolution code check bit;

(b) at least one of the convolution code check bits of a first codeword is a function of the codeword data of a plurality of the codewords;

(c) the error syndrome comprises a plurality of syndrome bits corresponding to a plurality of the check bits; and (d) the guided error corrector corrects an error event detected in a current codeword using the error syndrome.

4. The sampled amplitude read channel as recited in claim 3, wherein the error syndrome comprises a first error syndrome identifying a first error event and a second error syndrome identifying a second error event.

5. The sampled amplitude read channel as recited in claim 4, wherein the first and second error syndromes are overlapping due to the first and second error events ocurring in codewords that are located near one another.

6. The sampled amplitude read channel as recited in claim 3, wherein:

(a) the first error pattern detector detects error events relative to a Euclidean distance between corrected sample values and sample values of valid output sequences; and (b) the second error pattern detector detects error events consistent with the error syndrome.

7. The sampled amplitude read channel as recited in claim 3, wherein the first error pattern detector and unguided error corrector operate on a first codeword concurrent with the second error pattern detector and guided error corrector operating on a second codeword.

8. The sampled amplitude read channel as recited in claim 1, wherein:
(a) the unguided error corrector modifies the filtered sample errors to reflect a correction made to the preliminary sequence; and
(b) the second error pattern detector is responsive to the modified filtered sample errors.

9. The sampled amplitude read channel as recited in claim 1, wherein the unguided error corrector modifies the error syndrome to reflect a correction made to the preliminary sequence.

10. The sampled amplitude read channel as recited in claim 1, wherein the guided error corrector modifies the error syndrome to reflect a correction made to the preliminary sequence.

11. A sampled amplitude read channel for reading data recorded on a disk storage medium by detecting an estimated data sequence from a sequence of read signal sample values generated by sampling an analog read signal emanating from a read head positioned over the disk storage medium, the sampled amplitude read channel comprising:
(a) a channel encoder for encoding user data into error detection codewords according to a convolution code, wherein the error detection codewords are written to the disk storage medium;
(b) a sampling device for sampling the analog read signal to generate the read signal sample values;
(c) a trellis sequence detector for detecting a preliminary sequence from the read signal sample values; and
(d) a post processor for detecting and correcting errors in the preliminary sequence comprising:
 (i) a remodulator for remodulating the preliminary sequence into a sequence of estimated sample values;
 (ii) a sample error generator, responsive to the read signal sample values and the estimated sample values, for generating a sequence of sample errors;
 (iii) a sample error filter for filtering the sample errors to generate filtered sample errors;
 (iv) a syndrome generator, responsive to the preliminary sequence, for generating an error syndrome according to the convolution code;
 (v) an error pattern detector, responsive to the filtered sample errors, for detecting errors in the preliminary sequence; and
 (vi) a guided error corrector, responsive to the error pattern detector and the error syndrome, for correcting errors detected in the preliminary sequence.

12. The sampled amplitude read channel as recited in claim 11, wherein the error pattern detector comprises a second error pattern detector, the sampled amplitude read channel further comprising a first error pattern detector, responsive to the sample errors, for detecting errors in the preliminary sequence.

13. The sampled amplitude read channel as recited in claim 12, further comprising an unguided error corrector, responsive to the first error pattern detector, for correcting errors detected in the preliminary sequence.

14. The sampled amplitude read channel as recited in claim 13, wherein:
(a) the preliminary sequence comprises a plurality of codewords, each codeword comprising codeword data and an appended convolution code check bit;
(b) at least one of the convolution code check bits of a first codeword is a function of the codeword data of a plurality of the codewords;
(c) the error syndrome comprises a plurality of syndrome bits corresponding to a plurality of the check bits; and
(d) the guided error corrector corrects an error event detected in a current codeword using the error syndrome.

15. The sampled amplitude read channel as recited in claim 14, wherein the error syndrome comprises a first error syndrome identifying a first error event and a second error syndrome identifying a second error event.

16. The sampled amplitude read channel as recited in claim 15, wherein the first and second error syndromes are overlapping due to the first and second error events ocurring in codewords that are located near one another.

17. The sampled amplitude read channel as recited in claim 14, wherein:
(a) the first error pattern detector detects error events relative to a Euclidean distance between corrected sample values and sample values of valid output sequences; and
(b) the second error pattern detector detects error events consistent with the error syndrome.

18. The sampled amplitude read channel as recited in claim 14, wherein the unguided error corrector operates on a first codeword concurrent with the guided error corrector operating on a second codeword.

19. The sampled amplitude read channel as recited in claim 13, wherein the unguided error corrector modifies the filtered sample errors to reflect a correction made to the preliminary sequence.

20. The sampled amplitude read channel as recited in claim 13, wherein the unguided error corrector modifies the error syndrome to reflect a correction made to the preliminary sequence.

21. The sampled amplitude read channel as recited in claim 11, wherein the guided error corrector modifies the error syndrome to reflect a correction made to the preliminary sequence.

22. A method of reading data recorded on a disk storage medium by detecting an estimated data sequence from a sequence of read signal sample values generated by sampling an analog read signal emanating from a read head positioned over the disk storage medium, the method comprising the steps of:
(a) sampling the analog read signal to generate the read signal sample values;
(b) detecting a preliminary sequence from the read signal sample values;
(c) remodulating the preliminary sequence into a sequence of estimated sample values;
(d) generating a sequence of sample errors from the read signal sample values and the estimated sample values;
(e) first detecting errors in the preliminary sequence from the sample errors;
(f) first correcting errors detected in the preliminary sequence;
(g) generating an error syndrome from the preliminary sequence according to a predetermined error detection code;
(h) second detecting errors in the preliminary sequence from the sample errors and the error syndrome; and
(i) second correcting errors detected in the preliminary sequence.

23. A method of reading data recorded on a disk storage medium by detecting an estimated data sequence from a sequence of read signal sample values generated by sampling an analog read signal emanating from a read head positioned over the disk storage medium, the method comprising the steps of:

(a) encoding user data into error detection codewords according to a predetermined convolution code;

(b) writing the error detection codewords to the disk storage medium;

(c) sampling the analog read signal to generate the read signal sample values;

(d) detecting a preliminary sequence from the read signal sample values;

(e) remodulating the preliminary sequence into a sequence of estimated sample values;

(f) generating a sequence of sample errors from the read signal sample values and the estimated sample values;

(g) filtering the sample errors to generate filtered sample errors;

(h) generating an error syndrome from the preliminary sequence according to the convolution code;

(i) detecting errors in the preliminary sequence from the filtered sample errors and the error syndrome; and (j) correcting errors detected in the preliminary sequence.

24. A communication channel for demodulating an analog receive signal, the communication channel comprising:

(a) a sampling device for sampling the analog receive signal to generate signal sample values;

(b) a trellis sequence detector for detecting a preliminary sequence from the signal sample values; and (c) a post processor for detecting and correcting errors in the preliminary sequence comprising:

(i) a remodulator for remodulating the preliminary sequence into a sequence of estimated sample values;

(ii) a sample error generator, responsive to the signal sample values and the estimated sample values, for generating a sequence of sample errors;

(iii) a sample error filter for filtering the sample errors to generate filtered sample errors;

(iv) a first error pattern detector, responsive to the filtered sample errors, for detecting errors in the preliminary sequence;

(v) an unguided error corrector, responsive to the first error pattern detector, for correcting errors detected in the preliminary sequence by the first error pattern detector;

(vi) a syndrome generator, responsive to the preliminary sequence, for generating an error syndrome according to a predetermined error detection code;

(vii) a second error pattern detector, responsive to the filtered sample errors, for detecting errors in the preliminary sequence; and (viii) a guided error corrector, responsive to the second error pattern detector and the error syndrome, for correcting errors detected in the preliminary sequence by the second error pattern detector.

25. A communication channel for demodulating an analog receive signal, the communication channel comprising:

(a) a channel encoder for encoding user data into error detection codewords according to a convolution code, wherein the error detection codewords are transmitted through a communication medium;

(b) a sampling device for sampling the analog receive signal to generate the'signal sample values;

(c) a trellis sequence detector for detecting a preliminary sequence from the signal sample values; and (d) a post processor for detecting and correcting errors in the preliminary sequence comprising:

(i) a remodulator for remodulating the preliminary sequence into a sequence of estimated sample values;

(ii) a sample error generator, responsive to the signal sample values and the estimated sample values, for generating a sequence of sample errors;

(iii) a sample error filter for filtering the sample errors to generate filtered sample errors, wherein the error pattern detector is responsive to the filtered sample errors;

(iv) a syndrome generator, responsive to the preliminary sequence, for generating an error syndrome according to the convolution code;

(v) an error pattern detector, responsive to the sample errors, for detecting errors in the preliminary sequence; and (vi) a guided error corrector, responsive to the error pattern detector and the error syndrome, for correcting errors detected in the preliminary sequence.

* * * * *